(12) United States Patent
Kondo et al.

(10) Patent No.: US 7,181,080 B2
(45) Date of Patent: Feb. 20, 2007

(54) IMAGE PROCESSING APPARATUS AND METHOD, AND IMAGE PICKUP APPARATUS

(75) Inventors: Tetsujiro Kondo, Tokyo (JP); Takahiro Nagano, Kanagawa (JP); Junichi Ishibashi, Saitama (JP); Takashi Sawao, Tokyo (JP); Naoki Fujiwara, Tokyo (JP); Seiji Wada, Kanagawa (JP); Toru Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 738 days.

(21) Appl. No.: 10/362,558

(22) PCT Filed: Jun. 26, 2002

(86) PCT No.: PCT/JP02/06385

§ 371 (c)(1),
(2), (4) Date: Jul. 28, 2003

(87) PCT Pub. No.: WO03/003307

PCT Pub. Date: Jan. 9, 2003

(65) Prior Publication Data

US 2004/0028259 A1    Feb. 12, 2004

(30) Foreign Application Priority Data

Jun. 27, 2001 (JP) .............................. 2001-194611

(51) Int. Cl.
*G06K 9/40* (2006.01)
(52) U.S. Cl. ...................... 382/254; 382/266; 382/275; 358/3.27; 358/464; 348/586
(58) Field of Classification Search ................ 382/266, 382/274, 275, 282; 358/3.27, 463, 464; 348/586, 348/607
See application file for complete search history.

(56) References Cited

U.S. PATENT DOCUMENTS 5,812,787 A * 9/1998 Astle .......................... 709/247

(Continued)

FOREIGN PATENT DOCUMENTS

EP    0 933 727    8/1999

(Continued)

*Primary Examiner*—Jingge Wu
*Assistant Examiner*—Yosef Kassa
(74) *Attorney, Agent, or Firm*—Frommer Lawrence & Haug LLP; William S. Frommer

(57) ABSTRACT

An object of the present invention is to make it possible to specify a background image area, a moving object image area, and an image area in which the mixture of the background image area and the moving object image area occurs. A mixture-ratio calculator 103 extracts pixel data of a peripheral frame corresponding to a designated pixel of a designated frame of the image data as background pixel data corresponding to a background object, and also extracts designated pixel data of the designated pixel contained in the designated frame so as to generate a plurality of relational expressions indicating the relationship between the designated pixel data and the background pixel data. The mixture-ratio calculator 103 detects the mixture ratio indicating the mixture state of the objects based on the relational expressions. An area specifying unit 104 calculates a predictive error by substituting the detected mixture ratio into the relational expressions, and determines whether an area to which the designated pixel belongs is a covered background area, an uncovered background area, a foreground area, or a background area. The present invention is applicable to an image processing apparatus.

55 Claims, 62 Drawing Sheets

U.S. PATENT DOCUMENTS

| | | | |
|---|---|---|---|
| 5,933,151 A * | 8/1999 | Jayant et al. | 345/473 |
| 6,054,999 A * | 4/2000 | Strandberg | 345/474 |
| 6,396,949 B1 * | 5/2002 | Nichani | 382/173 |
| 6,771,834 B1 * | 8/2004 | Martins et al. | 382/257 |

FOREIGN PATENT DOCUMENTS

| | | |
|---|---|---|
| JP | 6-113338 | 4/1994 |
| JP | 7-336688 | 12/1995 |
| JP | 10-164436 | 6/1998 |
| JP | 2000-30040 | 1/2000 |
| JP | 2001-250119 | 9/2001 |
| JP | 2002-190015 | 7/2002 |
| JP | 2002-190016 | 7/2002 |
| JP | 2002-190028 | 7/2002 |

* cited by examiner

FIG. 3
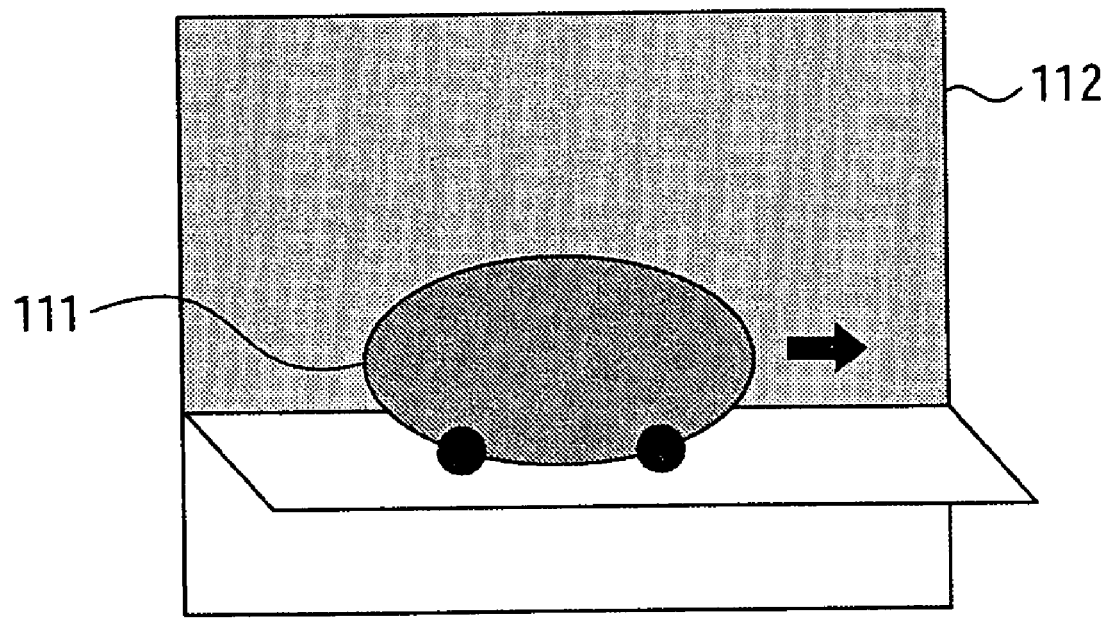
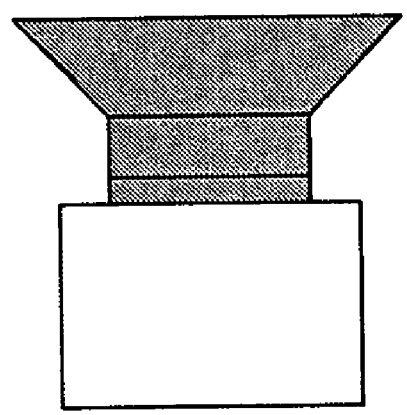

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

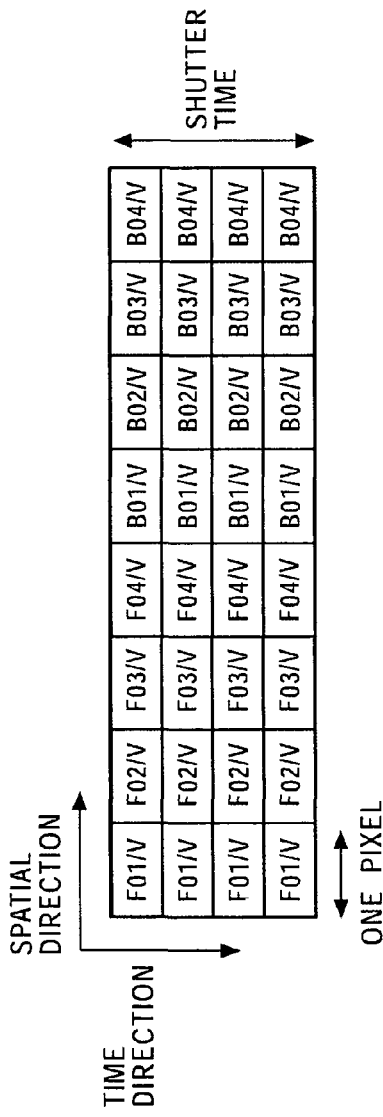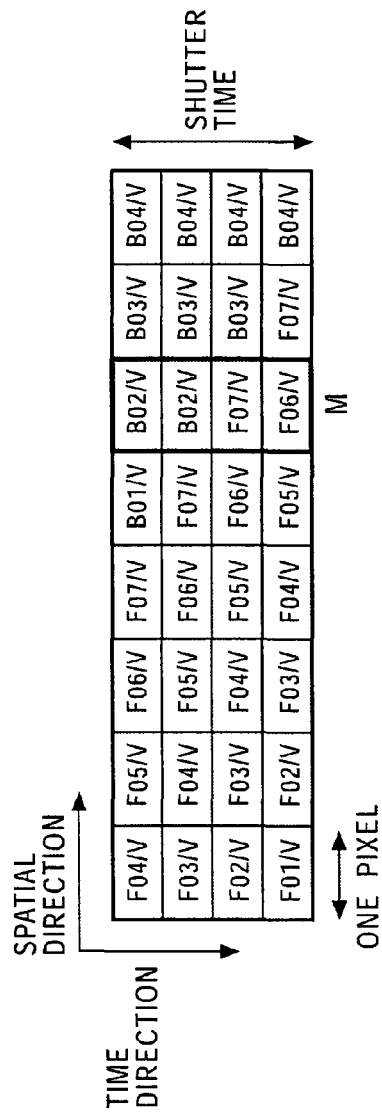

FIG. 51A
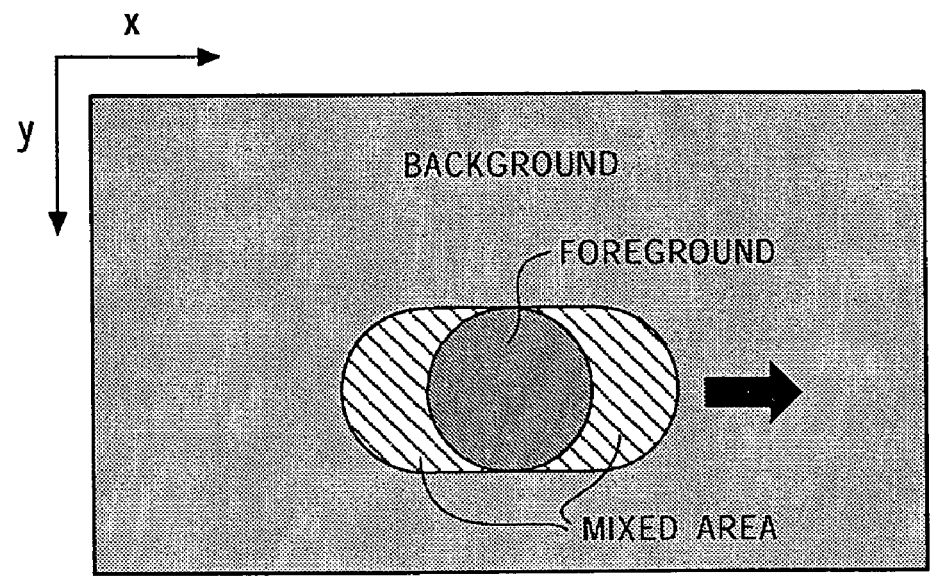
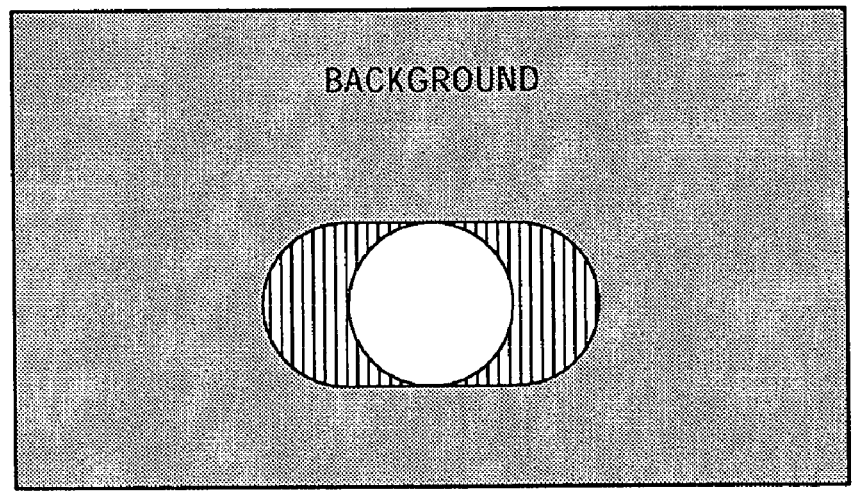
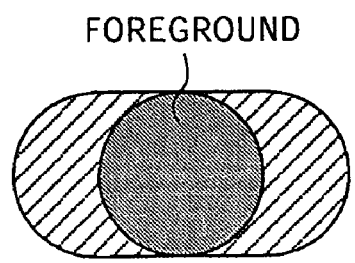

FIG. 67

| C01 | C02 | C03 | C04 | C05 | C06 | C07 | C08 | C09 | C10 | C11 | C12 |
|---|---|---|---|---|---|---|---|---|---|---|---|
| F01/V | F02/V | F03/V | F04/V | F05/V | F06/V | F07/V | F08/V | | | | |
| | F01/V | F02/V | F03/V | F04/V | F05/V | F06/V | F07/V | F08/V | | | |
| | | F01/V | F02/V | F03/V | F04/V | F05/V | F06/V | F07/V | F08/V | | |
| | | | F01/V | F02/V | F03/V | F04/V | F05/V | F06/V | F07/V | F08/V | |
| | | | | F01/V | F02/V | F03/V | F04/V | F05/V | F06/V | F07/V | F08/V |

FIG. 68

| | C01 | C02 | C03 | C04 | C05 | C06 | C07 | C08 | C09 | C10 | C11 | C12 |
|---|---|---|---|---|---|---|---|---|---|---|---|---|
| | F01/V | F02/V | F03/V | F04/V | | | | | | | | |
| | | F01/V | F02/V | F03/V | | | | | | | | |
| | | | F01/V | F02/V | | | | | | | | |
| | | | | F01/V | | | | | | | | |
| | | | | | F01/V | F02/V | F03/V | F04/V | F05/V | F06/V | F07/V | F08/V |

FIG. 69

| | | | | F01 | F02 | F03 | F04 | F05 | F06 | F07 | F08 |
|---|---|---|---|---|---|---|---|---|---|---|---|
| F01/V | F02/V | F03/V | F04/V | | | | | | | | |
| | F01/V | F02/V | F03/V | | | | | | | | |
| | | F01/V | F02/V | | | | | | | | |
| | | | F01/V | | | | | | | | |
| C01 | C02 | C03 | C04 | C05 | C06 | C07 | C08 | C09 | C10 | C11 | C12 |

IMAGE PROCESSING APPARATUS AND METHOD, AND IMAGE PICKUP APPARATUS

TECHNICAL FIELD

The present invention relates to image processing apparatuses and methods, and image-capturing apparatuses, and more particularly, to an image processing apparatus and method, and an image-capturing apparatus in which a difference between a signal detected by a sensor and the real world is taken into consideration.

BACKGROUND ART

A technique for detecting incidents occurring in the real world by a sensor and for processing sampled data output from the image sensor is widely used.

For example, motion blur occurs in an image obtained by capturing an object moving in front of a predetermined stationary background with a video camera if the moving speed is relatively high.

However, when an object is moving in front of a stationary background, not only does motion blur caused by the mixture of the moving object itself occur, but also the mixture of the background image and the moving object image occurs. Hitherto, the processing for dealing with the mixture state of the background image and the moving object has not been considered.

DISCLOSURE OF INVENTION

The present invention has been made in view of the above-described background. Accordingly, it is an object of the present invention to make it possible to specify a background image area, a moving object area, and an image area in which the mixture of the background image area and the moving object area occurs.

An image processing apparatus of the present invention includes: relational-expression generating means for extracting, in correspondence with a designated pixel of a designated frame of image data, pixel data of a peripheral frame around the designated frame as background pixel data corresponding to a background object which forms a background among a plurality of objects of the image data, and also for extracting designated pixel data of the designated pixel contained in the designated frame so as to generate a plurality of relational expressions concerning the designated pixel indicating the relationship between the designated pixel data and the background pixel data; mixture-ratio detection means for detecting a mixture ratio indicating the mixture state of the plurality of objects in the real world concerning the designated pixel based on the relational expressions; predictive-error calculation means for calculating a predictive error by substituting the mixture ratio detected by the mixture-ratio detection means into the relational expressions; covered background area/uncovered background area specifying means for specifying, based on the predictive error, whether an area to which the designated pixel belongs is a mixed area in which the plurality of objects are mixed and is also a covered background area formed at a leading end in the moving direction of a foreground object which forms a foreground among the plurality of objects, or is the mixed area and is also an uncovered background area formed at a trailing end in the moving direction of the foreground object; and foreground area/background area specifying means for specifying whether the area to which the designated pixel belongs is a foreground area consisting of only foreground object components which form the foreground object or a background area consisting of only background object components which form the background object.

The mixture-ratio detection means may detect the foreground object components contained in the designated pixel in correspondence with the designated pixel based on the relational expressions, and may also detect the mixture ratio; and the predictive-error calculation means may calculate the predictive error by substituting the mixture ratio and the foreground object components contained in the designated pixel detected by the mixture-ratio detection means into the relational expressions.

The relational-expression generating means may extract the pixel data of the peripheral frame corresponding to the designated pixel as the background pixel data corresponding to the background object, and may also extract the designated pixel data of the designated pixel and vicinity pixel data of a vicinity pixel positioned in the vicinity of the designated pixel in the designated frame, and may generate the plurality of relational expressions concerning the designated pixel indicating the relationship among the designated pixel data, the vicinity pixel data, and the background pixel data corresponding to the designated pixel data or the vicinity pixel data.

The relational-expression generating means may generate the plurality of relational expressions based on a first approximation in which the foreground object components contained in the designated pixel data and the vicinity pixel data are equal, and a second approximation in which the mixture ratio in the mixed area linearly changes with respect to the position of the pixel of the mixed area.

The relational-expression generating means may generate the plurality of relational expressions based on a first approximation in which the foreground object components contained in the designated pixel data and the vicinity pixel data are equal, and a second approximation in which the mixture ratio in the mixed area planarly changes with respect to the position of the pixel of the mixed area.

The mixture-ratio detection means may detect the mixture ratio by solving the plurality of relational expressions according to the method of least squares.

The relational-expression generating means may generate the plurality of relational expressions by extracting the pixel data of the frame prior to the designated frame as the background pixel data when the designated pixel belongs to the covered background area and by extracting the pixel data of the frame subsequent to the designated frame as the background pixel data when the designated pixel belongs to the uncovered background area.

The relational-expression generating means may generate the plurality of relational expressions by extracting, in correspondence with the designated pixel, mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame different from the frame from which the mixed pixel data is extracted based on the motion of the background object.

The relational-expression generating means may generate the plurality of relational expressions based on a first approximation in which the foreground object components corresponding to the mixed pixel data are equal and a second approximation in which the mixed pixel data extracted from the designated frame and the peripheral frame are uniform.

The relational-expression generating means may generate the plurality of relational expressions by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from the frame prior to the frame from which the mixed pixel data is extracted based on the motion of the background object. The covered background area/uncovered background area specifying means may specify an area in which the predictive error is greater than or equal to a predetermined threshold as the uncovered background area.

The relational-expression generating means may generate the plurality of relational expressions by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from the frame subsequent to the frame from which the mixed pixel data is extracted based on the motion of the background object. The covered background area/uncovered background area specifying means may specify an area in which the predictive error is greater than or equal to a predetermined threshold as the covered background area.

An image processing method includes: a relational-expression generating step of extracting, in correspondence with a designated pixel of a designated frame of image data, pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating the relationship between the designated pixel data and the background pixel data; a mixture-ratio detection step of detecting a mixture ratio indicating the mixture state of the plurality of objects in the real world concerning the designated pixel based on the relational expressions; a predictive-error calculation step of calculating a predictive error by substituting the mixture ratio detected by the processing in the mixture-ratio detection step into the relational expressions; a covered background area/uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and a foreground area/background area specifying step of specifying whether the area to which the designated pixel belongs is a foreground area consisting of only foreground object components which form the foreground object or a background area consisting of only background object components which form the background object.

In the mixture-ratio detection step, the foreground object components contained in the designated pixel may be detected in correspondence with the designated pixel based on the relational expressions, and the mixture ratio may also be detected. In the predictive-error calculation step, the predictive error may be calculated by substituting the mixture ratio and the foreground object components contained in the designated pixel detected by the processing in the mixture-ratio detection step into the relational expressions.

In the relational-expression generating step, the pixel data of the peripheral frame corresponding to the designated pixel may be extracted as the background pixel data corresponding to the background object, and the designated pixel data of the designated pixel and vicinity pixel data of a vicinity pixel positioned in the vicinity of the designated pixel in the designated frame may also be extracted, and the plurality of relational expressions concerning the designated pixel indicating the relationship among the designated pixel data, the vicinity pixel data, and the background pixel data corresponding to the designated pixel data or the vicinity pixel data.

In the relational-expression generating step, the plurality of relational expressions may be generated based on a first approximation in which the foreground object components contained in the designated pixel data and the vicinity pixel data are equal, and a second approximation in which the mixture ratio in the mixed area linearly changes with respect to the position of the pixel of the mixed area.

In the relational-expression generating step, the plurality of relational expressions may be generated based on a first approximation in which the foreground object components contained in the designated pixel data and the vicinity pixel data are equal, and a second approximation in which the mixture ratio in the mixed area planarly changes with respect to the position of the pixel of the mixed area.

In the mixture-ratio detection step, the mixture ratio may be detected by solving the plurality of relational expressions according to the method of least squares.

In the relational-expression generating step, the plurality of relational expressions may be generated by extracting the pixel data of the frame prior to the designated frame as the background pixel data when the designated pixel belongs to the covered background area and by extracting the pixel data of the frame subsequent to the designated frame as the background pixel data when the designated pixel belongs to the uncovered background area.

In the relational-expression generating step, the plurality of relational expressions may be generated by extracting, in correspondence with the designated pixel, mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame different from the frame from which the mixed pixel data is extracted based on the motion of the background object.

In the relational-expression generating step, the plurality of relational expressions may be generated based on a first approximation in which the foreground object components corresponding to the mixed pixel data are equal and a second approximation in which the mixed pixel data extracted from the designated frame and the peripheral frame are uniform.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from the frame prior to the frame from which the mixed pixel data is extracted based on the motion of the background object. In the covered background area/uncovered background area specifying step, an area in which the predictive error is greater than or equal to a predetermined threshold is specified as the uncovered background area.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from the frame subsequent to the frame from which the mixed pixel data is extracted based on the motion of the background object. In the covered background area/uncovered background area specifying step, an area in which the predictive error is greater than or equal to a predetermined threshold may be specified as the covered background area.

A program of a recording medium of the present invention includes: a relational-expression generating step of extracting, in correspondence with a designated pixel of a designated frame of image data, pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating the relationship between the designated pixel data and the background pixel data; a mixture-ratio detection step of detecting a mixture ratio indicating the mixture state of the plurality of objects in the real world concerning the designated pixel based on the relational expressions; a predictive-error calculation step of calculating a predictive error by substituting the mixture ratio detected by the processing in the mixture-ratio detection step into the relational expressions; a covered background area/ uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and a foreground area/background area specifying step of specifying whether the area to which the designated pixel belongs is a foreground area consisting of only foreground object components which form the foreground object or a background area consisting of only background object components which form the background object.

In the mixture-ratio detection step, the foreground object components contained in the designated pixel may be detected in correspondence with the designated pixel based on the relational expressions, and the mixture ratio may also be detected. In the predictive-error calculation step, the predictive error may be calculated by substituting the mixture ratio and the foreground object components contained in the designated pixel detected by the processing in the mixture-ratio detection step into the relational expressions.

In the relational-expression generating step, the pixel data of the peripheral frame corresponding to the designated pixel may be extracted as the background pixel data corresponding to the background object, and the designated pixel data of the designated pixel and vicinity pixel data of a vicinity pixel positioned in the vicinity of the designated pixel in the designated frame may also be extracted, and the plurality of relational expressions concerning the designated pixel indicating the relationship among the designated pixel data, the vicinity pixel data, and the background pixel data corresponding to the designated pixel data or the vicinity pixel data.

In the relational-expression generating step, the plurality of relational expressions may be generated based on a first approximation in which the foreground object components contained in the designated pixel data and the vicinity pixel data are equal, and a second approximation in which the mixture ratio in the mixed area linearly changes with respect to the position of the pixel of the mixed area.

In the relational-expression generating step, the plurality of relational expressions may be generated based on a first approximation in which the foreground object components contained in the designated pixel data and the vicinity pixel data are equal, and a second approximation in which the mixture ratio in the mixed area planarly changes with respect to the position of the pixel of the mixed area.

In the mixture-ratio detection step, the mixture ratio may be detected by solving the plurality of relational expressions according to the method of least squares.

In the relational-expression generating step, the plurality of relational expressions may be generated by extracting the pixel data of the frame prior to the designated frame as the background pixel data when the designated pixel belongs to the covered background area and by extracting the pixel data of the frame subsequent to the designated frame as the background pixel data when the designated pixel belongs to the uncovered background area.

In the relational-expression generating step, the plurality of relational expressions may be generated by extracting, in correspondence with the designated pixel, mixed pixel data indicating a mixture state in which the plurality of objects are mixed from the designated frame and the peripheral frame based on the motion of the foreground object and by also extracting, in correspondence with each item of the mixed pixel data, the background pixel data corresponding to the background object from a frame different from the frame from which the mixed pixel data is extracted based on the motion of the background object.

In the relational-expression generating step, the plurality of relational expressions may be generated based on a first approximation in which the foreground object components corresponding to the mixed pixel data are equal and a second approximation in which the mixed pixel data extracted from the designated frame and the peripheral frame are uniform.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from the frame prior to the frame from which the mixed pixel data is extracted based on the motion of the background object. In the covered background area/uncovered background area specifying step, an area in which the predictive error is greater than or equal to a predetermined threshold may be specified as the uncovered background area.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from the frame subsequent to the frame from which the mixed pixel data is extracted based on the motion of the background object. In the covered background area/uncovered background area specifying step, an area in which the predictive error is greater than or equal to a predetermined threshold may be specified as the covered background area.

A program of the present invention allows a computer to execute: a relational-expression generating step of extracting, in correspondence with a designated pixel of a designated frame of image data, pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating the relationship between the designated pixel data and the background pixel data; a mixture-ratio detection step of detecting a mixture ratio indicating the mixture state of the plurality of objects in the real world concerning the designated pixel based on the relational expressions; a predictive-error calculation step of calculating a predictive error by substituting the mixture ratio detected by the processing in the mixture-ratio detection step into the relational expressions; a covered background area/ uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and a foreground area/background area specifying step of specifying whether the area to which the designated pixel belongs is a foreground area consisting of only foreground object components which form the foreground object or a background area consisting of only background object components which form the background object.

In the mixture-ratio detection step, the foreground object components contained in the designated pixel may be detected in correspondence with the designated pixel based on the relational expressions, and the mixture ratio may also be detected. In the predictive-error calculation step, the predictive error may be calculated by substituting the mixture ratio and the foreground object components contained in the designated pixel detected by the processing in the mixture-ratio detection step into the relational expressions.

In the relational-expression generating step, the pixel data of the peripheral frame corresponding to the designated pixel may be extracted as the background pixel data corresponding to the background object, and the designated pixel data of the designated pixel and vicinity pixel data of a vicinity pixel positioned in the vicinity of the designated pixel in the designated frame may also be extracted, and the plurality of relational expressions concerning the designated pixel indicating the relationship among the designated pixel data, the vicinity pixel data, and the background pixel data corresponding to the designated pixel data or the vicinity pixel data.

In the relational-expression generating step, the plurality of relational expressions may be generated based on a first approximation in which the foreground object components contained in the designated pixel data and the vicinity pixel data are equal, and a second approximation in which the mixture ratio in the mixed area linearly changes with respect to the position of the pixel of the mixed area.

In the relational-expression generating step, the plurality of relational expressions may be generated based on a first approximation in which the foreground object components contained in the designated pixel data and the vicinity pixel data are equal, and a second approximation in which the mixture ratio in the mixed area planarly changes with respect to the position of the pixel of the mixed area.

In the mixture-ratio detection step, the mixture ratio may be detected by solving the plurality of relational expressions according to the method of least squares.

In the relational-expression generating step, the plurality of relational expressions may be generated by extracting the pixel data of the frame prior to the designated frame as the background pixel data when the designated pixel belongs to the covered background area and by extracting the pixel data of the frame subsequent to the designated frame as the background pixel data when the designated pixel belongs to the uncovered background area.

In the relational-expression generating step, the plurality of relational expressions may be generated by extracting, in correspondence with the designated pixel, mixed pixel data indicating a mixture state in which the plurality of objects are mixed from the designated frame and the peripheral frame based on the motion of the foreground object and by also extracting, in correspondence with each item of the mixed pixel data, the background pixel data corresponding to the background object from a frame different from the frame from which the mixed pixel data is extracted based on the motion of the background object.

In the relational-expression generating step, the plurality of relational expressions may be generated based on a first approximation in which the foreground object components corresponding to the mixed pixel data are equal and a second approximation in which the mixed pixel data extracted from the designated frame and the peripheral frame are uniform.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from the frame prior to the frame from which the mixed pixel data is extracted based on the motion of the background object. In the covered background area/uncovered background area specifying step, an area in which the predictive error is greater than or equal to a predetermined threshold may be specified as the uncovered background area.

In the relational-expression generating step, the plurality of relational expressions may be generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from the frame subsequent to the frame from which the mixed pixel data is extracted based on the motion of the background object. In the covered background area/uncovered background area specifying step, an area in which the predictive error is greater than or equal to a predetermined threshold may be specified as the covered background area.

An image-capturing apparatus of the present invention includes: image-capturing means for outputting a subject image captured by an image-capturing device including a predetermined number of pixels, the pixels having a time integrating function, as image data formed of a predetermined number of pixel data; relational-expression generating means for extracting, in correspondence with a designated pixel of a designated frame of the image data, the pixel data of a peripheral frame around the designated frame as background pixel data corresponding to a background object which forms a background among a plurality of objects of the image data, and also for extracting designated pixel data of the designated pixel contained in the designated frame so as to generate a plurality of relational expressions concerning the designated pixel indicating a relationship between the designated pixel data and the background pixel data; mixture-ratio detection means for detecting a mixture ratio indicating the mixture state of the plurality of objects in the real world concerning the designated pixel based on the relational expressions; predictive-error calculation means for calculating a predictive error by substituting the mixture ratio detected by the mixture-ratio detection means into the relational expressions; covered background area/uncovered background area specifying means for specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and foreground area/background area specifying means for specifying whether the area to which the designated pixel belongs is a foreground area consisting of only foreground object components which form the foreground object or a background area consisting of only background object components which form the background object.

The mixture-ratio detection means may detect the foreground object components contained in the designated pixel in correspondence with the designated pixel based on the relational expressions, and may also detect the mixture ratio. The predictive-error calculation means may calculate the predictive error by substituting the mixture ratio and the foreground object components contained in the designated pixel detected by the mixture-ratio detection means into the relational expressions.

The relational-expression generating means may extract the pixel data of the peripheral frame corresponding to the designated pixel as the background pixel data corresponding to the background object, and may also extract the designated pixel data of the designated pixel and vicinity pixel data of a vicinity pixel positioned in the vicinity of the designated pixel in the designated frame, and may generate the plurality of relational expressions concerning the designated pixel indicating the relationship among the designated pixel data, the vicinity pixel data, and the background pixel data corresponding to the designated pixel data or the vicinity pixel data.

The relational-expression generating means may generate the plurality of relational expressions based on a first approximation in which the foreground object components contained in the designated pixel data and the vicinity pixel data are equal, and a second approximation in which the mixture ratio in the mixed area linearly changes with respect to the position of the pixel of the mixed area.

The relational-expression generating means may generate the plurality of relational expressions based on a first approximation in which the foreground object components contained in the designated pixel data and the vicinity pixel data are equal, and a second approximation in which the mixture ratio in the mixed area planarly changes with respect to the position of the pixel of the mixed area.

The mixture-ratio detection means may detect the mixture ratio by solving the plurality of relational expressions according to the method of least squares.

The relational-expression generating means may generate the plurality of relational expressions by extracting the pixel data of the frame prior to the designated frame as the background pixel data when the designated pixel belongs to the covered background area and by extracting the pixel data of the frame subsequent to the designated frame as the background pixel data when the designated pixel belongs to the uncovered background area.

The relational-expression generating means may generate the plurality of relational expressions by extracting, in correspondence with the designated pixel, mixed pixel data indicating a mixture state in which the plurality of objects are mixed from the designated frame and the peripheral frame based on the motion of the foreground object and by also extracting, in correspondence with each item of the mixed pixel data, the background pixel data corresponding to the background object from a frame different from the frame from which the mixed pixel data is extracted based on the motion of the background object.

The relational-expression generating means may generate the plurality of relational expressions based on a first approximation in which the foreground object components corresponding to the mixed pixel data are equal and a second approximation in which the mixed pixel data extracted from the designated frame and the peripheral frame are uniform.

The relational-expression generating means may generate the plurality of relational expressions by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from the frame prior to the frame from which the mixed pixel data is extracted based on the motion of the background object. The covered background area/uncovered background area specifying means may specify an area in which the predictive error is greater than or equal to a predetermined threshold as the uncovered background area.

The relational-expression generating means may generate the plurality of relational expressions by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from the frame subsequent to the frame from which the mixed pixel data is extracted based on the motion of the background object. The covered background area/uncovered background area specifying means may specify an area in which the predictive error is greater than or equal to a predetermined threshold as the covered background area.

In correspondence with a designated pixel of a designated frame of image data, pixel data of a peripheral frame around the designated frame is extracted as background pixel data corresponding to a background object which forms a background among a plurality of objects of the image data, and also, designated pixel data of the designated pixel contained in the designated frame is extracted so as to generate a plurality of relational expressions concerning the designated pixel indicating the relationship between the designated pixel data and the background pixel data. The mixture ratio indicating the mixture state of the plurality of objects in the real world concerning the designated pixel is detected based on the relational expressions. The predictive error is calculated by substituting the detected mixture ratio into the relational expressions. Based on the predictive error, it is specified whether an area to which the designated pixel belongs is a mixed area in which the plurality of objects are mixed and is also a covered background area formed at a leading end in the moving direction of a foreground object which forms a foreground among the plurality of objects, or is the mixed area and is also an uncovered background area formed at a trailing end in the moving direction of the foreground object. It is specified whether the area to which the designated pixel belongs is a foreground area consisting of only foreground object components which form the foreground object or a background area consisting of only background object components which form the background object.

With this arrangement, it is possible to specify a background image area, a moving object image area, and an image area in which the mixture of the background image area and the moving object image area occurs.

BRIEF DESCRIPTION OF THE DRAWINGS

FIG. 3 illustrates the image capturing performed by a sensor.

FIG. 9 illustrates a model in which pixel values are expanded in the time direction and the period corresponding to the shutter time is divided.

FIG. 10 illustrates a model in which pixel values are expanded in the time direction and the period corresponding to the shutter time is divided.

FIG. 51A illustrates an input image, a foreground component image, and a background component image.

FIG. 67 illustrates an example of a model in which the relationships between pixel values and foreground components are indicated.

FIG. 68 illustrates the calculation of foreground components.

FIG. 69 illustrates the calculation of foreground components.

BEST MODE FOR CARRYING OUT THE INVENTION

Figure 1:
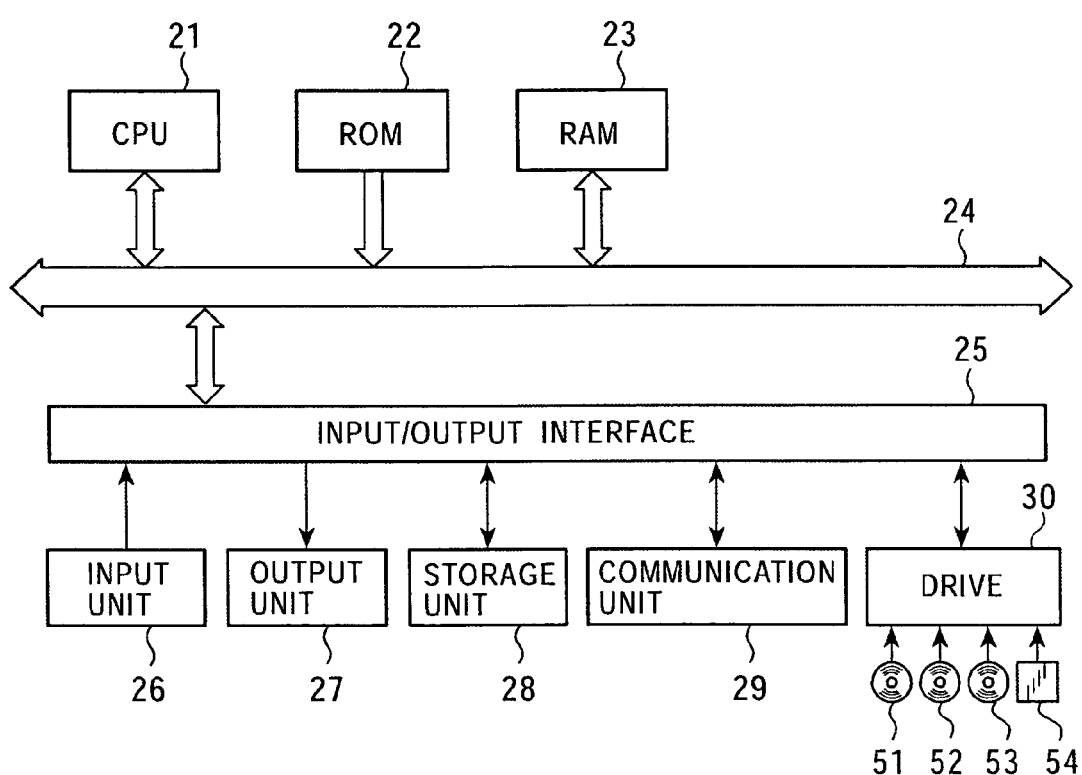
FIG. 1 illustrates an embodiment of an image processing apparatus according to the present invention.

FIG. 1 illustrates an embodiment of an image processing apparatus according to the present invention. A CPU (Central Processing Unit) 21 executes various types of processing according to programs stored in a ROM (Read Only Memory) 22 or in a storage unit 28. Programs executed by the CPU 21 and data are stored in a RAM (Random Access Memory) 23 as required. The CPU 21, the ROM 22, and the RAM 23 are connected to each other by a bus 24.

An input/output interface 25 is also connected to the CPU 21 via the bus 24. An input unit 26, which is formed of a keyboard, a mouse, a microphone, and so on, and an output unit 27, which is formed of a display, a speaker, and so on, are connected to the input/output interface 25. The CPU 21 executes various types of processing in response to a command input from the input unit 26. The CPU 21 then outputs an image or sound obtained as a result of the processing to the output unit 27.

The storage unit 28 connected to the input/output interface 25 is formed of, for example, a hard disk, and stores programs executed by the CPU 21 and various types of data. A communication unit 29 communicates with an external device via the Internet or another network. In this example, the communication unit 29 serves as an obtaining unit for obtaining an output of a sensor.

Alternatively, a program may be obtained via the communication unit 29 and stored in the storage unit 28.

A drive 30 connected to the input/output interface 25 drives a magnetic disk 51, an optical disc 52, a magneto-optical disk 53, a semiconductor memory 54, or the like, when such a recording medium is attached to the drive 30, and obtains a program or data stored in the corresponding medium. The obtained program or data is transferred to the storage unit 28 and stored therein if necessary.

Figure 2:
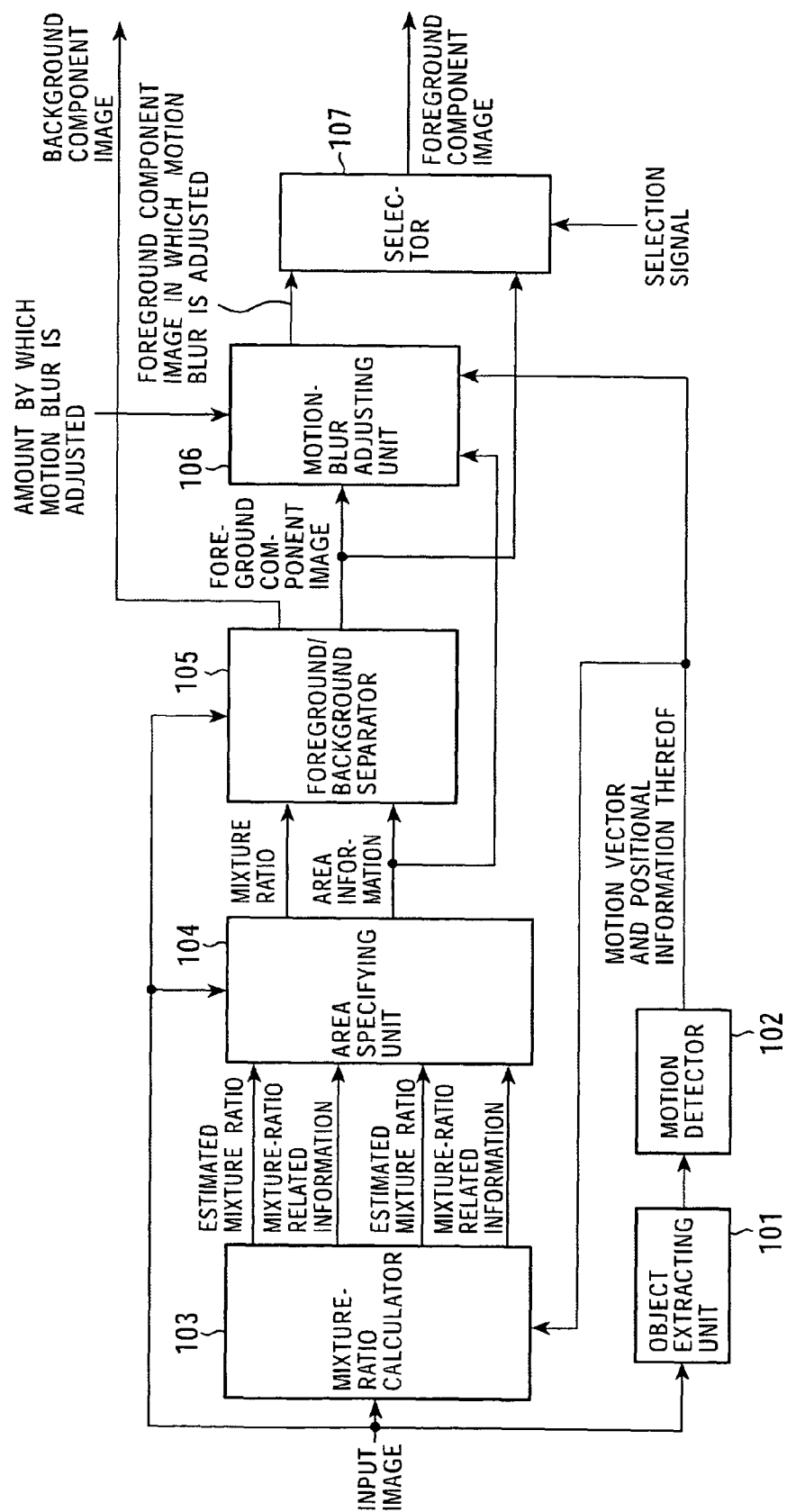
FIG. 2 is a block diagram illustrating the image processing apparatus.

FIG. 2 is a block diagram illustrating the image processing apparatus.

It does not matter whether the individual functions of the image processing apparatus are implemented by hardware or software. That is, the block diagrams of this specification may be hardware block diagrams or software functional block diagrams.

In this specification, an image to be captured corresponding to an object in the real world is referred to as an image object.

An input image supplied to the image processing apparatus is supplied to an object extracting unit 101, a mixture-ratio calculator 103, an area specifying unit 104, and a foreground/background separator 105.

The object extracting unit 101 extracts a rough image object corresponding to a foreground object contained in the input image, and supplies the extracted image object to a motion detector 102. The object extracting unit 101 detects, for example, an outline of the foreground image object contained in the input image so as to extract a rough image object corresponding to the foreground object.

The object extracting unit 101 extracts a rough image object corresponding to a background object contained in the input image, and supplies the extracted image object to the motion detector 102. The object extracting unit 101 extracts a rough image object corresponding to the background object from, for example, the difference between the input image and the extracted image object corresponding to the foreground object.

Alternatively, for example, the object extracting unit 101 may extract the rough image object corresponding to the foreground object and the rough image object corresponding to the background object from the difference between the background image stored in a built-in background memory and the input image.

The motion detector 102 calculates a motion vector of the roughly extracted image object corresponding to the foreground object according to a technique, such as block matching, gradient, phase correlation, or pel-recursive technique, and supplies the calculated motion vector and the motion-vector positional information (which is information for specifying the positions of the pixels corresponding to the motion vector) to the mixture-ratio calculator 103 and the motion-blur adjusting unit 106.

The motion vector output from the motion detector 102 contains information corresponding to the amount of movement v.

The motion detector 102 may output the motion vector of each image object, together with the pixel positional information for specifying the pixels for the image object, to the motion-blur adjusting unit 106.

The amount of movement v is a value indicating a positional change in an image corresponding to a moving object in units of the pixel pitch. For example, if an object image corresponding to a foreground is moving such that it is displayed at a position four pixels away from a reference frame when it is positioned in the subsequent frame, the amount of movement v of the object image corresponding to the foreground is 4.

The object extracting unit 101 and the motion detector 102 are needed when adjusting the amount of motion blur corresponding to a moving object.

Based on the input image and the motion vector and the positional information thereof supplied from the motion detector 102, the mixture-ratio calculator 103 generates the estimated mixture ratio (hereinafter referred to as the "mixture ratio $\alpha$") and the corresponding mixture-ratio related information when it is assumed that the pixel belongs to a covered background area, which is one portion of the mixed area, and also generates the estimated mixture ratio, which is the mixture ratio to be estimated, and the corresponding mixture-ratio related information when it is assumed that the pixel belongs to an uncovered background area, which is the other portion of the mixed area. The mixture-ratio calculator 103 supplies the two generated estimated mixture ratios and the corresponding mixture-ratio related information to the area specifying unit 104.

The mixture ratio $\alpha$ is a value indicating the ratio of the image components corresponding to the background object (hereinafter also be referred to as "background components") to the pixel value as expressed by equation (3), which is shown below.

Details of the covered background area and the uncovered background area are given below.

The area specifying unit 104 specifies each pixel of the input image as the foreground area, the background area, or the mixed area based on the input image and the two estimated mixture ratios and the corresponding mixture-ratio related information supplied from the mixture-ratio calculator 103, and supplies information indicating to which of the foreground area, the background area, or the mixed area each pixel belongs (hereinafter referred to as the "area information") to the foreground/background separator 105 and the motion-blur adjusting unit 106.

The area specifying unit 104 generates the mixture ratio $\alpha$ based on the generated area information, and the two estimated mixture ratios and the corresponding mixture-ratio related information supplied from the mixture-ratio calculator 103, and supplies the generated mixture ratio $\alpha$ to the foreground/background separator 105.

The foreground/background separator 105 separates the input image into a foreground component image formed of only the image components corresponding to the foreground object (hereinafter also be referred to as "foreground components") and a background component image formed of only the background components based on the area information and the mixture ratio $\alpha$ supplied from the area specifying unit 104, and supplies the foreground component image to the motion-blur adjusting unit 106 and a selector 107. The separated foreground component image may be set as the final output. A more precise foreground and background can be obtained compared to a known method in which only a foreground and a background are specified without considering the mixed area.

The motion-blur adjusting unit 106 determines the unit of processing indicating at least one pixel contained in the foreground component image based on the amount of movement v obtained from the motion vector and based on the area information. The unit of processing is data that specifies a group of pixels to be subjected to the motion-blur adjustments.

Based on the amount by which the motion blur is to be adjusted, which is input into the image processing apparatus, the foreground component image supplied from the foreground/background separator 105, the motion vector and the positional information thereof supplied from the motion detector 102, and the unit of processing, the motion-blur adjusting unit 106 adjusts the amount of motion blur contained in the foreground component image by removing, decreasing, or increasing the motion blur contained in the foreground component image. The motion-blur adjusting unit 106 then outputs the foreground component image in which amount of motion blur is adjusted to the selector 107. It is not essential that the motion vector and the positional information thereof be used.

Motion blur is a distortion contained in an image corresponding to a moving object caused by the movement of an object to be captured in the real world and the image-capturing characteristics of the sensor.

The selector 107 selects one of the foreground component image supplied from the foreground/background separator 105 and the foreground component image in which the amount of motion blur is adjusted supplied from the motion-blur adjusting unit 106 based on, for example, a selection signal reflecting a user's selection, and outputs the selected foreground component image.

An input image supplied to the image processing apparatus is discussed below with reference to FIGS. 3 through 18.

FIG. 3 illustrates image capturing performed by a sensor. The sensor is formed of, for example, a CCD (Charge-Coupled Device) video camera provided with a CCD area sensor, which is a solid-state image-capturing device. An object 111 corresponding to a foreground in the real world moves, for example, horizontally from the left to the right, between an object 112 corresponding to a background and the sensor.

The sensor captures the image of the object 111 corresponding to the foreground together with the image of the object 112 corresponding to the background. The sensor outputs the captured image in units of frames. For example, the sensor outputs an image having 30 frames per second. The exposure time of the sensor can be 1/30 second. The exposure time is a period from when the sensor starts converting input light into electrical charge until when the conversion from the input light to the electrical charge is finished. The exposure time is also referred to as a "shutter time".

Figure 4:
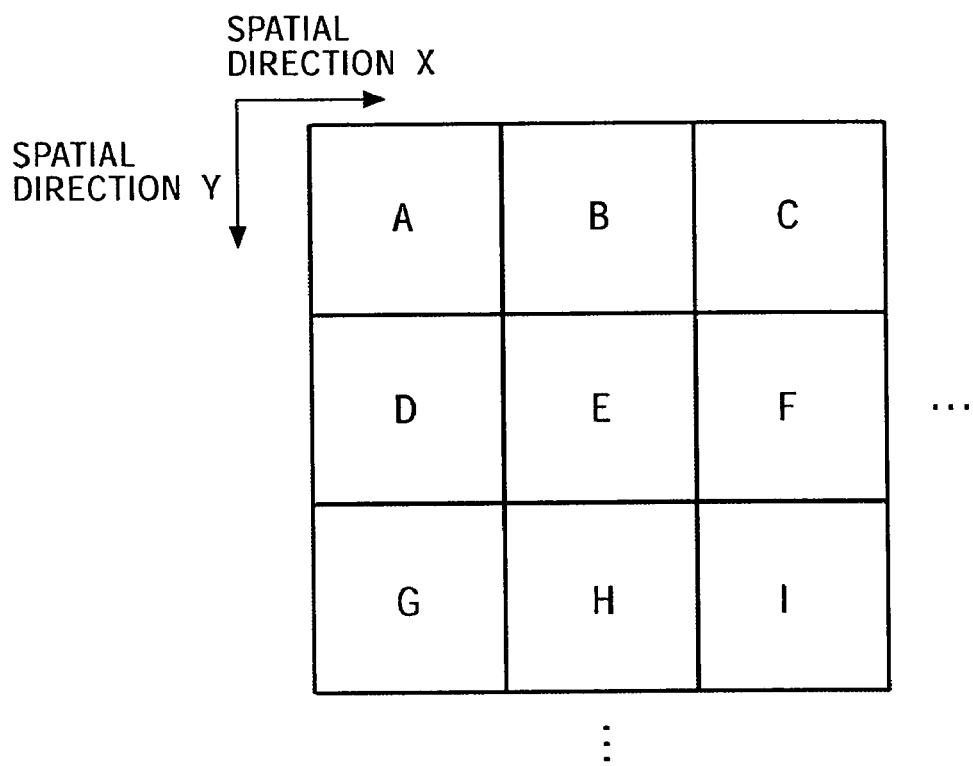
FIG. 4 illustrates the arrangement of pixels.

FIG. 4 illustrates the arrangement of pixels. In FIG. 4, A through I indicate the individual pixels. The pixels are disposed on a plane of a corresponding image. One detection device corresponding to each pixel is disposed on the sensor. When the sensor performs image capturing, each detection device outputs a pixel value of the corresponding pixel forming the image. For example, the position of the detection device in the X direction corresponds to the horizontal direction on the image, while the position of the detection device in the Y direction corresponds to the vertical direction on the image.

Figure 5:
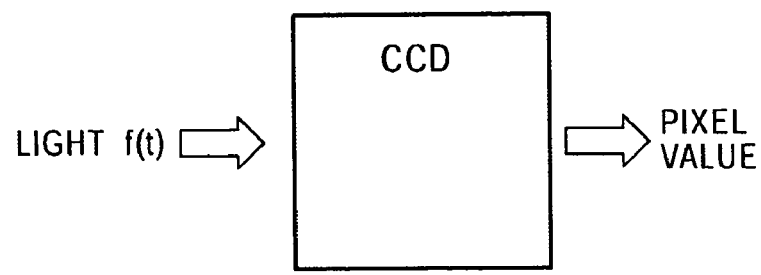
FIG. 5 illustrates the operation of a detection device.

As shown in FIG. 5, the detection device, which is, for example, a CCD, converts input light into electrical charge during a period corresponding to a shutter time, and stores the converted electrical charge. The amount of charge is almost proportional to the intensity of the input light and the period for which the light is input. The detection device sequentially adds the electrical charge converted from the input light to the stored electrical charge during the period corresponding to the shutter time. That is, the detection device integrates the input light during the period corresponding to the shutter time and stores the electrical charge corresponding to the amount of integrated light. It can be considered that the detection device has an integrating function with respect to time.

The electrical charge stored in the detection device is converted into a voltage value by a circuit (not shown), and the voltage value is further converted into a pixel value, such as digital data, and is output. Accordingly, each pixel value output from the sensor is a value projected on a linear space, which is a result of integrating a certain three-dimensional portion of the object corresponding to the foreground or the background with respect to the shutter time.

The image processing apparatus extracts significant information embedded in the output signal, for example, the mixture ratio $\alpha$, by the storage operation of the-sensor. The image processing apparatus adjusts the amount of distortion, for example, the amount of motion blur, caused by the mixture of the foreground image object itself. The image processing apparatus also adjusts the amount of distortion caused by the mixture of the foreground image object and the background image object.

Figure 6A:
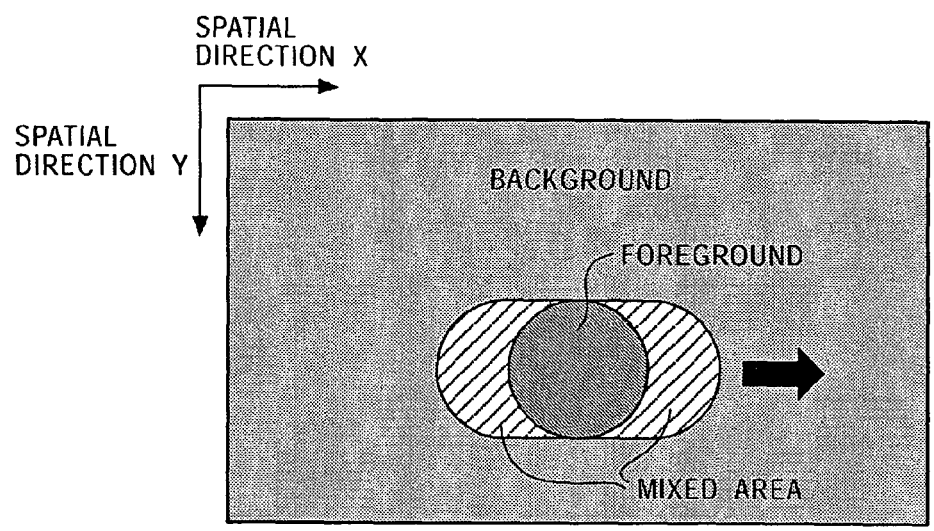
FIG. 6A illustrates an image obtained by image-capturing an object corresponding to a moving foreground and an object corresponding to a stationary background.
Figure 6B:
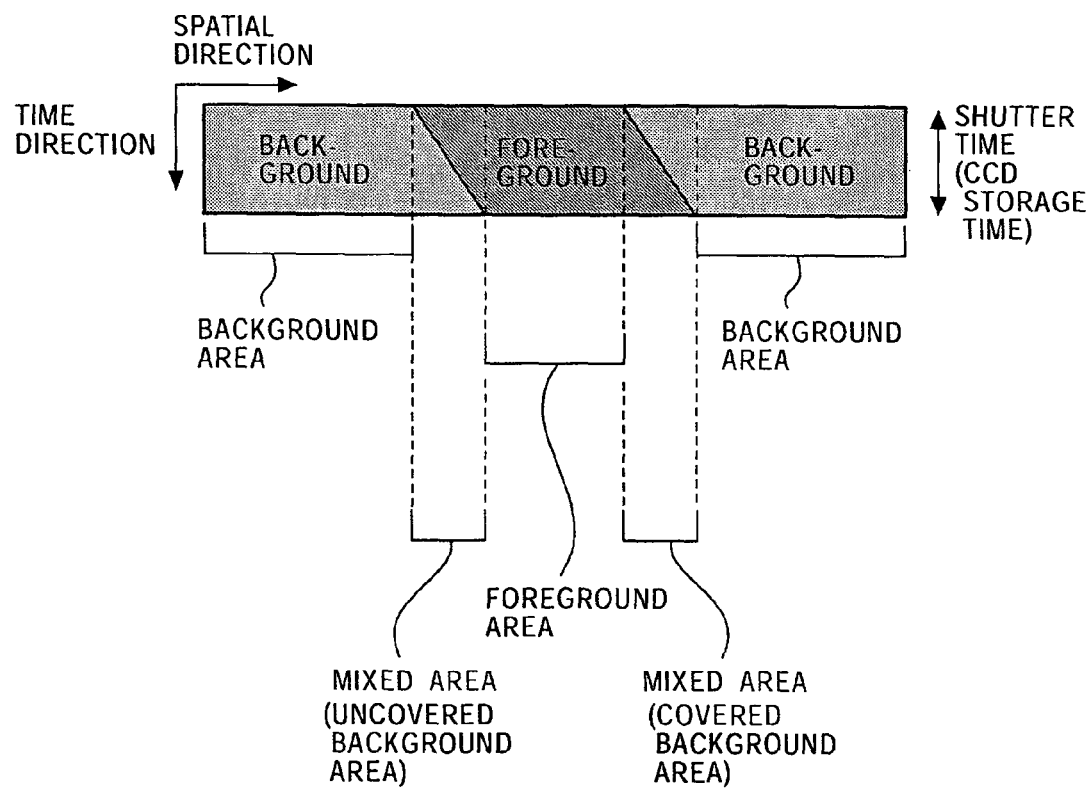
FIG. 6B illustrates a model of an image obtained by image-capturing an object corresponding to a moving foreground and an object corresponding to a stationary background.

FIG. 6A illustrates an image obtained by capturing a moving object corresponding to a foreground and a stationary object corresponding to a background. FIG. 6B illustrates an image obtained by capturing a moving object corresponding to a foreground and a stationary object corresponding to a background.

FIG. 6A illustrates an image obtained by capturing a moving object corresponding to a foreground and a stationary object corresponding to a background. In the example shown in FIG. 6A, the object corresponding to the foreground is moving horizontally from the left to the right with respect to the screen.

FIG. 6B illustrates a model obtained by expanding pixel values corresponding to one line of the image shown in FIG. 6A in the time direction. The horizontal direction shown in FIG. 6B corresponds to the spatial direction X in FIG. 6A.

The values of the pixels in the background area are formed only from the background components, that is, the image components corresponding to the background object. The values of the pixels in the foreground area are formed only from the foreground components, that is, the image components corresponding to the foreground object.

The values of the pixels of the mixed area are formed from the background components and the foreground components. Since the values of the pixels in the mixed area are formed from the background components and the foreground components, it may be referred to as a "distortion area". The mixed area is further classified into a covered background area and an uncovered background area.

The covered background area is a mixed area at a position corresponding to the leading end in the direction in which the foreground object is moving, where the background components are gradually covered with the foreground over time.

In contrast, the uncovered background area is a mixed area corresponding to the trailing end in the direction in which the foreground object is moving, where the background components gradually appear over time.

As discussed above, the image containing the foreground area, the background area, or the covered background area or the uncovered background area is input into the area specifying unit 103, the mixture-ratio calculator 104, and the foreground/background separator 105 as the input image.

Figures 7, 8:
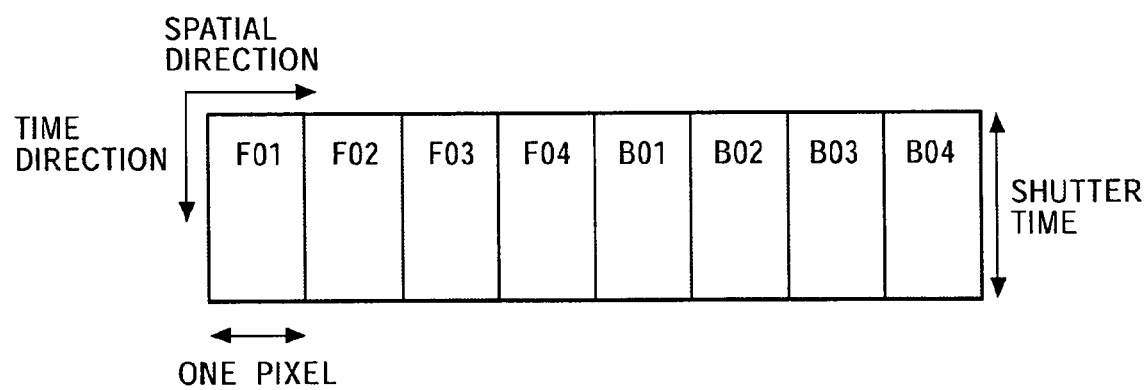
FIG. 7 illustrates a background area, a foreground area, a mixed area, a covered background area, and an uncovered background area.
FIG. 8 illustrates a model obtained by expanding in the time direction the pixel values of pixels aligned side-by-side in an image obtained by image-capturing an object corresponding to a stationary foreground and an the object corresponding to a stationary background.

FIG. 7 illustrates the background area, the foreground area, the mixed area, the covered background area, and the uncovered background area discussed above. In the areas corresponding to the image shown in FIG. 6A, the background area is a stationary portion, the foreground area is a moving portion, the covered background area of the mixed area is a portion that changes from the background to the foreground, and the uncovered background area of the mixed area is a portion that changes from the foreground to the background.

FIG. 8 illustrates a model obtained by expanding in the time direction the pixel values of the pixels aligned side-by-side in the image obtained by capturing the image of the object corresponding to the stationary foreground and the image of the object corresponding to the stationary background. For example, as the pixels aligned side-by-side, pixels arranged in one line on the screen can be selected.

The pixel values indicated by F01 through F04 shown in FIG. 8 are values of the pixels corresponding to the object of the stationary foreground. The pixel values indicated by B01 through B04 shown in FIG. 8 are values of the pixels corresponding to the object of the stationary background.

Time elapses from the top to the bottom in FIG. 8 in the vertical direction in FIG. 8. The position at the top side of the rectangle in FIG. 8 corresponds to the time at which the sensor starts converting input light into electrical charge, and the position at the bottom side of the rectangle in FIG. 8 corresponds to the time at which the conversion from the input light into the electrical charge is finished. That is, the distance from the top side to the bottom side of the rectangle in FIG. 8 corresponds to the shutter time.

The pixels shown in FIG. 8 are described below assuming that, for example, the shutter time is equal to the frame size.

The horizontal direction in FIG. 8 corresponds to the spatial direction X in FIG. 6A. More specifically, in the example shown in FIG. 8, the distance from the left side of the rectangle indicated by "F01" in FIG. 8 to the right side of the rectangle indicated by "B04", is eight times the pixel pitch, i.e., eight consecutive pixels.

When the foreground object and the background object are stationary, the light input into the sensor does not change during the period corresponding to the shutter time.

The period corresponding to the shutter time is divided into two or more portions of equal periods. For example, if the number of virtual divided portions is 4, the model shown in FIG. 8 can be represented by the model shown in FIG. 9. The number of virtual divided portions can be set according to the amount of movement v of the object corresponding to the foreground within the shutter time. For example, the number of virtual divided portions is set to 4 when the amount of movement v is 4, and the period corresponding to the shutter time is divided into four portions.

The uppermost line in FIG. 9 corresponds to the first divided period from when the shutter has opened. The second line in FIG. 9 corresponds to the second divided period from when the shutter has opened. The third line in FIG. 9 corresponds to the third divided period from when the shutter has opened. The fourth line in FIG. 9 corresponds to the fourth divided period from when the shutter has opened.

The shutter time divided in accordance with the amount of movement v is also hereinafter referred to as the "shutter time/v".

When the object corresponding to the foreground is stationary, the light input into the sensor does not change, and thus, the foreground component F01/v is equal to the value obtained by dividing the pixel value F01 by the number of virtual divided portions. Similarly, when the object corresponding to the foreground is stationary, the foreground component F02/v is equal to the value obtained by dividing the pixel value F02 by the number of virtual divided portions, the foreground component F03/v is equal to the value obtained by dividing the pixel value F03 by the number of virtual divided portions, and the foreground component F04/v is equal to the value obtained by dividing the pixel value F04 by the number of virtual divided portions.

When the object corresponding to the background is stationary, the light input into the sensor does not change, and thus, the background component B01/v is equal to the value obtained by dividing the pixel value B01 by the number of virtual divided portions. Similarly, when the object corresponding to the background is stationary, the background component B02/v is equal to the value obtained by dividing the pixel value B02 by the number of virtual divided portions, the background component B03/v is equal to the value obtained by dividing the pixel value B03 by the number of virtual divided portions, and the background component B04/v is equal to the value obtained by dividing the pixel value B04 by the number of virtual divided portions.

More specifically, when the object corresponding to the foreground is stationary, the light corresponding to the foreground object input into the sensor does not change during the period corresponding to the shutter time. Accordingly, the foreground component F01/v corresponding to the first portion of the shutter time/v from when the shutter has opened, the foreground component F01/v corresponding to the second portion of the shutter time/v from when the shutter has opened, the foreground component F01/v corresponding to the third portion of the shutter time/v from when the shutter has opened, and the foreground component F01/v corresponding to the fourth portion of the shutter time/v from when the shutter has opened become the same value. The same applies to F02/v through F04/v, as in the case of F01/v.

When the object corresponding to the background is stationary, the light corresponding to the background object input into the sensor does not change during the period corresponding to the shutter time. Accordingly, the background component B01/v corresponding to the first portion of the shutter time/v from when the shutter has opened, the background component B01/v corresponding to the second portion of the shutter time/v from when the shutter has opened, the background component B01/v corresponding to the third portion of the shutter time/v from when the shutter has opened, and the background component B01/v corresponding to the fourth portion of the shutter time/v from when the shutter has opened become the same value. The same applies to B02/v through B04/v.

A description is given of the case in which the object corresponding to the foreground is moving and the object corresponding to the background is stationary.

FIG. 10 illustrates a model obtained by expanding in the time direction the pixel values of the pixels in one line, including a covered background area, when the object corresponding to the foreground is moving to the right in FIG. 10. In FIG. 10, the amount of movement v is 4. Since one frame is a short period, it can be assumed that the object corresponding to the foreground is a rigid body moving with constant velocity. In FIG. 10, the object image corresponding to the foreground is moving such that it is positioned four pixels to the right with respect to a reference frame when it is displayed in the subsequent frame.

In FIG. 10, the pixels from the leftmost pixel to the fourth pixel belong to the foreground area. In FIG. 10, the pixels from the fifth pixel to the seventh pixel from the left belong to the mixed area, which is the covered background area. In FIG. 10, the rightmost pixel belongs to the background area.

The object corresponding to the foreground is moving such that it gradually covers the object corresponding to the background over time. Accordingly, the components contained in the pixel values of the pixels belonging to the covered background area change from the background components to the foreground components at a certain time during the period corresponding to the shutter time.

For example, the pixel value M surrounded by the thick frame in FIG. 10 is expressed by equation (1) below.

$$M = B02/v + B02/v + F07/v + F06/v \qquad (1)$$

For example, the fifth pixel from the left contains a background component corresponding to one portion of the shutter time/v and foreground components corresponding to three portions of the shutter time/v, and thus, the mixture ratio α of the fifth pixel from the left is 1/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains background components corresponding to three portions of the shutter time/v and a foreground component corresponding to one portion of the shutter time/v, and thus, the mixture ratio α of the fifth pixel from the left is 3/4.

It can be assumed that the object corresponding to the foreground is a rigid body, and the foreground object is moving with constant velocity such that it is displayed four pixels to the right in the subsequent frame. Accordingly, for example, the foreground component F07/v of the fourth pixel from the left in FIG. 10 corresponding to the first portion of the shutter time/v from when the shutter has opened is equal to the foreground component of the fifth pixel from the left in FIG. 10 corresponding to the second portion of the shutter time/v from when the shutter has opened. Similarly, the foreground component F07/v is equal to the foreground component of the sixth pixel from the left in FIG. 10 corresponding to the third portion of the shutter time/v from when the shutter has opened, and the foreground component of the seventh pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F06/v of the third pixel from the left in FIG. 10 corresponding to the first portion of the shutter time/v from when the shutter has opened is equal to the foreground component of the fourth pixel from the left in FIG. 10 corresponding to the second portion of the shutter time/v from when the shutter has opened. Similarly, the foreground component F06/v is equal to the foreground component of the fifth pixel from the left in FIG. 10 corresponding to the third portion of the shutter time/v from when the shutter has opened, and the foreground component of the sixth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F05/v of the second pixel from the left in FIG. 10 corresponding to the first portion of the shutter time/v from when the shutter has opened is equal to the foreground component of the third pixel from the left in FIG. 10 corresponding to the second portion of the shutter time/v from when the shutter has opened. Similarly, the foreground component F05/v is equal to the foreground component of the fourth pixel from the left in FIG. 10 corresponding to the third portion of the shutter time/v from when the shutter has opened, and the foreground component of the fifth pixel from the left in FIG. 10 corresponding to the fourth portion of the shutter time/v from when the shutter has opened.

It can be assumed that the object corresponding to the foreground is a rigid body, and the foreground object is moving with constant velocity such that it is displayed four pixels to the right in the subsequent frame. Accordingly, for example, the foreground component F04/v of the leftmost pixel in FIG. 10 corresponding to the first portion of the shutter time/v from when the shutter has opened is equal to the foreground component of the second pixel from the left in FIG. 10 corresponding to the second portion of the shutter time/v from when the shutter has opened. Similarly, the foreground component F04/v is equal to the foreground component of the third pixel from the left in FIG. 10 corresponding to the third portion of the shutter time/v from when the shutter has opened, and the foreground component of the fourth pixel from the left in FIG. 10 corresponding to the fourth portion of the shutter time/v from when the shutter has opened.

Since the foreground area corresponding to the moving object contains motion blur as discussed above, it can also be referred to as a "distortion area".

Figure 11:
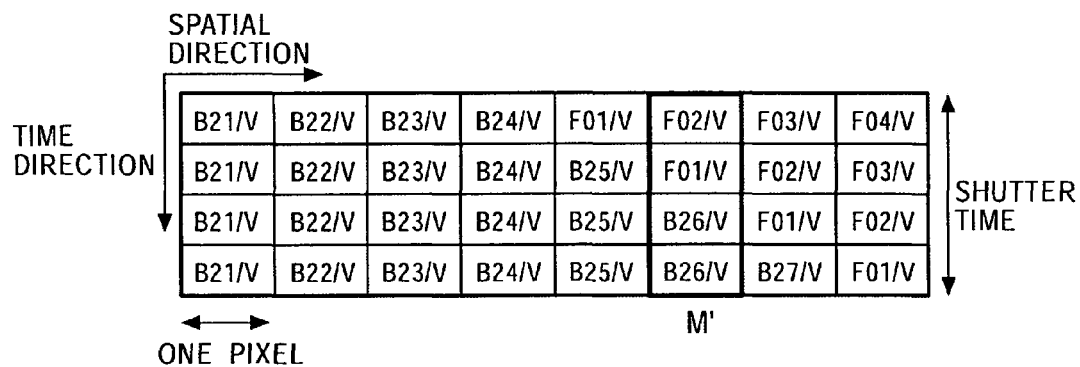
FIG. 11 illustrates a model in which pixel values are expanded in the time direction and the period corresponding to the shutter time is divided.

FIG. 11 illustrates a model obtained by expanding in the time direction the pixel values of the pixels in one line including an uncovered background area when the object corresponding to the foreground is moving to the right in FIG. 11. In FIG. 11, the amount of movement v is 4. Since one frame is a short period, it can be assumed that the object corresponding to the foreground is a rigid body moving with constant velocity. In FIG. 11, the object image corresponding to the foreground is moving to the right such that it is positioned four pixels to the right with respect to a reference frame when it is displayed in the subsequent frame.

In FIG. 11, the pixels from the leftmost pixel to the fourth pixel belong to the background area. In FIG. 11, the pixels from the fifth pixel to the seventh pixels from the left belong to the mixed area, which is an uncovered background area. In FIG. 11, the rightmost pixel belongs to the foreground area.

The object corresponding to the foreground which covers the object corresponding to the background is moving such that it is gradually removed from the object corresponding to the background over time. Accordingly, the components contained in the pixel values of the pixels belonging to the uncovered background area change from the foreground components to the background components at a certain time of the period corresponding to the shutter time.

For example, the pixel value M' surrounded by the thick frame in FIG. 11 is expressed by equation (2).

$$M'=F02/v+F01/v+B26/v+B26/v \qquad (2)$$

For example, the fifth pixel from the left contains background components corresponding to three portions of the shutter time/v and a foreground component corresponding to one shutter portion of the shutter time/v, and thus, the mixture ratio α of the fifth pixel from the left is 3/4. The sixth pixel from the left contains background components corresponding to two portions of the shutter time/v and foreground components corresponding to two portions of the shutter time/v, and thus, the mixture ratio α of the sixth pixel from the left is 1/2. The seventh pixel from the left contains a background component corresponding to one portion of the shutter time/v and foreground components corresponding to three portions of the shutter time/v, and thus, mixture ratio α of the seventh pixel from the left is 1/4.

When equations (1) and (2) are generalized, the pixel value M can be expressed by equation (3).

$$M = \alpha \cdot B + \sum_i Fi/v \qquad (3)$$

In this equation, α is the mixture ratio, B indicates a pixel value of the background, and Fi/v designates a foreground component.

It can be assumed that the object corresponding to the foreground is a rigid body, which is moving with constant velocity, and the amount of movement is 4. Accordingly, for example, the foreground component F01/v of the fifth pixel from the left in FIG. 11 corresponding to the first portion of the shutter time/v from when the shutter has opened is equal to the foreground component of the sixth pixel from the left in FIG. 11 corresponding to the second portion of the shutter time/v from when the shutter has opened. Similarly, the foreground component F01/v is equal to the foreground component of the seventh pixel from the left in FIG. 11 corresponding to the third portion of the shutter time/v from when the shutter has opened, and the foreground component of the eighth pixel from the left in FIG. 11 corresponding to the fourth portion of the shutter time/v from when the shutter has opened.

It can be assumed that the object corresponding to the foreground is a rigid body, which is moving with constant velocity, and the amount of movement v is 4. Accordingly, for example, the foreground component F02/v of the sixth pixel from the left in FIG. 11 corresponding to the first portion of the shutter time/v from when the shutter has opened is equal to the foreground component of the seventh pixel from the left in FIG. 11 corresponding to the second portion of the shutter time/v from when the shutter has opened. Similarly, the foreground component F02/v is equal to the foreground component of the eighth pixel from the left in FIG. 11 corresponding to the third portion of the shutter time/v from when the shutter has opened.

It can be assumed that the object corresponding to the foreground is a rigid body, which is moving with constant velocity, and the amount of movement v is 4. Accordingly, for example, the foreground component F03/v of the seventh pixel from the left in FIG. 11 corresponding to the first portion of the shutter time/v from when the shutter has opened is equal to the foreground component of the eighth pixel from the left in FIG. 11 corresponding to the second portion of the shutter time/v from when the shutter has opened.

It has been described with reference to FIGS. 9 through 11 that the number of virtual divided portions is 4. The number of virtual divided portions corresponds to the amount of movement v. Generally, the amount of movement v corresponds to the moving speed of the object corresponding to the foreground. For example, if the object corresponding to the foreground is moving such that it is displayed four pixels to the right with respect to a certain frame when it is positioned in the subsequent frame, the amount of movement v is set to 4. The number of virtual divided portions is set to 4 in accordance with the amount of movement v. Similarly, when the object corresponding to the foreground is moving such that it is displayed six pixels to the left with respect to a certain frame when it is positioned in the subsequent frame, the amount of movement v is set to 6, and the number of virtual divided portions is set to 6.

Figure 12:
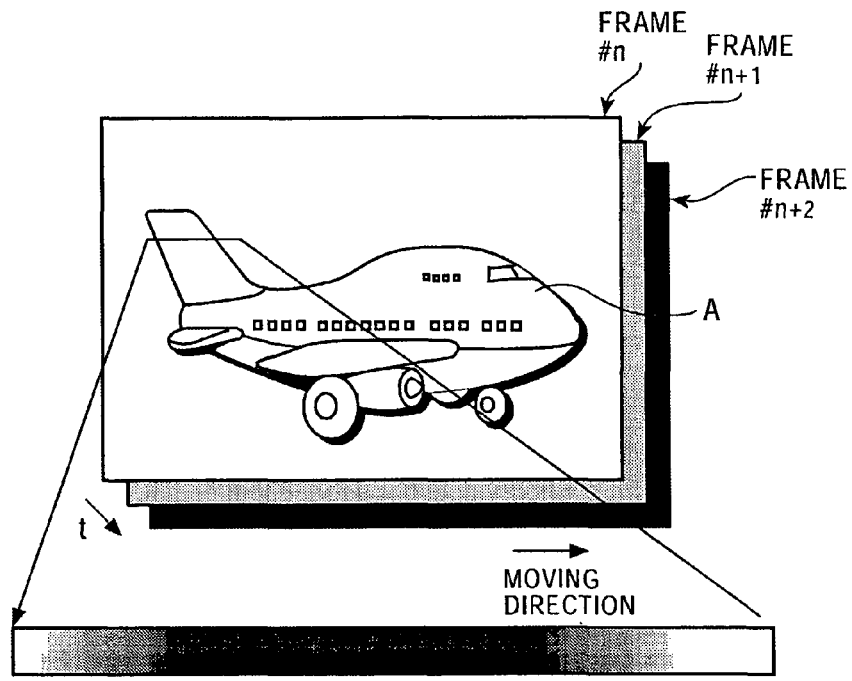
FIG. 12 illustrates an example in which pixels in a foreground area, a background area, and a mixed area are extracted.
Figure 13:
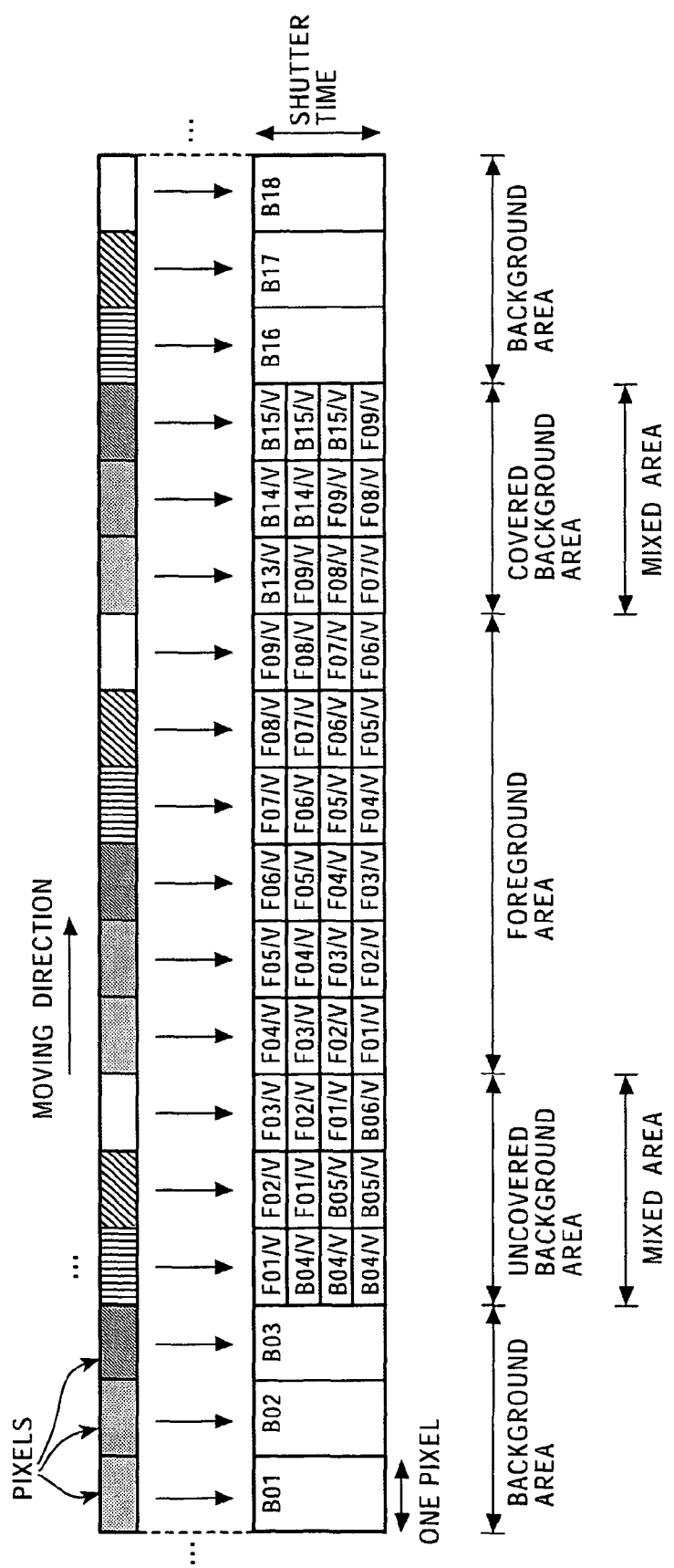
FIG. 13 illustrates the relationships between pixels and a model obtained by expanding the pixel values in the time direction.

FIGS. 12 and 13 illustrate the relationship of the foreground area, the background area, and the mixed area which consists of a covered background or an uncovered background, which are discussed above, to the foreground components and the background components corresponding to the divided periods of the shutter time.

FIG. 12 illustrates an example in which pixels in the foreground area, the background area, and the mixed area are extracted from an image containing a foreground corresponding to an object moving in front of a stationary background. In the example shown in FIG. 12, the object corresponding to the foreground indicated by A is horizontally moving with respect to the screen.

Frame #n+1 is a frame subsequent to frame #n, and frame #n+2 is a frame subsequent to frame #n+1.

Pixels in the foreground area, the background area, and the mixed area are extracted from one of frames #n through #n+2, and the amount of movement v is set to 4. A model obtained by expanding the pixel values of the extracted pixels in the time direction is shown in FIG. 13.

Since the object corresponding to the foreground is moving, the pixel values in the foreground area are formed of four different foreground components corresponding to the shutter time/v. For example, the leftmost pixel of the pixels in the foreground area shown in FIG. 13 consists of F01/v, F02/v, F03/v, and F04/v. That is, the pixels in the foreground contain motion blur.

Since the object corresponding to the background is stationary, light input into the sensor corresponding to the background during the shutter time does not change. In this case, the pixel values in the background area do not contain motion blur.

The pixel values in the mixed area consisting of a covered background area or an uncovered background area are formed of foreground components and background components.

A description is given below of a model obtained by expanding in the time direction the pixel values of the pixels which are aligned side-by-side in a plurality of frames and which are located at the same positions in the frames when the image corresponding to the object is moving. For example, when the image corresponding to the object is moving horizontally with respect to the screen, pixels aligned on the screen can be selected as the pixels aligned side-by-side.

Figure 14:
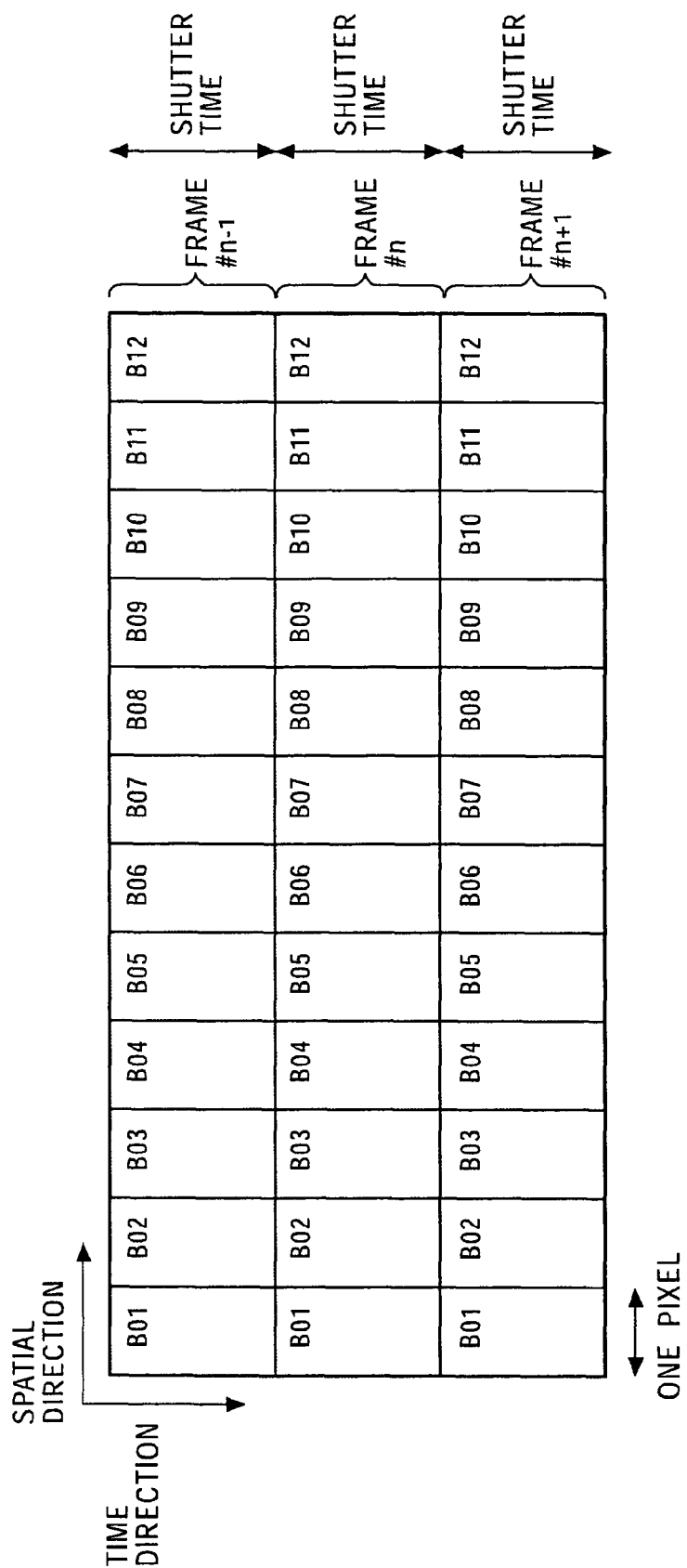
FIG. 14 illustrates a model in which pixel values are expanded in the time direction and the period corresponding to the shutter time is divided.

FIG. 14 illustrates a model obtained by expanding in the time direction the pixels which are aligned side-by-side in three frames of an image obtained by capturing an object corresponding to a stationary background and which are located at the same positions in the frames. Frame #n is the frame subsequent to frame #n−1, and frame #n+1 is the frame subsequent to frame #n. The same applies to the other frames.

The pixel values B01 through B12 shown in FIG. 14 are pixel values corresponding to the stationary background object. Since the object corresponding to the background is stationary, the pixel values of the corresponding pixels in frame #n−1 through frame #n+1 do not change. For example, the pixel in frame #n and the pixel in frame #n+1 located at the corresponding position of the pixel having the pixel value B05 in frame #n−1 have the pixel value B05.

Figure 15:
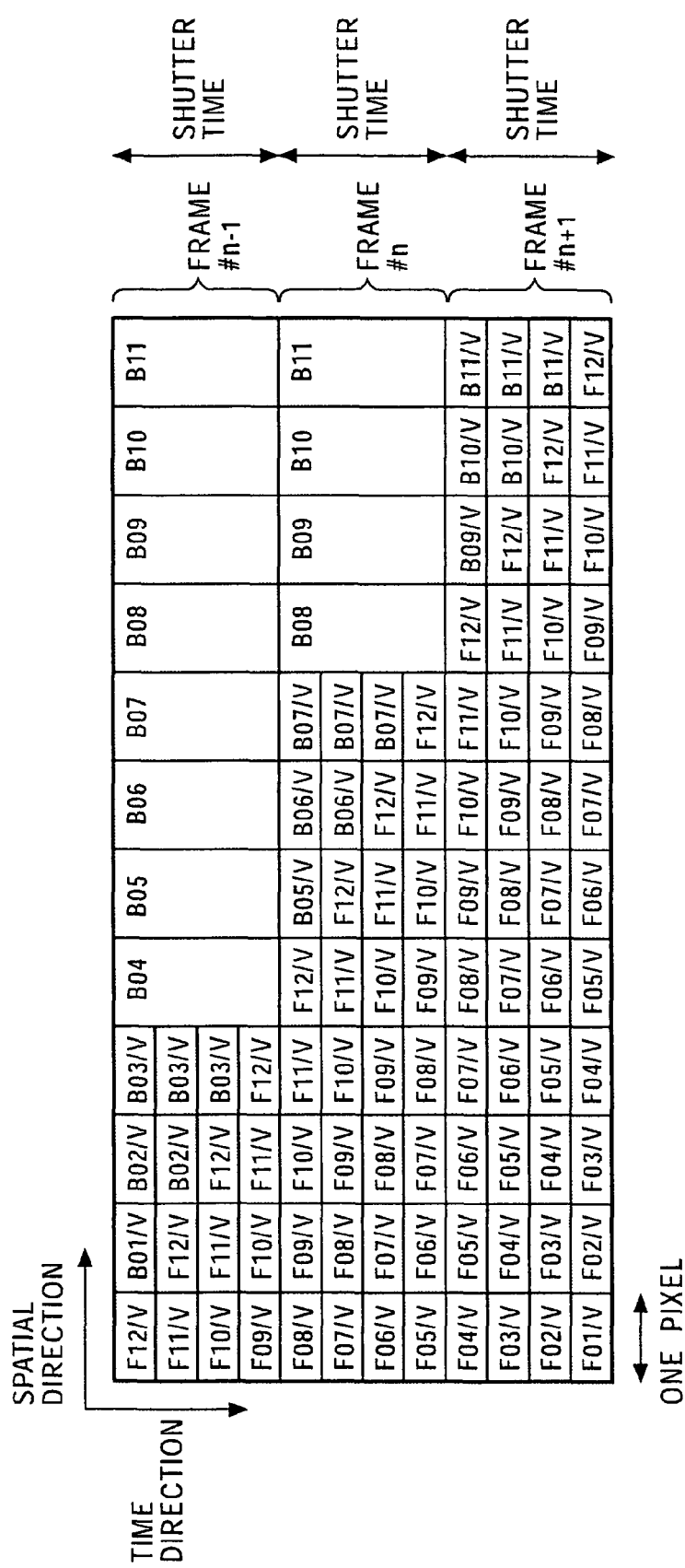
FIG. 15 illustrates a model in which pixel values are expanded in the time direction and the period corresponding to the shutter time is divided.

FIG. 15 illustrates a model obtained by expanding in the time direction the pixels which are aligned side-by-side in three frames of an image obtained by capturing an object corresponding to a foreground that is moving to the right in FIG. 15 together with an object corresponding to a stationary background and which are located at the same positions in the frames. The model shown in FIG. 15 contains a covered background area.

In FIG. 15, it can be assumed that the object corresponding to the foreground is a rigid body moving with constant velocity, and that it is moving such that it is displayed four pixels to the right in the subsequent frame. Accordingly, the amount of movement v is 4, and the number of virtual divided portions is 4.

For example, the foreground component of the leftmost pixel of frame #n−1 in FIG. 15 corresponding to the first portion of the shutter time/v from when the shutter has opened is F12/v, and the foreground component of the second pixel from the left in FIG. 15 corresponding to the second portion of the shutter time/v from when the shutter has opened is also F12/v. The foreground component of the third pixel from the left in FIG. 15 corresponding to the third portion of the shutter time/v from when the shutter has opened and the foreground component of the fourth pixel from the left in FIG. 15 corresponding to the fourth portion of the shutter time/v from when the shutter has opened are F12/v.

The foreground component of the leftmost pixel of frame #n−1 in FIG. 15 corresponding to the second portion of the shutter time/v from when the shutter has opened is F11/v. The foreground component of the second pixel from the left in FIG. 15 corresponding to the third portion of the shutter time/v from when the shutter has opened is also F11/v. The foreground component of the third pixel from the left in FIG. 15 corresponding to the fourth portion of the shutter time/v from when the shutter has opened is F11/v.

The foreground component of the leftmost pixel of frame #n−1 in FIG. 15 corresponding to the third portion of the shutter time/v from when the shutter has opened is F10/v. The foreground component of the second pixel from the left in FIG. 15 corresponding to the fourth portion of the shutter time/v from when the shutter has opened is also F10/v. The foreground component of the leftmost pixel of frame #n−1 in FIG. 15 corresponding to the fourth portion of the shutter time/v from when the shutter has opened is F09/v.

Since the object corresponding to the background is stationary, the background component of the second pixel from the left of frame #n−1 in FIG. 15 corresponding to the first portion of the shutter time/v from when the shutter has opened is B01/v. The background components of the third pixel from the left of frame #n−1 in FIG. 15 corresponding to the first and second portions of the shutter time/v from when the shutter has opened are B02/v. The background components of the fourth pixel from the left of frame #n−1 in FIG. 15 corresponding to the first through third portions of the shutter time/v from when the shutter has opened are B03/v.

In frame #n−1 in FIG. 15, the leftmost pixel from the left, belongs to the foreground area, and the second through fourth pixels from the left belong to the mixed area, which is a covered background area.

The fifth through twelfth pixels from the left of frame #n−1 in FIG. 15 belong to the background area, and the pixel values thereof are B04 through B11, respectively.

The first through fifth pixels from the left in frame #n in FIG. 15 belong to the foreground area. The foreground component in the shutter time/v in the foreground area of frame #n is any one of F05/v through F12/v.

It can be assumed that the object corresponding to the foreground is a rigid body moving with constant velocity, and that it is moving such that the foreground image is displayed four pixels to the right in the subsequent frame. Accordingly, the foreground component of the fifth pixel from the left of frame #n in FIG. 15 corresponding to the first portion of the shutter time/v from when the shutter has opened is F12/v, and the foreground component of the sixth pixel from the left in FIG. 15 corresponding to the second portion of the shutter time/v from when the shutter has opened is also F12/v. The foreground component of the seventh pixel from the left in FIG. 15 corresponding to the third portion of the shutter time/v from when the shutter has opened and the foreground component of the eighth pixel from the left in FIG. 15 corresponding to the fourth portion of the shutter time/v from when the shutter has opened are F12/v.

The foreground component of the fifth pixel from the left of frame #n in FIG. 15 corresponding to the second portion of the shutter time/v from when the shutter has opened is F11/v. The foreground component of the sixth pixel from the left in FIG. 15 corresponding to the third portion of the shutter time/v from when the shutter has opened is also F11/v. The foreground component of the seventh pixel from the left in FIG. 15 corresponding to the fourth portion of the shutter time/v from when the shutter has opened is F11/v.

The foreground component of the fifth pixel from the left of frame #n in FIG. 15 corresponding to the third portion of the shutter time/v from when the shutter has opened is F10/v. The foreground component of the sixth pixel from the left in FIG. 15 corresponding to the fourth portion of the shutter time/v from when the shutter has opened is also F10/v. The foreground component of the fifth pixel from the left of frame #n in FIG. 15 corresponding to the fourth portion of the shutter time/v from when the shutter has opened is F09/v.

Since the object corresponding to the background is stationary, the background component of the sixth pixel from the left of frame #n in FIG. 15 corresponding to the first portion of the shutter time/v from when the shutter has opened is B05/v. The background components of the seventh pixel from the left of frame #n in FIG. 15 corresponding to the first and second portions of the shutter time/v from when the shutter has opened are B06/v. The background components of the eighth pixel from the left of frame #n in FIG. 15 corresponding to the first through third portion of the shutter time/v from when the shutter has opened are B07/v.

In frame #n in FIG. 15, the sixth through eighth pixels from the left belong to the mixed area, which is a covered background area.

The ninth through twelfth pixels from the left of frame #n in FIG. 15 belong to the background area, and the pixel values thereof are B08 through B11, respectively.

The first through ninth pixels from the left in frame #n+1 in FIG. 15 belong to the foreground area. The foreground component in the shutter time/v in the foreground area of frame #n+1 is any one of F01/v through F12/v.

It can be assumed that the object corresponding to the foreground is a rigid body moving with constant velocity, and that it is moving such that the foreground image is displayed four pixels to the right in the subsequent frame. Accordingly, the foreground component of the ninth pixel from the left of frame #n+1 in FIG. 15 corresponding to the first portion of the shutter time/v from when the shutter has opened is F12/v, and the foreground component of the tenth pixel from the left in FIG. 15 corresponding to the second portion of the shutter time/v from when the shutter has opened is also F12/v. The foreground component of the eleventh pixel from the left in FIG. 15 corresponding to the third portion of the shutter time/v from when the shutter has opened and the foreground component of the twelfth pixel from the left in FIG. 15 corresponding to the fourth portion of the shutter time/v from when the shutter has opened are F12/v.

The foreground component of the ninth pixel from the left of frame #n+1 in FIG. 15 corresponding to the second portion of the shutter time/v from when the shutter has opened is F11/v. The foreground component of the tenth pixel from the left in FIG. 15 corresponding to the third portion of the shutter time/v from when the shutter has opened is also F11/v. The foreground component of the eleventh pixel from the left in FIG. 15 corresponding to the fourth portion of the shutter time/v from when the shutter has opened is F11/v.

The foreground component of the ninth pixel from the left of frame #n+1 in FIG. 15 corresponding to the third portion of the shutter time/v from when the shutter has opened is F10/v. The foreground component of the tenth pixel from the left in FIG. 15 corresponding to the fourth portion of the shutter time/v from when the shutter has opened is also F10/v. The foreground component of the ninth pixel from the left of frame #n+1 in FIG. 15 corresponding to the fourth portion of the shutter time/v from when the shutter has opened is F09/v.

Since the object corresponding to the background is stationary, the background component of the tenth pixel from the left of frame #n+1 in FIG. 15 corresponding to the first portion of the shutter time/v from when the shutter has opened is B09/v. The background components of the eleventh pixel from the left of frame #n+1 in FIG. 15 corresponding to the first and second portions of the shutter time/v from when the shutter has opened are B10/v. The background components of the twelfth pixel from the left of frame #n+1 in FIG. 15 corresponding to the first through third portion of the shutter time/v from when the shutter has opened are B11/v.

In frame #n+1 in FIG. 15, the tenth through twelfth pixels from the left belong to the mixed area, which is a covered background area.

Figure 16:
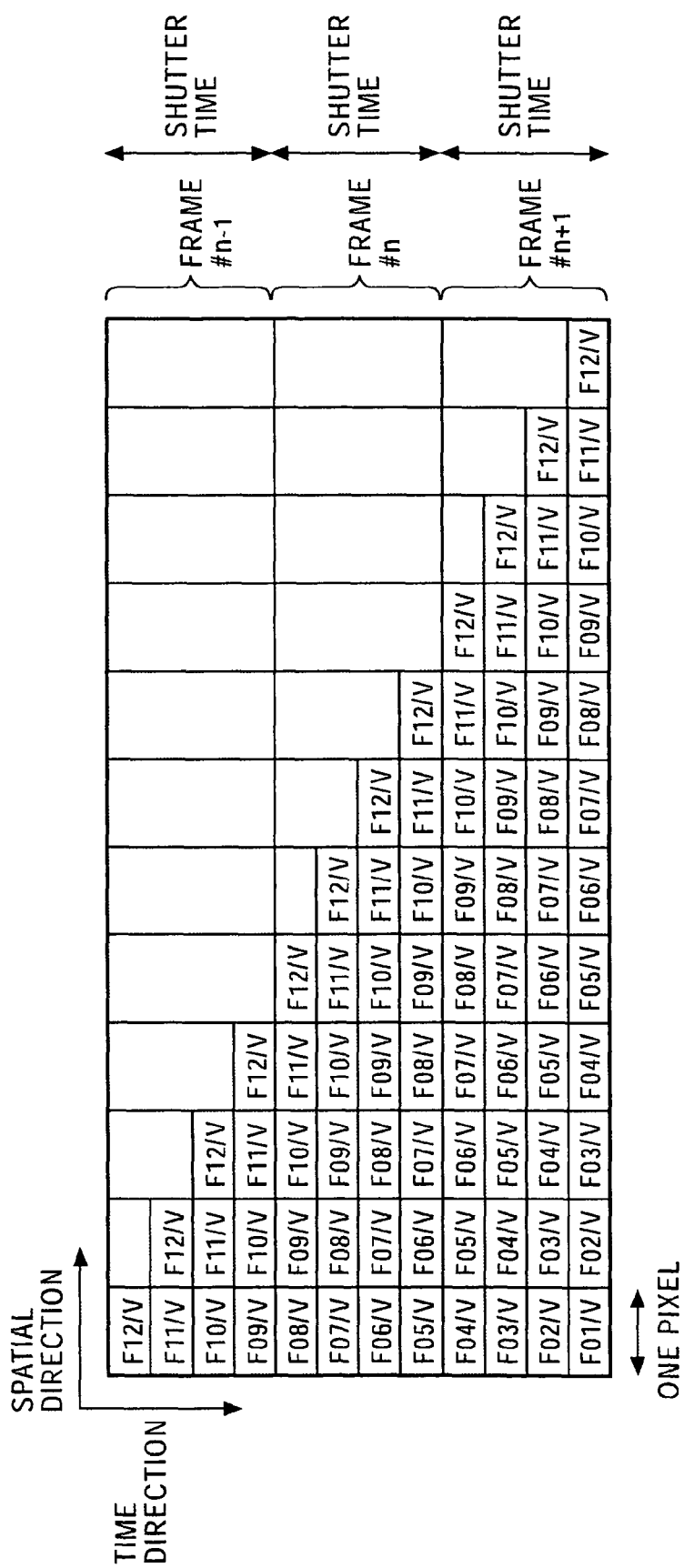
FIG. 16 illustrates a model in which pixel values are expanded in the time direction and the period corresponding to the shutter time is divided.

FIG. 16 is a model of an image obtained by extracting the foreground components from the pixel values shown in FIG. 15.

Figure 17:
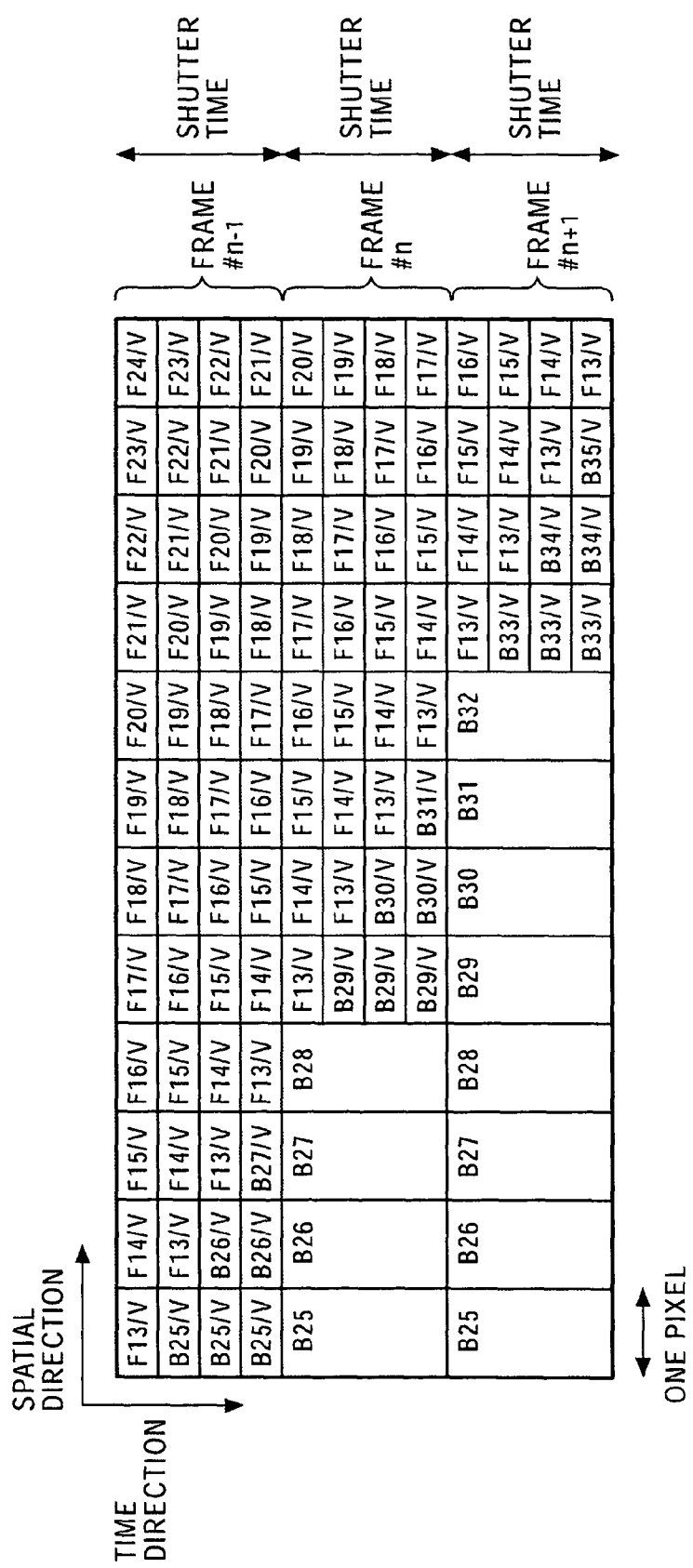
FIG. 17 illustrates a model in which pixel values are expanded in the time direction and the period corresponding to the shutter time is divided.

FIG. 17 illustrates a model obtained by expanding in the time direction the pixels which are aligned side-by-side in three frames of an image obtained by capturing an object corresponding to a foreground that is moving to the right in FIG. 17 together with an object corresponding to a stationary background and which are located at the same positions in the frames. The model shown in FIG. 17 contains an uncovered background area.

In FIG. 17, it can be assumed that the object corresponding to the foreground is a rigid body moving with constant velocity, and that it is moving such that it is displayed four pixels to the right in the subsequent frame. Accordingly, the amount of movement v is 4.

For example, the foreground component of the leftmost pixel of frame #n−1 in FIG. 17 corresponding to the first portion of the shutter time/v from when the shutter has opened is F13/v, and the foreground component of the second pixel from the left in FIG. 17 corresponding to the second portion of the shutter time/v from when the shutter has opened is also F13/v. The foreground component of the third pixel from the left in FIG. 17 corresponding to the third portion of the shutter time/v from when the shutter has opened and the foreground component of the fourth pixel from the left in FIG. 17 corresponding to the fourth portion of the shutter time/v from when the shutter has opened are F13/v.

The foreground component of the second pixel from the left of frame #n−1 in FIG. 17 corresponding to the first portion of the shutter time/v from when the shutter has opened is F14/v. The foreground component of the third pixel from the left in FIG. 17 corresponding to the second portion of the shutter time/v from when the shutter has opened is also F14/v. The foreground component of the third pixel from the left in FIG. 17 corresponding to the first portion of the shutter time/v from when the shutter has opened is F15/v.

Since the object corresponding to the background is stationary, the background components of the leftmost pixel of frame #n−1 in FIG. 17 corresponding to the second through fourth portions of the shutter time/v from when the shutter has opened are B25/v. The background components of the second pixel from the left of frame #n−1 in FIG. 17 corresponding to the third and fourth portions of the shutter time/v from when the shutter has opened are B26/v. The background component of the third pixel from the left of frame #n−1 in FIG. 17 corresponding to the fourth portion of the shutter time/v from when the shutter has opened is B27/v.

In frame #n−1 in FIG. 17, the leftmost pixel through the third pixel belong to the mixed area, which is an uncovered background area.

The fourth through twelfth pixels from the left of frame #n−1 in FIG. 17 belong to the foreground area. The foreground component of the frame is any one of F13/v through F24/v.

The leftmost pixel through the fourth pixel from the left of frame #n in FIG. 17 belong to the background area, and the pixel values thereof are B25 through B28, respectively.

It can be assumed that the object corresponding to the foreground is a rigid body moving with constant velocity, and that it is moving such that it is displayed four pixels to the right in the subsequent frame. Accordingly, the foreground component of the fifth pixel from the left of frame #n in FIG. 17 corresponding to the first portion of the shutter time/v from when the shutter has opened is F13/v, and the foreground component of the sixth pixel from the left in FIG. 17 corresponding to the second portion of the shutter time/v from when the shutter has opened is also F13/v. The foreground component of the seventh pixel from the left in FIG. 17 corresponding to the third portion of the shutter time/v from when the shutter has opened and the foreground component of the eighth pixel from the left in FIG. 17 corresponding to the fourth portion of the shutter time/v from when the shutter has opened are F13/v.

The foreground component of the sixth pixel from the left of frame #n in FIG. 17 corresponding to the first portion of the shutter time/v from when the shutter has opened is F14/v. The foreground component of the seventh pixel from the left in FIG. 17 corresponding to the second portion of the shutter time/v from when the shutter has opened is also F14/v. The foreground component of the eighth pixel from the left in FIG. 17 corresponding to the first portion of the shutter time/v from when the shutter has opened is F15/v.

Since the object corresponding to the background is stationary, the background components of the fifth pixel from the left of frame #n in FIG. 17 corresponding to the second through fourth portions of the shutter time/v from when the shutter has opened are B29/v. The background components of the sixth pixel from the left of frame #n in FIG. 17 corresponding to the third and fourth portions of the shutter time/v from when the shutter has opened are B30/v. The background component of the seventh pixel from the left of frame #n in FIG. 17 corresponding to the fourth portion of the shutter time/v from when the shutter has opened is B31/v.

In frame #n in FIG. 17, the fifth pixel through the seventh pixel from the left belong to the mixed area, which is an uncovered background area.

The eighth through twelfth pixels from the left of frame #n in FIG. 17 belong to the foreground area. The value in the foreground area of frame #n corresponding to the period of the shutter time/v is any one of F13/v through F20/v.

The leftmost pixel through the eighth pixel from the left of frame #n+1 in FIG. 17 belong to the background area, and the pixel values thereof are B25 through B32, respectively.

It can be assumed that the object corresponding to the foreground is a rigid body moving with constant velocity, and that it is moving such that it is displayed four pixels to the right in the subsequent frame. Accordingly, the foreground component of the ninth pixel from the left of frame #n+1 in FIG. 17 corresponding to the first portion of the shutter time/v from when the shutter has opened is F13/v, and the foreground component of the tenth pixel from the left in FIG. 17 corresponding to the second portion of the shutter time/v from when the shutter has opened is also F13/v. The foreground component of the eleventh pixel from the left in FIG. 17 corresponding to the third portion of the shutter time/v from when the shutter has opened and the foreground component of the twelfth pixel from the left in FIG. 17 corresponding to the fourth portion of the shutter time/v from when the shutter has opened are F13/v.

The foreground component of the tenth pixel from the left of frame #n+1 in FIG. 17 corresponding to the first portion of the shutter time/v from when the shutter has opened is F14/v. The foreground component of the eleventh pixel from the left in FIG. 17 corresponding to the second portion of the shutter time/v from when the shutter has opened is also F14/v. The foreground component of the twelfth pixel from the left in FIG. 17 corresponding to the first portion of the shutter time/v from when the shutter has opened is F15/v.

Since the object corresponding to the background is stationary, the background components of the ninth pixel from the left of frame #n+1 in FIG. 17 corresponding to the second through fourth portions of the shutter time/v from when the shutter has opened are B33/v. The background components of the tenth pixel from the left of frame #n+1 in FIG. 17 corresponding to the third and fourth portions of the shutter time/v from when the shutter has opened are B34/v. The background component of the eleventh pixel from the left of frame #n+1 in FIG. 17 corresponding to the fourth portion of the shutter time/v from when the shutter has opened is B35/v.

In frame #n+1 in FIG. 17, the ninth through eleventh pixels from the left in FIG. 17 belong to the mixed area, which is an uncovered background area.

The twelfth pixel from the left of frame #n+1 in FIG. 17 belongs to the foreground area. The foreground component in the shutter time/v in the foreground area of frame #n+1 is any one of F13 through F16, respectively.

Figure 18:
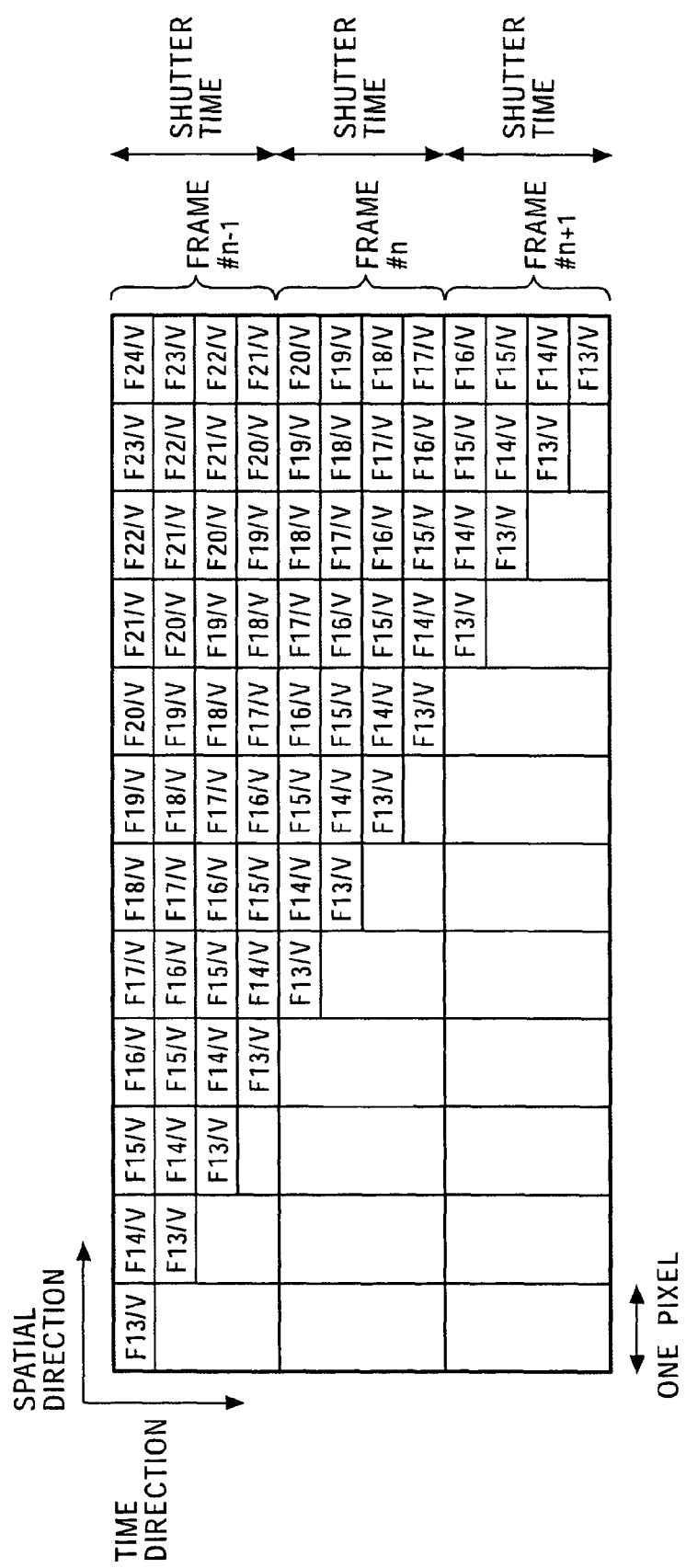
FIG. 18 illustrates a model in which pixel values are expanded in the time direction and the period corresponding to the shutter time is divided.

FIG. 18 illustrates a model of an image obtained by extracting the foreground components from the pixel values shown in FIG. 17.

Referring back to FIG. 2, based on the input image and the motion vector and the positional information thereof supplied from the motion detector 102, the mixture-ratio calculator 103 generates the estimated mixture ratio and the corresponding mixture-ratio related information when it is assumed that the pixel belongs to the covered background area, and also generates the estimated mixture ratio, which is the mixture ratio to be estimated, and the corresponding mixture-ratio related information when it is assumed that the pixel belongs to the uncovered background area. The mixture-ratio calculator 103 supplies the two generated estimated mixture ratios and the corresponding mixture-ratio related information to the area specifying unit 104.

The area specifying unit 104 specifies each pixel of the input image as the foreground area, the background area, or the mixed area based on the input image and the two estimated mixture ratios and the corresponding mixture-ratio related information supplied from the mixture-ratio calculator 103, and supplies the area information indicating to which of the foreground area, the background area, or the mixed area each pixel belongs to the foreground/background separator 105 and the motion-blur adjusting unit 106.

The foreground/background separator 105 extracts the foreground component image consisting of only the foreground components based on the pixel values of a plurality of frames, the area information, and the mixture ratio α, and supplies the foreground component image to the motion-blur adjusting unit 106.

The motion-blur adjusting unit 106 adjusts the amount of motion blur contained in the foreground component image based on the foreground component image supplied from the foreground/background separator 105, the motion vector supplied from the motion detector 102, and the area information supplied from the area specifying unit 104, and then outputs the foreground component image in which motion blur is adjusted.

Figure 19:
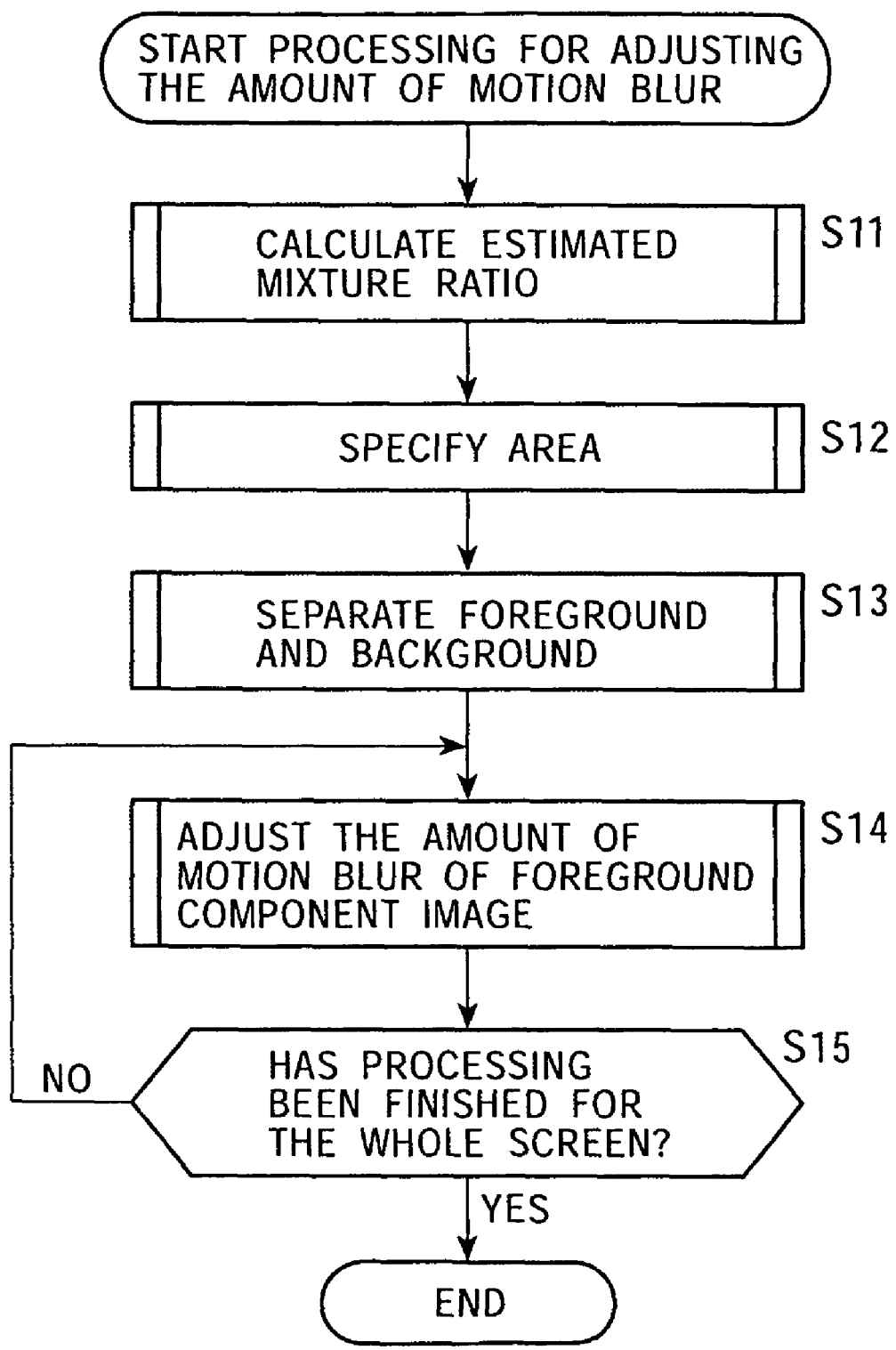
FIG. 19 is a flowchart illustrating the processing for adjusting the amount of motion blur.

The processing for adjusting the amount of motion blur performed by the image processing apparatus is described below with reference to the flowchart of FIG. 19. In step S11, based on the input image and the motion vector and the positional information thereof supplied from the motion detector 102, the mixture-ratio calculator 103 calculates the estimated mixture ratio and the corresponding mixture-ratio related information when it is assumed that the pixel belongs to the covered background area, and also calculates the estimated mixture ratio and the corresponding mixture-ratio related information when it is assumed that the pixel belongs to the uncovered background area. The mixture-ratio calculator 103 supplies the two calculated estimated mixture ratios and the corresponding mixture-ratio related information to the area specifying unit 104. Details of the mixture-ratio calculation processing are given below.

In step S12, the area specifying unit 104 performs, based on the input image and the two estimated mixture ratios and the corresponding mixture-ratio related information supplied from the mixture-ratio calculator 103, area specifying processing for generating area information indicating to which of the foreground area, the background area, the covered background area, or the uncovered background area each pixel of the input image belongs. Details of the area specifying processing are given below. The area specifying unit 104 generates the mixture ratio α based on the generated area information, and the two estimated mixture ratios and the corresponding mixture-ratio related information supplied from the mixture-ratio calculator 103, and supplies the generated mixture ratio α to the foreground/background separator 105.

In step S13, the foreground/background separator 105 extracts the foreground components from the input image based on the area information and the mixture ratio α, and supplies the foreground components to the motion-blur adjusting unit 106 as the foreground component image.

In step S14, the motion-blur adjusting unit 106 generates, based on the motion vector and the area information, the unit of processing that indicates the positions of consecutive pixels disposed in the moving direction and belonging to any of the uncovered background area, the foreground area, and the covered background area, and adjusts the amount of motion blur contained in the foreground components corresponding to the unit of processing. Details of the processing for adjusting the amount of motion blur are given below.

In step S15, the image processing apparatus determines whether the processing is finished for the whole screen. If it is determined that the processing is not finished for the whole screen, the process proceeds to step S14, and the processing for adjusting the amount of motion blur for the foreground components corresponding to the unit of processing is repeated.

If it is determined in step S15 that the processing is finished for the whole screen, the processing is completed.

In this manner, the image processing apparatus is capable of adjusting the amount of motion blur contained in the foreground by separating the foreground and the background. That is, the image processing apparatus is capable of adjusting the amount of motion blur contained in sampled data indicating the pixel values of the foreground pixels.

The configuration of each of the mixture-ratio calculator 103, the area specifying unit 104, the foreground/background separator 105, and the motion-blur adjusting unit 106 is described below.

Figure 20:
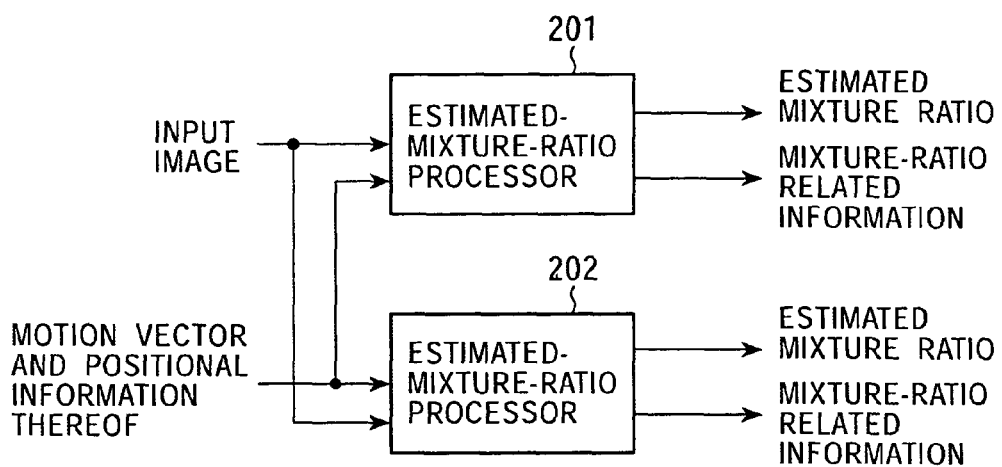
FIG. 20 is a block diagram illustrating the configuration of a mixture-ratio calculator 103.

FIG. 20 is a block diagram illustrating the configuration of the mixture-ratio calculator 103. An estimated-mixture-ratio processor 201 calculates an estimated mixture ratio for each pixel by calculation corresponding to a model of a covered background area based on the motion vector and the positional information thereof supplied from the motion detector 102 and the input image, and outputs the estimated mixture ratio together with the mixture-ratio related information, which is determined with the calculation of the estimated mixture ratio. The mixture-ratio related information output from the estimated-mixture-ratio processor 201 is, for example, the sum of foreground components.

An estimated-mixture-ratio processor 202 calculates an estimated mixture ratio for each pixel by calculation corresponding to a model of an uncovered background area based on the motion vector and the positional information thereof supplied from the motion detector 102 and the input image, and outputs the estimated mixture ratio together with the mixture-ratio related information, which is determined with the calculation of the estimated mixture ratio. The mixture-ratio related information output from the estimated-mixture-ratio processor 202 is, for example, the sum of foreground components.

Since it can be assumed that the object corresponding to the foreground is moving with constant velocity within the shutter time, the mixture ratio $\alpha$ of the pixels belonging to a mixed area exhibits the following characteristics. That is, the mixture ratio $\alpha$ linearly changes according to the positional change in the pixels. If the positional change in the pixels is one-dimensional, a change in the mixture ratio $\alpha$ can be represented linearly. If the positional change in the pixels is two-dimensional, a change in the mixture ratio $\alpha$ can be represented on a plane.

Since the period of one frame is short, it can be assumed that the object corresponding to the foreground is a rigid body moving with constant velocity.

The gradient of the mixture ratio $\alpha$ is inversely proportional to the amount of movement v within the shutter time of the foreground.

Figure 21:
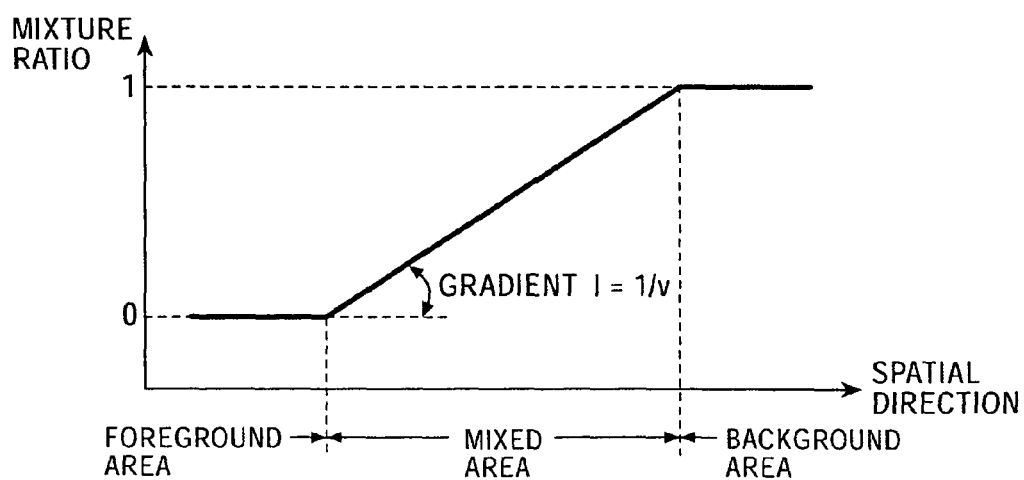
FIG. 21 illustrates an example of the ideal mixture ratio $\alpha$.

An example of the ideal mixture ratio $\alpha$ is shown in FIG. 21. The gradient l of the ideal mixture ratio $\alpha$ in the mixed area can be represented by the reciprocal of the amount of movement v.

As shown in FIG. 21, the ideal mixture ratio $\alpha$ has the value of 1 in the background area, the value of 0 in the foreground area, and the value of greater than 0 and smaller than 1 in the mixed area.

Figure 22:
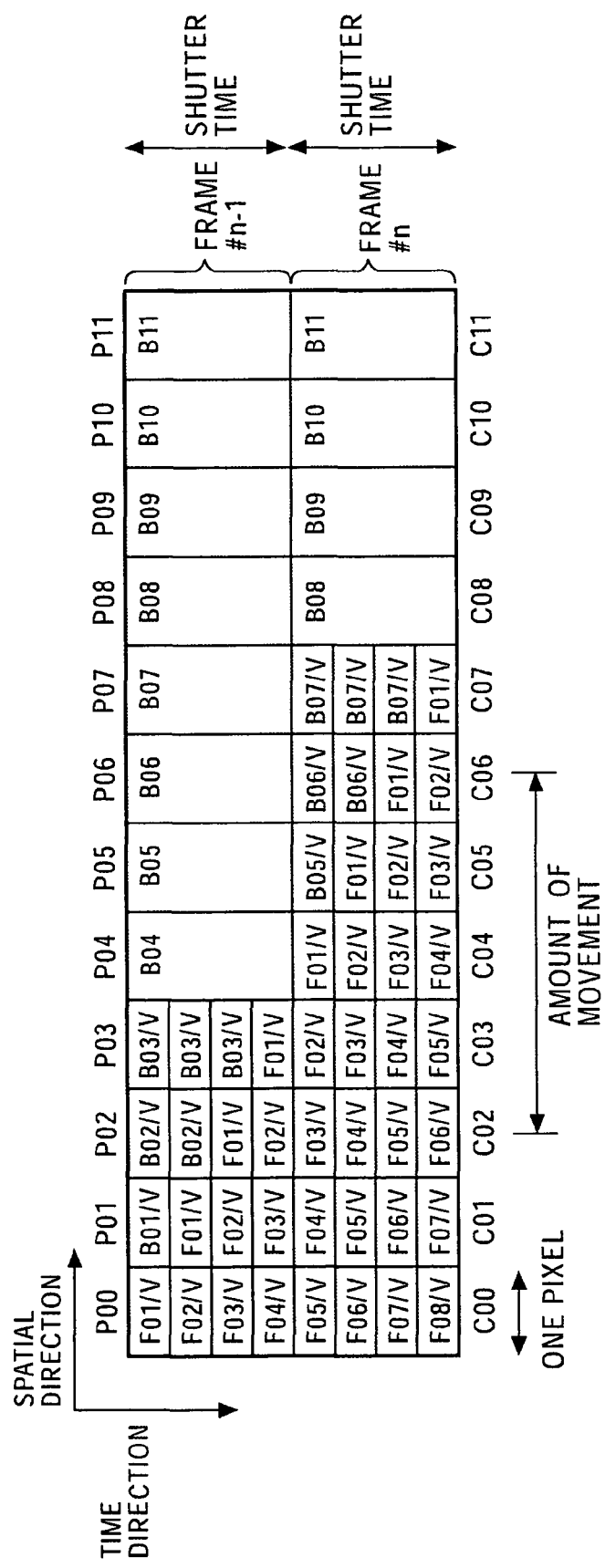
FIG. 22 illustrates a model in which pixel values are expanded in the time direction and the period corresponding to the shutter time is divided.

In the example shown in FIG. 22, the pixel value C06 of the seventh pixel from the left in frame #n can be indicated by equation (4) by using the pixel value P06 of the seventh pixel from the left in frame #n−1.

$$\begin{aligned} C06 &= B06/v + B06/v + F01/v + F02/v \\ &= P06/v + P06/v + F01/v + F02/v \\ &= 2/v \cdot P06 + \sum_{i=1}^{2} Fi/v \end{aligned} \quad (4)$$

In equation (4), the pixel value C06 is indicated by a pixel value M of the pixel in the mixed area, while the pixel value P06 is indicated by a pixel value B of the pixel in the background area. That is, the pixel value M of the pixel in the mixed area and the pixel value B of the pixel in the background area can be represented by equations (5) and (6), respectively.

$$M = C06 \quad (5)$$

$$B = P06 \quad (6)$$

In equation (4), 2/v corresponds to the mixture ratio $\alpha$. Since the amount of movement v is 4, the mixture ratio $\alpha$ of the seventh pixel from the left in frame #n is 0.5.

As discussed above, the pixel value C in the designated frame #n is considered as the pixel value in the mixed area, while the pixel value P of frame #n−1 prior to frame #n is considered as the pixel value in the background area. Accordingly, equation (3) indicating the mixture ratio $\alpha$ can be represented by equation (7):

$$C = \alpha \cdot P + f \quad (7)$$

where f in equation (7) indicates the sum of the foreground components $\Sigma_i Fi/v$ contained in the designated pixel. The variables contained in equation (7) are two factors, i.e., the mixture ratio $\alpha$ and the sum f of the foreground components.

Figure 23:
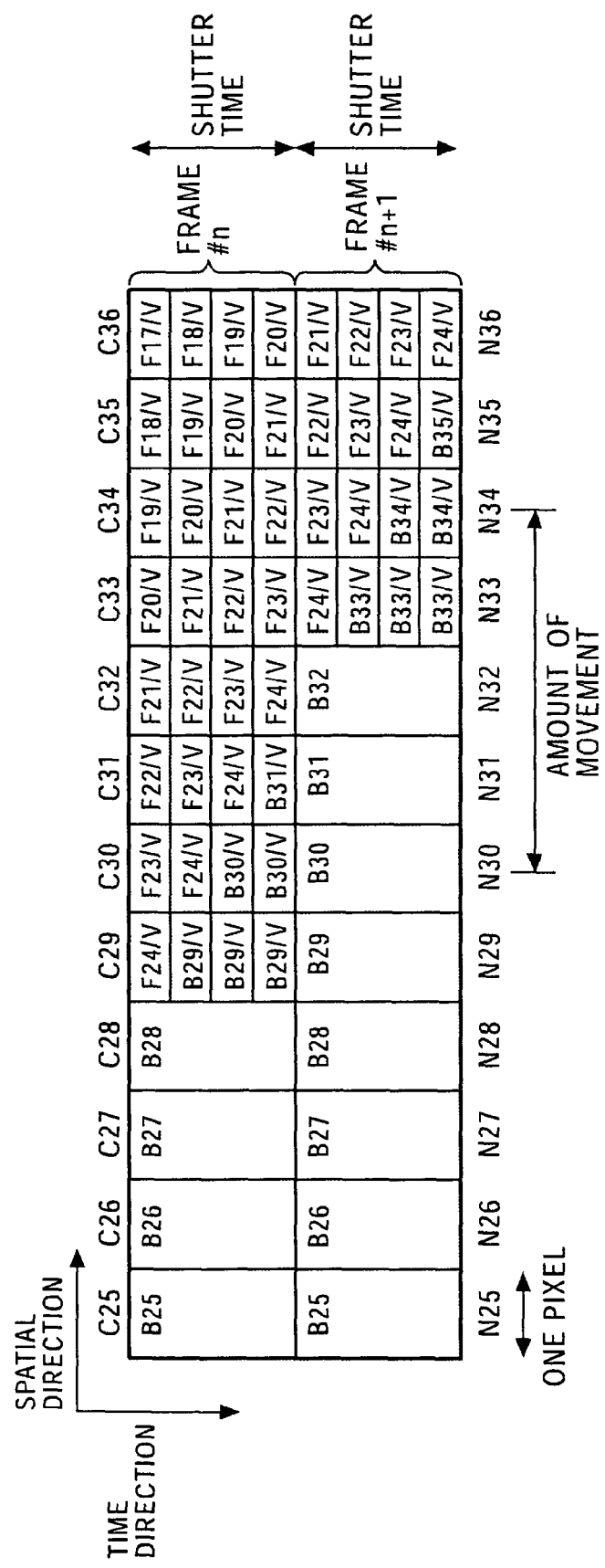
FIG. 23 illustrates a model in which pixel values are expanded in the time direction and the period corresponding to the shutter time is divided.

Similarly, a model obtained by expanding in the time direction the pixel values in which the amount of movement is 4 and the number of virtual divided portions is 4 in an uncovered background area is shown in FIG. 23.

As in the representation of the covered background area, in the uncovered background area, the pixel value C of the designated frame #n is considered as the pixel value in the mixed area, while the pixel value N of frame #n+1 subsequent to frame #n is considered as the background area. Accordingly, equation (3) indicating the mixture ratio $\alpha 0$ can be represented by equation (8).

$$C = \alpha \cdot N + f \quad (8)$$

The embodiment has been described, assuming that the background object is stationary. However, equations (4) through (8) can be applied to the case in which the background object is moving by using the pixel value of a pixel located corresponding to the amount of movement v of the background. It is now assumed, for example, in FIG. 22 that the amount of movement v of the object corresponding to the background is 2, and the number of virtual divided portions is 2. In this case, when the object corresponding to the background is moving to the right in FIG. 22, the pixel value B of the pixel in the background area in equation (6) is represented by a pixel value P04.

Since equations (7) and (8) each contain two variables, the mixture ratio $\alpha$ cannot be determined without modifying the equations.

Accordingly, the mixture ratio $\alpha$ is determined by establishing an equation concerning a set of a pixel belonging to the mixed area and the corresponding pixel belonging to the background area in accordance with the amount of movement v of the foreground object.

As the amount of movement v, the motion vector and the positional information thereof supplied from the motion vector 102 are utilized.

The calculation for the estimated mixture ratio performed by the estimated-mixture-ratio processor 201 by using the amount of movement v based on a model corresponding to the covered background area is described below.

In the example shown in FIG. 22 corresponding to the covered background area, equation (9) holds true for P02 of frame #n−1, and equation (10) holds true for C06 of frame #n.

$$P02 = 2/v \cdot B02 + \sum_{i=1}^{2} Fi/v \quad (9)$$

$$C06 = 2/v \cdot B06 + \sum_{i=1}^{2} Fi/v \quad (10)$$

In equations (9) and (10), the values corresponding to the mixture ratio α are the same, i.e., 2/v. In equations (9) and (10), the values corresponding to the sum of the foreground components are the same, i.e., $$\sum_{i=1}^{2} Fi/v.$$

That is, the mixture ratios α of P02 of frame #n−1 and C06 of frame #n are the same, and the sums of the foreground components of P02 of frame #n−1 and C06 of frame #n are the same. Accordingly, it can be proved that C06 of frame #n corresponds to P02 of frame #n−1 according to the movement of the foreground object.

By assuming that the foreground object is moving with constant velocity and the foreground components are uniform over a plurality of frames, it is possible to select a plurality of sets, each set consisting of a pixel belonging to the mixed area and the corresponding pixel belonging to the background area having the same mixture ratio α and the same sum of the foreground components, according to the amount of movement v of the foreground object. For example, five sets, each set consisting of a pixel belonging to the mixed area and the corresponding pixel belonging to the background area, may be selected.

Figure 24:
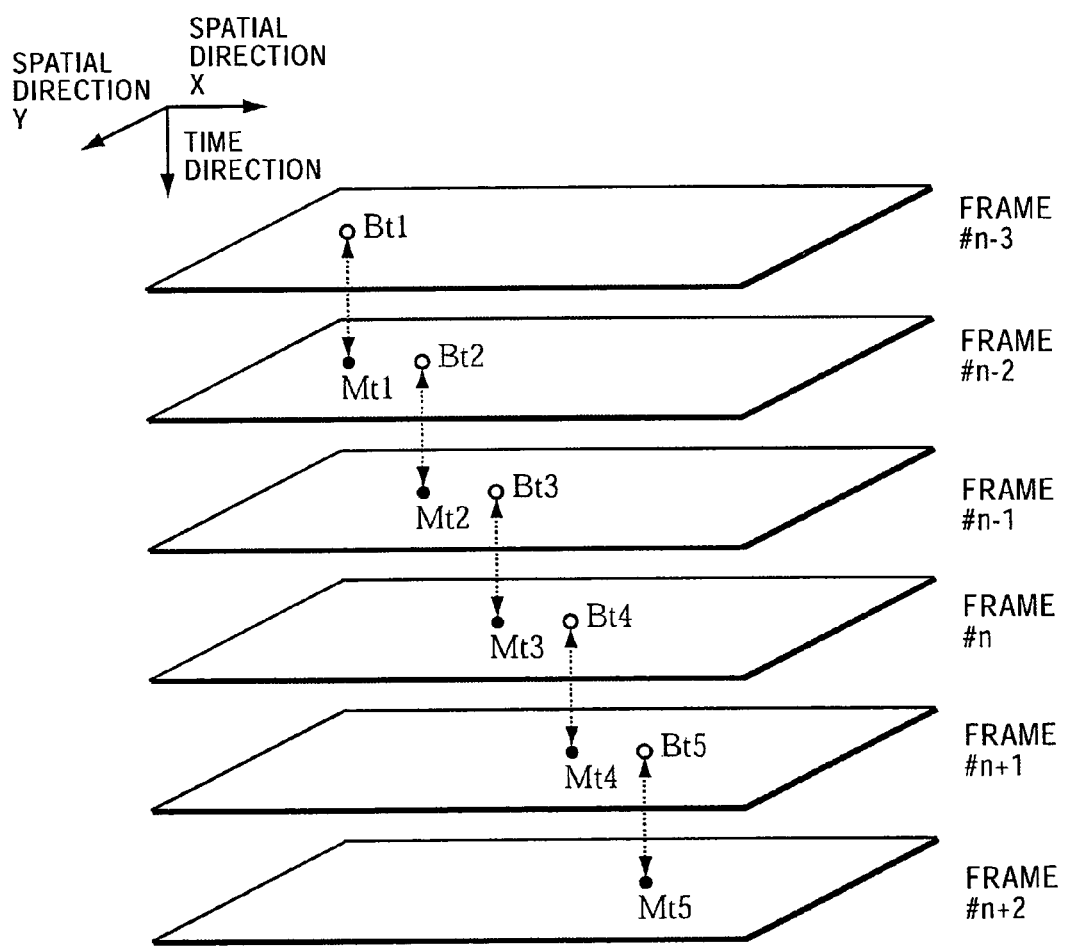
FIG. 24 illustrates the selection of pixels.

For example, as shown in FIG. 24, pixels Mt1 through Mt5 belonging to the mixed area and corresponding pixels Bt1 through Bt5 belonging to the background area can be selected from frame #n−3 through frame #n+2 in accordance with the amount of movement v of the foreground object. In FIG. 24, the white dots indicate pixels considered to belong to the background area, and the black dots indicate pixels considered to belong to the mixed area.

Equations (11) through (15) hold true for the pixels Mt1 through Mt5 and the pixels Bt1 through Bt5.

$$Mt1 = \alpha \cdot Bt1 + f \quad (11)$$

$$Mt2 = \alpha \cdot Bt2 + f \quad (12)$$

$$Mt3 = \alpha \cdot Bt3 + f \quad (13)$$

$$Mt4 = \alpha \cdot Bt4 + f \quad (14)$$

$$Mt5 = \alpha \cdot Bt5 + f \quad (15)$$

f in equations (11) through (15) designates the sum of the foreground components $\Sigma_i Fi/v$.

Since the five equations (11) through (15) contain the common variables, i.e., the mixture ratio α and the sum f of the foreground components, the method of least squares can be applied to equations (11) through (15) to determine the mixture ratio α and the sum f of the foreground components.

For example, the estimated-mixture-ratio processor 201 prestores normal equations for calculating the mixture ratio α and the sum f of the foreground components, and sets pixel values belonging to the mixed area and the corresponding pixel values belonging to the background area in the stored normal equations, thereby calculating the mixture ratio α and the sum f of the foreground components according to a matrix solution.

Figure 25:
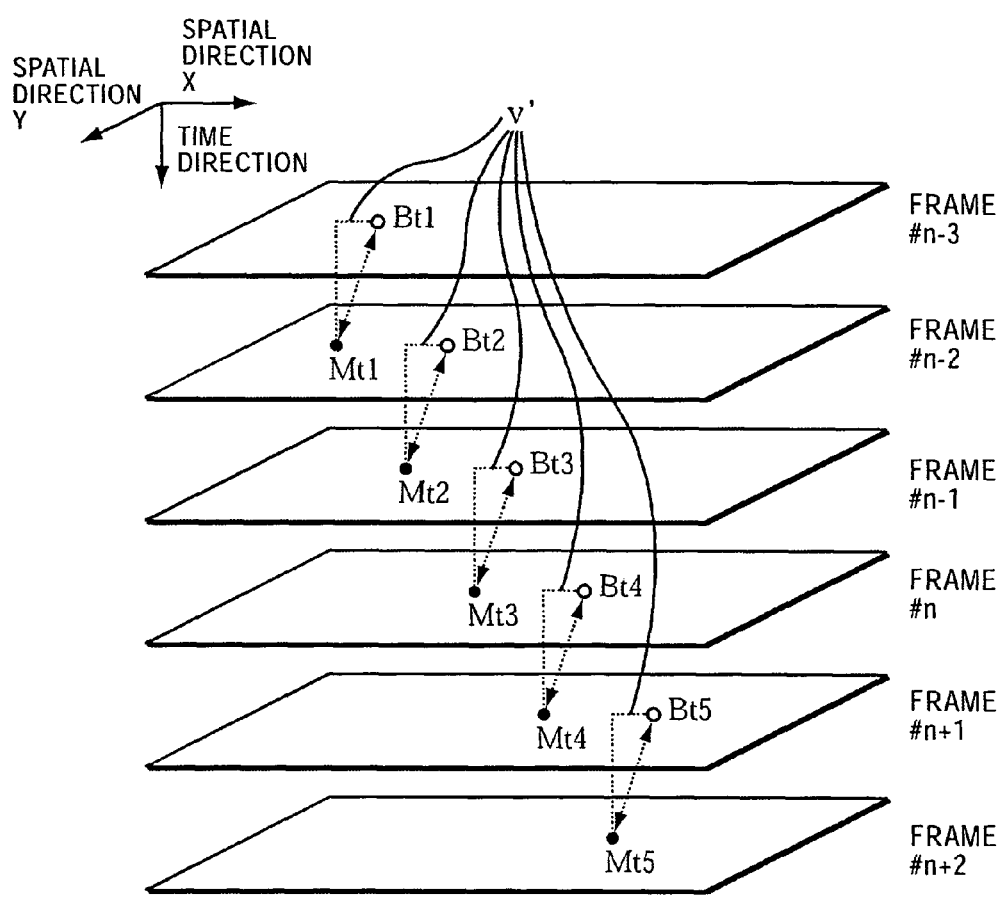
FIG. 25 illustrates the selection of pixels.

If the background is moving, as indicated by an example of FIG. 25, the estimated-mixture-ratio processor 201 sets pixel values belonging to the mixed area and the corresponding pixel values belonging to the background area in the normal equations in accordance with the amount of movement v', and calculates the mixture ratio α and the sum f of the foreground components according to a matrix solution. In FIG. 25, the white dots indicate pixels considered to belong to the background area, and the black dots designate the pixels considered to belong to the mixed area.

As discussed above, the estimated-mixture-ratio processor 201 calculates the estimated mixture ratio by using the amount of movement v based on a model corresponding to the covered background area.

Similarly, the estimated-mixture-ratio processor 202 calculates the estimated mixture ratio by using the amount of movement v based on a model corresponding to the uncovered background area. In the uncovered background area, the corresponding pixel belonging to the background area is selected from the frame subsequent to the frame of a designated pixel.

Figure 26:
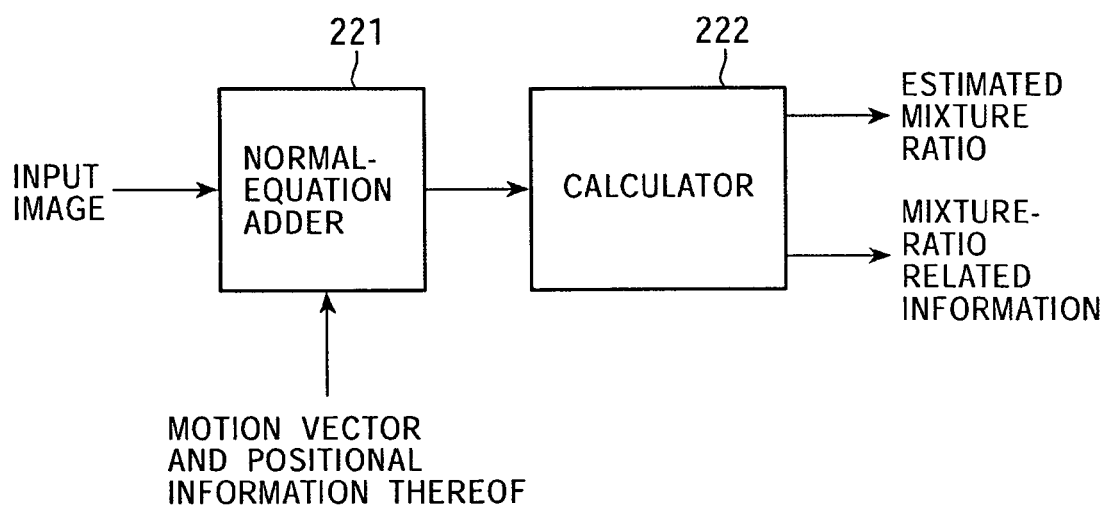
FIG. 26 is a block diagram illustrating the configuration of an estimated-mixture-ratio processor 201.

FIG. 26 is a block diagram illustrating the configuration of the estimated-mixture-ratio processor 201 for calculating the estimated mixture ratio by using the amount of movement v based on a model corresponding to the covered background area.

A normal-equation adder 221 sets, based on the motion vector and the positional information thereof supplied from the motion detector 102, pixel values belonging to the mixed area and the corresponding pixel values belonging to the background area contained in an image of M frames of the input image in prestored normal equations. The normal-equation adder 221 supplies the normal equations in which the pixel values belonging to the mixed area and the corresponding pixel values belonging to the background area are set to a calculator 222.

The calculator 222 solves the normal equations in which the pixel values are set supplied from the normal-equation adder 221 by applying a matrix solution, for example, a sweep-out method (Gauss-Jordan elimination) so as to obtain the estimated mixture ratio, and outputs the calculated estimated mixture ratio. The calculator 222 outputs the sum of the foreground components, which is determined together with the calculation of the estimated mixture ratio, as the mixture-ratio related information.

As discussed above, the estimated-mixture-ratio processor 201 calculates the estimated mixture ratio by using the amount of movement v based on a model corresponding to the covered background area. The estimated-mixture-ratio processor 201 outputs the sum of the foreground components as the mixture-ratio related information.

The estimated-mixture-ratio processor 202 has a configuration similar to the estimated-mixture-ratio processor 201, and an explanation thereof is thus omitted.

As described above, based on the input image and the motion vector and the positional information thereof supplied from the motion detector 102, the mixture-ratio calculator 103 is able to generate the estimated mixture ratio and the corresponding mixture-ratio related information when it is assumed that the pixel belongs to the covered background area, and is also able to generate the estimated mixture ratio, which is the mixture ratio to be estimated, and the corresponding mixture-ratio related information when it is assumed that the pixel belongs to the uncovered background area.

The estimated-mixture-ratio calculation processing performed by the mixture-ratio calculator 103 is described below with reference to the flowchart of FIG. 27. In step S201, the estimated-mixture-ratio processor 201 performs the mixture-ratio estimating processing by using a model corresponding to the covered background area based on the input image and the motion vector and the positional information thereof supplied from the motion detector 102. Details of the mixture-ratio estimating processing are described below with reference to the flowchart of FIG. 28.

In step S202, the estimated-mixture-ratio processor 202 performs the mixture-ratio estimating processing by using a model corresponding to the uncovered background area based on the input image and the motion vector and the positional information thereof supplied form the motion detector 102.

In step S203, the mixture-ratio calculator 103 determines whether the mixture ratios have been estimated for the whole frame. If it is determined that the mixture ratios have not been estimated for the whole frame, the process returns to step S201, and the processing for estimating the mixture ratio of the subsequent pixel is executed.

If it is determined in step S203 that the mixture ratios have been estimated for the whole frame, the processing is completed.

As discussed above, the mixture-ratio calculator 103 is able to calculate the estimated mixture ratio for each pixel based on the motion vector and the positional information thereof supplied from the motion detector 102 and the input image.

A description is given below, with reference to the flowchart of FIG. 28, of the estimated-mixture-ratio calculating processing performed by the estimated-mixture-ratio processor 201 by using a model corresponding to the covered background area in step S201 of FIG. 27.

In step S221, the normal-equation adder 221 reads the motion vector and the positional information supplied from the motion detector 102 so as to obtain the amount of movement v.

In step S222, the normal-equation adder 221 selects the pixels from input M frames of images based on the amount of movement v, and sets the pixel values of the selected pixels in the prestored normal equations.

In step S223, the normal-equation adder 221 determines whether the pixel values have been set for the target pixel. If it is determined that the pixel values have not been set for the target pixel, the process returns to step S222, and the processing for setting the pixel values is repeated.

If it is determined in step S223 that the pixel values have been set for the target pixel, the process proceeds to step S224. In step S224, the normal-equation adder 221 supplies the normal equations in which the pixel values are set to the calculator 222, and the calculator 222 solves the normal equations by a sweep-out method (Gauss-Jordan elimination) so as to calculate the estimated mixture ratio. The processing is then completed. The calculator 222 outputs the sum of the foreground components corresponding to each pixel, which is determined together with the calculation of the estimated mixture ratio, as the mixture-ratio related information.

As discussed above, the estimated-mixture-ratio processor 201 is able to calculate the estimated mixture ratio.

Figure 27:
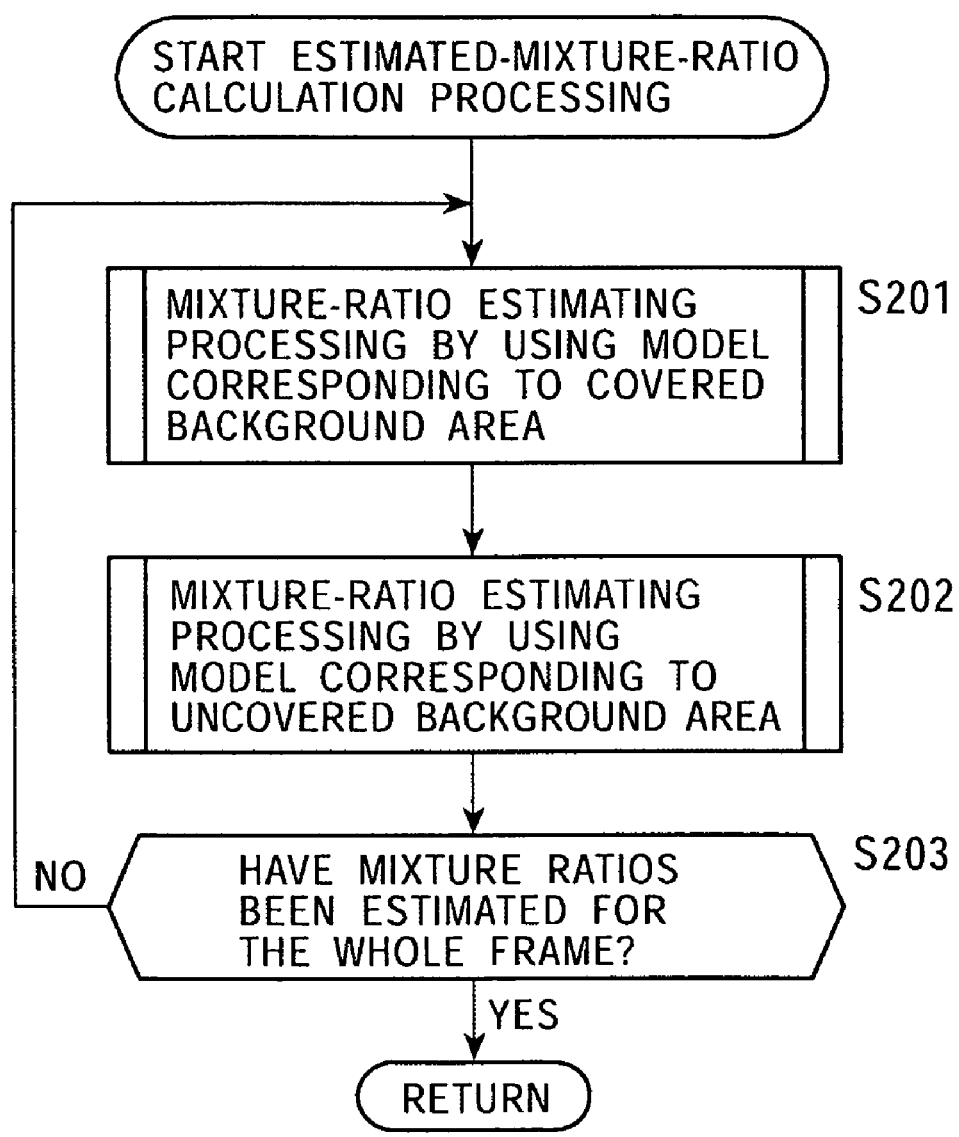
FIG. 27 is a flowchart illustrating the processing for calculating the estimated mixture ratio.
Figure 28:
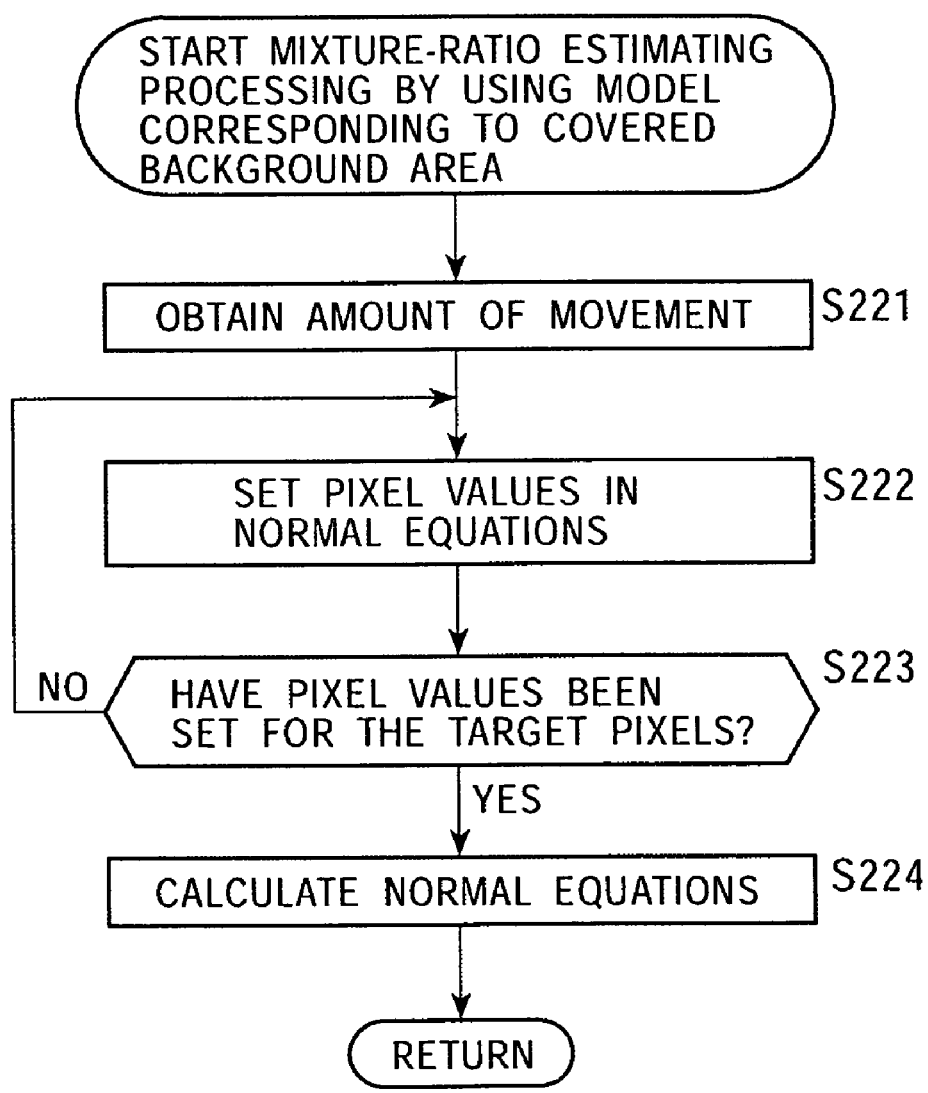
FIG. 28 is a flowchart illustrating the processing for calculating the mixture ratio estimation by using a model according to a covered background area.

The mixture-ratio estimating processing performed by the estimated-mixture-ratio processor 202 by using a model corresponding to the uncovered background area in step S202 of FIG. 27 is similar to the processing indicated by the flowchart of FIG. 28 by using the normal equations corresponding to the model of the uncovered background area, and an explanation there of is thus omitted.

Figure 29:
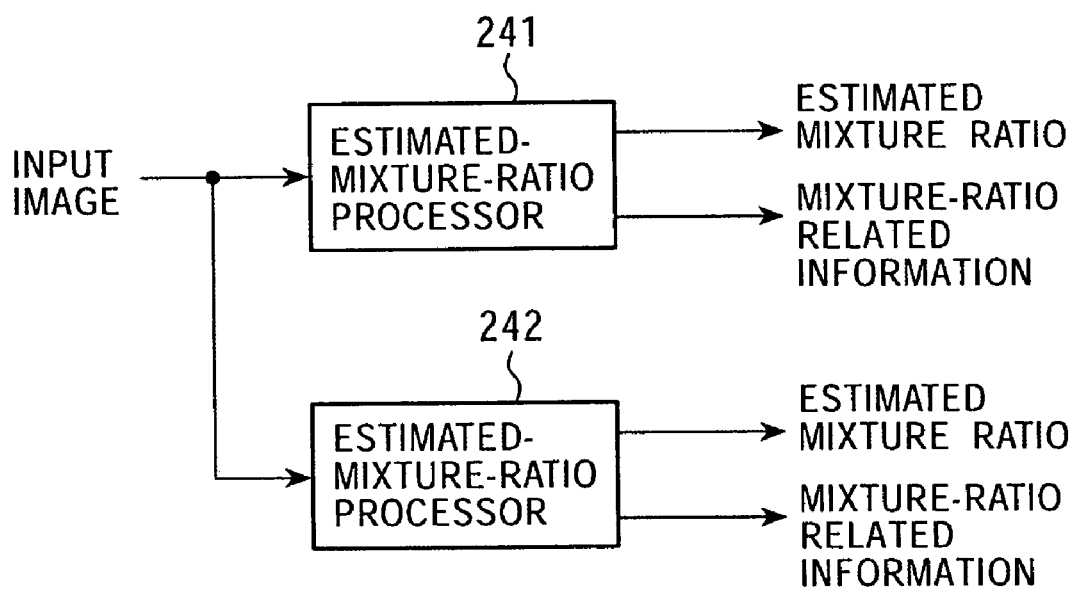
FIG. 29 is a block diagram illustrating another configuration of the mixture-ratio calculator 103.

FIG. 29 is a block diagram illustrating another configuration of the mixture-ratio calculator 103. The mixture-ratio calculator 103 configured as shown in FIG. 29 does not use a motion vector.

An estimated-mixture-ratio processor 241 calculates, based on the input image, the estimated mixture ratio of each pixel by the calculation corresponding to a model of the covered background area, and outputs the estimated mixture ratio together with the mixture-ratio related information, which is calculated together with the calculation of the estimated mixture ratio. The mixture-ratio related information output from the estimated-mixture-ratio processor 241 is, for example, the sum of the foreground components or the gradient of the mixture ratio.

An estimated-mixture-ratio processor 242 calculates, based on the input image, the estimated mixture ratio of each pixel by the calculation corresponding to a model of the uncovered background area, and outputs the estimated mixture ratio together with the mixture-ratio related information, which is calculated together with the calculation of the estimated mixture ratio. The mixture-ratio related information output from the estimated-mixture-ratio processor 242 is, for example, the sum of the foreground components or the gradient of the mixture ratio.

The mixture-ratio estimating processing performed by the estimated-mixture-ratio processor 241 and the estimated-mixture-ratio processor 242 is described below with reference to FIGS. 30 and 32.

As discussed with reference to FIGS. 22 and 23, since equations (7) and (8) each contain the two variables, the mixture ratio $\alpha$ cannot be determined without modifying equations (7) and (8).

The mixture ratio $\alpha$ linearly changes in accordance with a change in the position of the pixels because the object corresponding to the foreground is moving with constant velocity. By utilizing this characteristic, the estimated-mixture-ratio processor 241 or the estimated-mixture-ratio processor 242 sets an equation in which the mixture ratio $\alpha$ and the sum f of the foreground components are approximated in the spatial direction. Also, by utilizing a plurality of sets of the pixel values of the pixels belonging to the mixed area and the pixel values of the pixels belonging to the background area, the equations in which the mixture ratio $\alpha$ and the sum f of the foreground components are approximated are solved.

When a change in the mixture ratio $\alpha$ is approximated as a straight line, the mixture ratio $\alpha$ can be expressed by equation (16).

$$\alpha = il + p \tag{16}$$

In equation (16), i is the index in the spatial direction when the position of the designated pixel is set to 0. l is the gradient of the mixture ratio $\alpha$. p is the intercept of the straight line of the mixture ratio $\alpha$, and is also the mixture ratio $\alpha$ of the designated pixel. In equation (16), the index i is known, and the gradient l and the intercept p are unknown.

Figure 30:
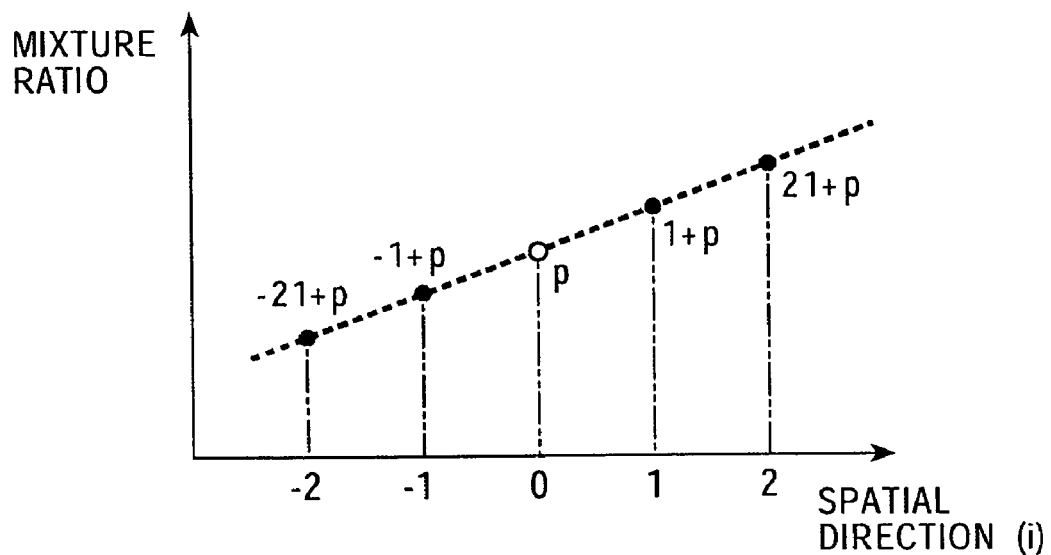
FIG. 30 illustrates a straight line for approximating the mixture ratio $\alpha$.

The relationship among the index i, the gradient l, and the intercept p is shown in FIG. 30. In FIG. 30, the white dot indicates the designated pixel and the black dots indicate the proximity pixels.

By approximating the mixture ratio α as equation (16), a plurality of different mixture ratios α for a plurality of pixels can be expressed by two variables. In the example shown in FIG. 30, the five mixture ratios for five pixels are expressed by the two variables, i.e., the gradient l and the intercept p.

Figure 31:
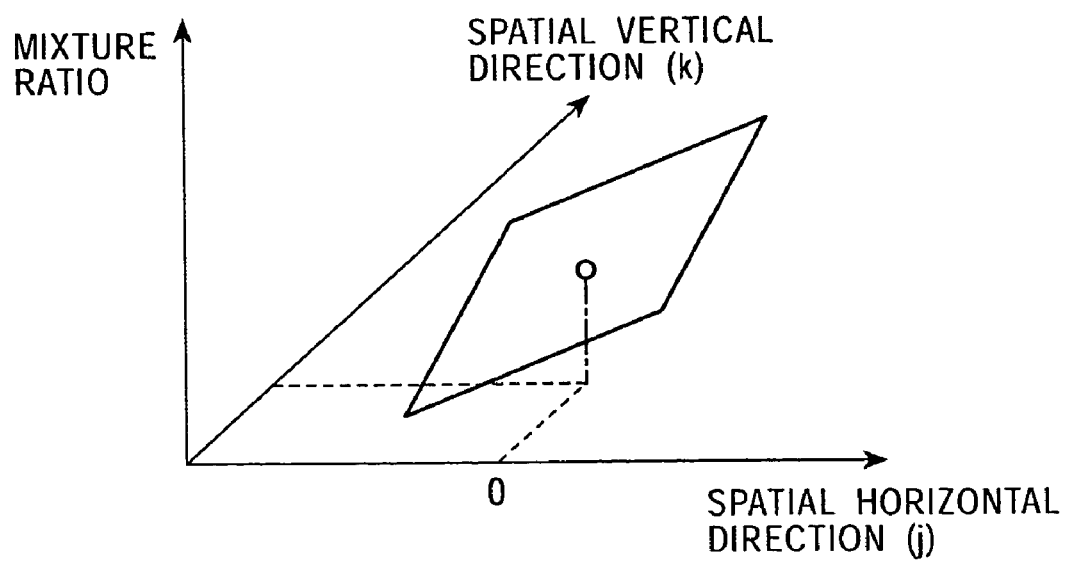
FIG. 31 illustrates a plane for approximating the mixture ratio $\alpha$.

When the mixture ratio α is approximated in the plane shown in FIG. 31, equation (16) is expanded into the plane by considering the movement v corresponding to the two directions, i.e., the horizontal direction and the vertical direction of the image, and the mixture ratio α can be expressed by equation (17). In FIG. 31, the white dot indicates the designated pixel.

$$\alpha = jm + kq + p \quad (17)$$

In equation (17), j is the index in the horizontal direction and k is the index in the vertical direction when the position of the designated pixel is set to 0. In equation (17), m designates the horizontal gradient of the mixture ratio α in the plane, and q indicates the vertical gradient of the mixture ratio α in the plane. In equation (17), p indicates the intercept of the mixture ratio α in the plane.

For example, in frame #n shown in FIG. 22, equations (18) through (20) can hold true for C05 through C07, respectively.

$$C05 = \alpha 05 \cdot B05/v + f05 \quad (18)$$

$$C06 = \alpha 06 \cdot B06/v + f06 \quad (19)$$

$$C07 = \alpha 07 \cdot B07/v + f07 \quad (20)$$

Assuming that the foreground components positioned in close proximity with each other are equal to each other, i.e., that F01 through F03 are equal, equation (21) holds true by replacing F01 through F03 by Fc.

$$f(x) = (1 - \alpha(x)) \cdot Fc \quad (21)$$

In equation (21), x indicates the position in the spatial direction

When α(x) is replaced by equation (17), equation (21) can be expressed by equation (22).

$$f(x) = (1 - (jm + kq + p)) \cdot Fc \quad (22)$$
$$= j \cdot (-m \cdot Fc) + k \cdot (-q \cdot Fc) + ((1 - p) \cdot Fc)$$
$$= js + kt + u$$

In equation (22), (−m·Fc), (−q·Fc), and (1−p)·Fc are replaced, as expressed by equations (23) through (25), respectively.

$$s = -m \cdot Fc \quad (23)$$

$$t = -q \cdot Fc \quad (24)$$

$$u = (1-p) \cdot Fc \quad (25)$$

In equation (22), j is the index in the horizontal direction and k is the index in the vertical direction when the position of the designated pixel is 0.

As discussed above, since it can be assumed that the object corresponding to the foreground is moving with constant velocity within the shutter period, and that the foreground components positioned in close proximity with each other are uniform, the sum of the foreground components can be approximated by equation (22).

When the mixture ratio α is approximated by a straight line, the sum of the foreground components can be expressed by equation (26).

$$f(x) = is + u \quad (26)$$

By replacing the mixture ratio α and the sum of the foreground components in equation (16) by using equations (17) and (22), the pixel value M can be expressed by equation (27).

$$M = (jm + kq + p) \cdot B + js + kt + u \quad (27)$$
$$= jB \cdot m + kB \cdot q + B \cdot p + j \cdot s + k \cdot t + u$$

In equation (27), unknown variables are six factors, such as the horizontal gradient m of the mixture ratio α in the plane, the vertical gradient q of the mixture ratio α in the plane, and the intercepts p, s, t, and u of the mixture ratio α in the plane.

The pixel value M and the pixel value B are set in equation (27) in accordance with the pixels close to the designated pixel, and then, a plurality of equations in which the pixel value M and the pixel value B are set are solved by the method of least squares, thereby calculating the mixture ratio α.

It is now assumed, for example, that the horizontal index j of the designated pixel is set to 0, and the vertical index k of the designated pixel is set to 0. In this case, when the pixel value M or the pixel value B is set in the equation corresponding to equation (27) for 3×3 pixels located in the proximity with the designated pixel, equations (28) through (36) are obtained.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \quad (28)$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \quad (29)$$

$$M_{-1,-1} = (+1) \cdot B_{-1,-1} \cdot m + (-1) \cdot B_{+1,-1} \cdot q + B_{+1,-1} \cdot p + (+1) \cdot s + (-1) \cdot t + u \quad (30)$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \quad (31)$$

$$M_{0,0} = (0) \cdot B_{0,0} \cdot m + (0) \cdot B_{0,0} \cdot q + B_{0,0} \cdot p + (0) \cdot s + (0) \cdot t + u \quad (32)$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \quad (33)$$

$$M_{-1,+1} = (-1) \cdot B_{-1,+1} \cdot m + (+1) \cdot B_{-1,+1} \cdot q + B_{-1,+1} \cdot p + (-1) \cdot s + (+1) \cdot t + u \quad (34)$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \quad (35)$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \quad (36)$$

Since the horizontal index j of the designated pixel is 0, and the vertical index k of the designated pixel is 0, the mixture ratio α of the designated pixel is equal to the value when j is 0 and k is 0 in equation (17), i.e., the mixture ratio α is equal to the intercept p in equation (17).

Accordingly, based on the nine equations (28) through (36), the horizontal gradient m, the vertical gradient q, and the intercepts p, s, t, and u are calculated by the method of least squares, and the intercept p is output as the mixture ratio α.

A specific process for calculating the mixture ratio α by applying the method of least squares is as follows.

When the index i and the index k are expressed by a single index x, the relationship among the index i, the index k, and the index x can be expressed by equation (37).

$$x = (j+1) \cdot 3 + (k+1) \tag{37}$$

It is now assumed that the horizontal gradient m, the vertical gradient q, and the intercepts p, s, t, and u are expressed by variables w0, w1, w2, w3, w4, and w5, respectively, and jB, kB, B, j, k and 1 are expressed by a0, a1, a2, a3, a4, and a5, respectively. In consideration of the error ex, equations (28) through (36) can be modified into equation (38).

$$Mx = \sum_{y=0}^{5} ay \cdot wy + ex \tag{38}$$

In equation (38), x is any one of the integers from 0 to 8. Equation (39) can be found from equation (38).

$$ex = Mx - \sum_{y=0}^{5} ay \cdot wy \tag{39}$$

Since the method of least squares is applied, the square sum E of the error is defined as follows, as expressed by equation (40).

$$E = \sum_{x=0}^{8} ex^2 \tag{40}$$

In order to minimize the error, the partial differential value of the variable Wv with respect to the square sum E of the error should be 0. v is any one of the integers from 0 to 5. Thus, wy is determined so that equation (41) is satisfied.

$$\frac{\partial E}{\partial Wv} = 2 \cdot \sum_{x=0}^{8} ex \cdot \frac{\partial ex}{\partial Wv} \tag{41}$$

$$= 2 \cdot \sum_{x=0}^{8} ex \cdot av = 0$$

By substituting equation (39) into equation (41), equation (42) is obtained.

$$\sum_{x=0}^{8} \left( av \cdot \sum_{y=0}^{5} ay \cdot Wy \right) = \sum_{x=0}^{8} av \cdot Mx \tag{42}$$

For example, the sweep-out method (Gauss-Jordan elimination) is applied to the normal equations consisting of six equations obtained by substituting one of the integers from 0 to 5 into v in equation (42), thereby obtaining wy. As stated above, w0 is the horizontal gradient m, w1 is the vertical gradient q, w2 is the intercept p, w3 is s, w4 is t, and w5 is u.

As discussed above, by applying the method of least squares to the equations in which the pixel value M and the pixel value B are set, the horizontal gradient m, the vertical gradient q, and the intercepts p, s, t, and u can be determined.

The intercept p is the mixture ratio α when indexes i and k are 0, i.e., when the intercept p is located at the center position. Thus, the intercept P is output.

A description has been given, with reference to equations (28) through (36), by assuming that the pixel value of the pixel contained in the mixed area is M, and the pixel value of the pixel contained in the background area is B. In this case, it is necessary to set normal equations for each of the cases where the designated pixel is contained in the covered background area, or the designated pixel is contained in the uncovered background area.

For example, if the mixture ratio α of the pixel contained in the covered background area in frame #n shown in FIG. 22 is determined, C04 through C08 of the pixels in frame #n and the pixel values P04 through P08 of the pixels in frame #n−1 are set in the normal equations.

If the mixture ratio α of the pixels contained in the uncovered background area in frame #n shown in FIG. 23 is determined, C28 through C32 of the pixels in frame #n and the pixel values N28 through N32 of the pixels in frame #n+1 are set in the normal equations.

Figure 32:
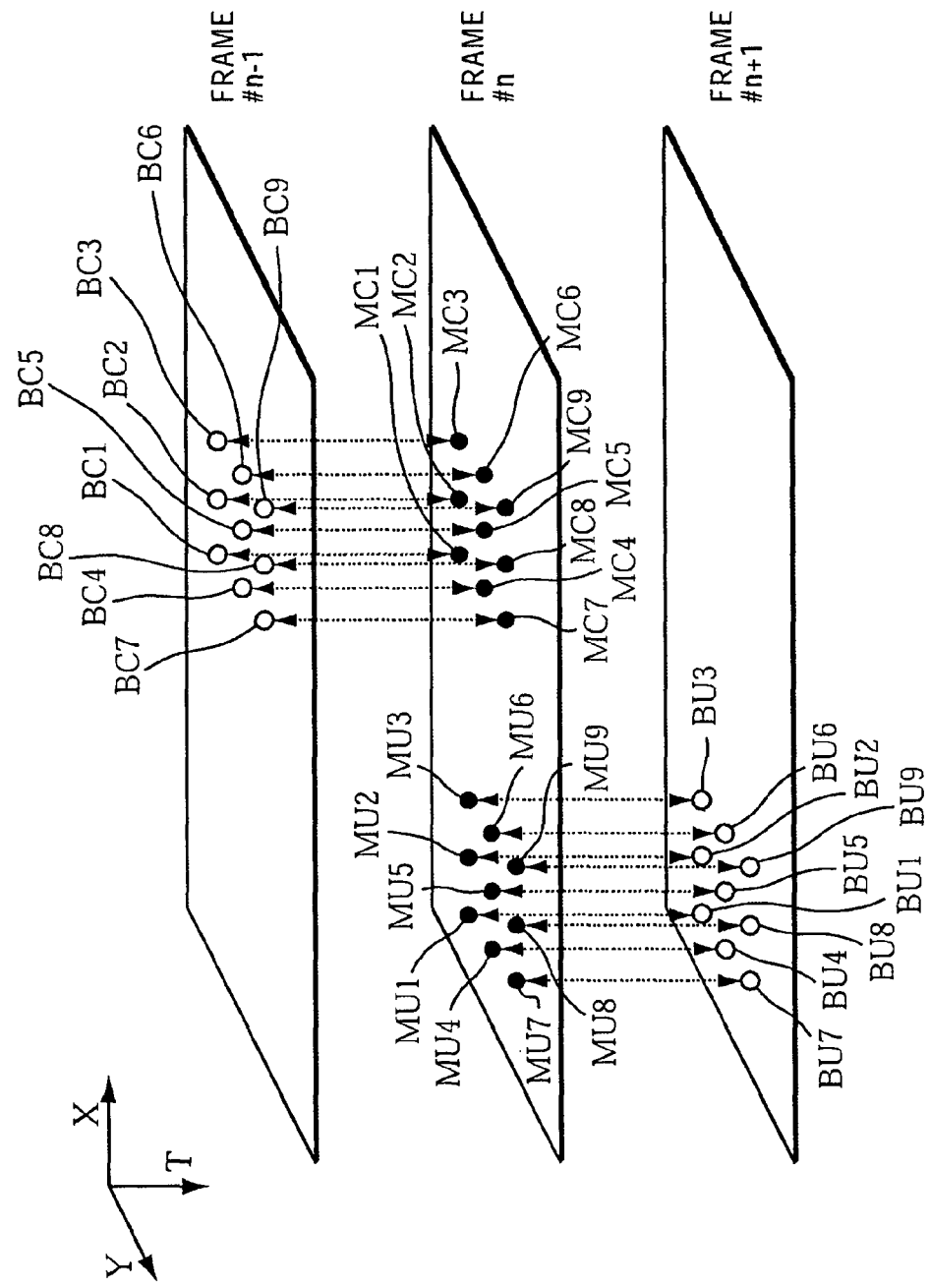
FIG. 32 illustrates the relationships of the pixels in a plurality of frames when the mixture ratio $\alpha$ is calculated.

Moreover, if, for example, the mixture ratio α of the pixel contained in the covered background area shown in FIG. 32 is calculated, the following equations (43) through (51) are set. In FIG. 32, the white dots indicate pixels to belong to the background, and the black dots indicate pixels to belong to the mixed area. The pixel value of the pixel for which the mixture ratio α is calculated is Mc5.

$$Mc1 = (-1) \cdot Bc1 \cdot m + (-1) \cdot Bc1 \cdot q + Bc1 \cdot p + (-1) \cdot s + (-1) \cdot t + u \tag{43}$$

$$Mc2 = (0) \cdot Bc2 \cdot m + (-1) \cdot Bc2 \cdot q + Bc2 \cdot p + (0) \cdot s + (-1) \cdot t + u \tag{44}$$

$$Mc3 = (+1) \cdot Bc3 \cdot m + (-1) \cdot Bc3 \cdot q + Bc3 \cdot p + (+1) \cdot s + (-1) \cdot t + u \tag{45}$$

$$Mc4 = (-1) \cdot Bc4 \cdot m + (0) \cdot Bc4 \cdot q + Bc4 \cdot p + (-1) \cdot s + (0) \cdot t + u \tag{46}$$

$$Mc5 = (0) \cdot Bc5 \cdot m + (0) \cdot Bc5 \cdot q + Bc5 \cdot p + (0) \cdot s + (0) \cdot t + u \tag{47}$$

$$Mc6 = (+1) \cdot Bc6 \cdot m + (0) \cdot Bc6 \cdot q + Bc6 \cdot p + (-1) \cdot s + (0) \cdot t + u \tag{48}$$

$$Mc7 = (-1) \cdot Bc7 \cdot m + (+1) \cdot Bc7 \cdot q + Bc7 \cdot p + (-1) \cdot s + (+1) \cdot t + u \tag{49}$$

$$Mc8 = (0) \cdot Bc8 \cdot m + (+1) \cdot Bc8 \cdot q + Bc8 \cdot p + (0) \cdot s + (+1) \cdot t + u \tag{50}$$

$$Mc9 = (+1) \cdot Bc9 \cdot m + (+1) \cdot Bc9 \cdot q + Bc9 \cdot p + (+1) \cdot s + (+1) \cdot t + u \tag{51}$$

For calculating the mixture ratio α of the pixel contained in the covered background area in frame #n, the pixel values Bc1 through Bc9 of the pixels of the background area in frame #n−1 in equations (43) through (51), respectively, corresponding to the pixels in frame #n are used.

When, for example, the mixture ratio α of the pixel contained in the uncovered background area shown in FIG. 32 is calculated, the following equations (52) through (60) are set. The pixel value of the pixel for which the mixture ratio α is calculated is Mu5.

$$Mu1 = (-1) \cdot Bu1 \cdot m + (-1) \cdot Bu1 \cdot q + Bu1 \cdot p + (-1) \cdot s + (-1) \cdot t + u \tag{52}$$

$$Mu2 = (0) \cdot Bu2 \cdot m + (-1) \cdot Bu2 \cdot q + Bu2 \cdot p + (0) \cdot s + (-1) \cdot t + u \tag{53}$$

$$Mu3 = (+1) \cdot Bu3 \cdot m + (-1) \cdot Bu3 \cdot q + Bu3 \cdot p + (+1) \cdot s + (-1) \cdot t + u \tag{54}$$

$$Mu4 = (-1) \cdot Bu4 \cdot m + (0) \cdot Bu4 \cdot q + Bu4 \cdot p + (-1) \cdot s + (0) \cdot t + u \tag{55}$$

$$Mu5 = (0) \cdot Bu5 \cdot m + (0) \cdot Bu5 \cdot q + Bu5 \cdot p + (0) \cdot s + (0) \cdot t + u \tag{56}$$

$$Mu6 = (+1) \cdot Bu6 \cdot m + (0) \cdot Bu6 \cdot q + Bu6 \cdot p + (+1) \cdot s + (0) \cdot t + u \quad (57)$$

$$Mu7 = (-1) \cdot Bu7 \cdot m + (+1) \cdot Bu7 \cdot q + Bu7 \cdot p + (-1) \cdot s + (+1) \cdot t + u \quad (58)$$

$$Mu8 = (0) \cdot Bu8 \cdot m + (+1) \cdot Bu8 \cdot q + Bu8 \cdot p + (0) \cdot s + (+1) \cdot t + u \quad (59)$$

$$Mu9 = (+1) \cdot Bu9 \cdot m + (+1) \cdot Bu9 \cdot q + Bu9 \cdot p + (+1) \cdot s + (+1) \cdot t + u \quad (60)$$

For calculating the mixture ratio α of the pixel contained in the uncovered background area in frame #n, the pixel values Bu1 through Bu9 of the pixels of the background area in frame #n+1 in equations (52) through (60), respectively, corresponding to the pixels in frame #n are used.

The mixture-ratio estimation processor 241 and the mixture-ratio estimation processor 242 are configured similarly to the mixture-ratio processor 201, and an explanation thereof is thus omitted.

The processing for calculating the estimated mixture ratio performed by the mixture-ratio calculator 103 configured as shown in FIG. 29 is similar to the processing discussed with reference to the flowchart of FIG. 27, and an explanation thereof is thus omitted.

Figure 33:
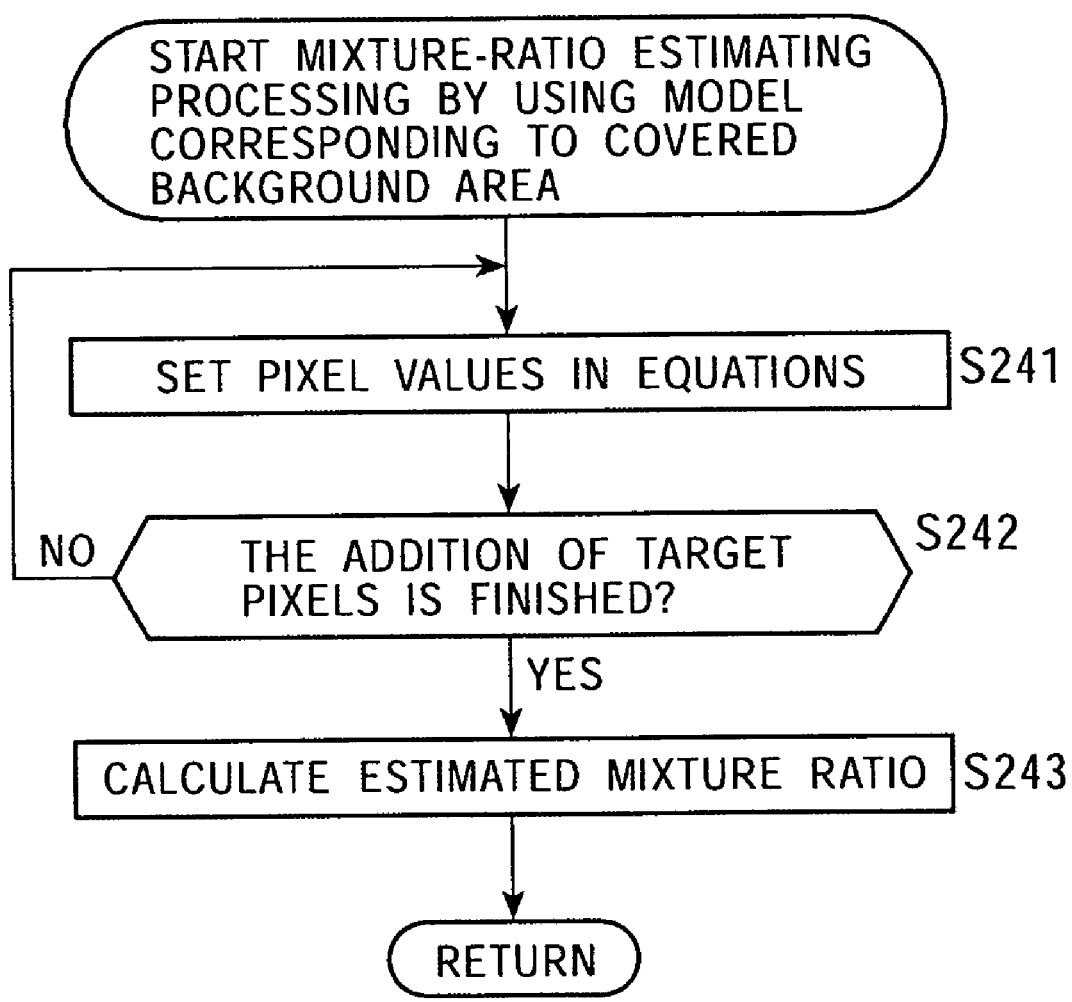
FIG. 33 is a flowchart illustrating the mixture-ratio-estimating processing by using a model corresponding to a covered background area.

A description is now given, with reference to the flowchart of FIG. 33, of the mixture-ratio estimating processing by using a model of the covered background area in step S202 of FIG. 27.

In step S241, the estimated-mixture-ratio processor 241 sets the pixel value contained in the input image in a normal equation corresponding to a model of the covered background area.

In step S242, the estimated-mixture-ratio processor 241 determines whether the setting of the target pixels is finished. If it is determined that the setting of the target pixels is not finished, the process returns to step S241, and the processing for setting the pixel values in the normal equation is repeated.

If it is determined in step S242 that the setting for the target pixels is finished, the process proceeds to step S243. In step S243, the estimated-mixture-ratio processor 241 calculates the estimated mixture ratio by solving the normal equations in which the pixels values are set, and outputs the calculated mixture ratio. The estimated-mixture-ratio processor 241 outputs the sum of the foreground components and the gradient of the estimated mixture ratio, which are determined together with the calculation of the estimated mixture ratio, as the mixture-ratio related information.

As discussed above, the estimated-mixture-ratio processor 241 is able to calculate the estimated mixture ratio based on the input image. The estimated-mixture-ratio processor 241 outputs the sum of the foreground components and the gradient of the estimated mixture ratio as the mixture-ratio related information.

The mixture-ratio estimating processing performed by the estimated-mixture-ratio processor 242 by using a model corresponding to the uncovered background area is similar to the processing using the normal equations corresponding to a model of the uncovered background area indicated by the flowchart of FIG. 33, and an explanation thereof is thus omitted.

Figure 34:
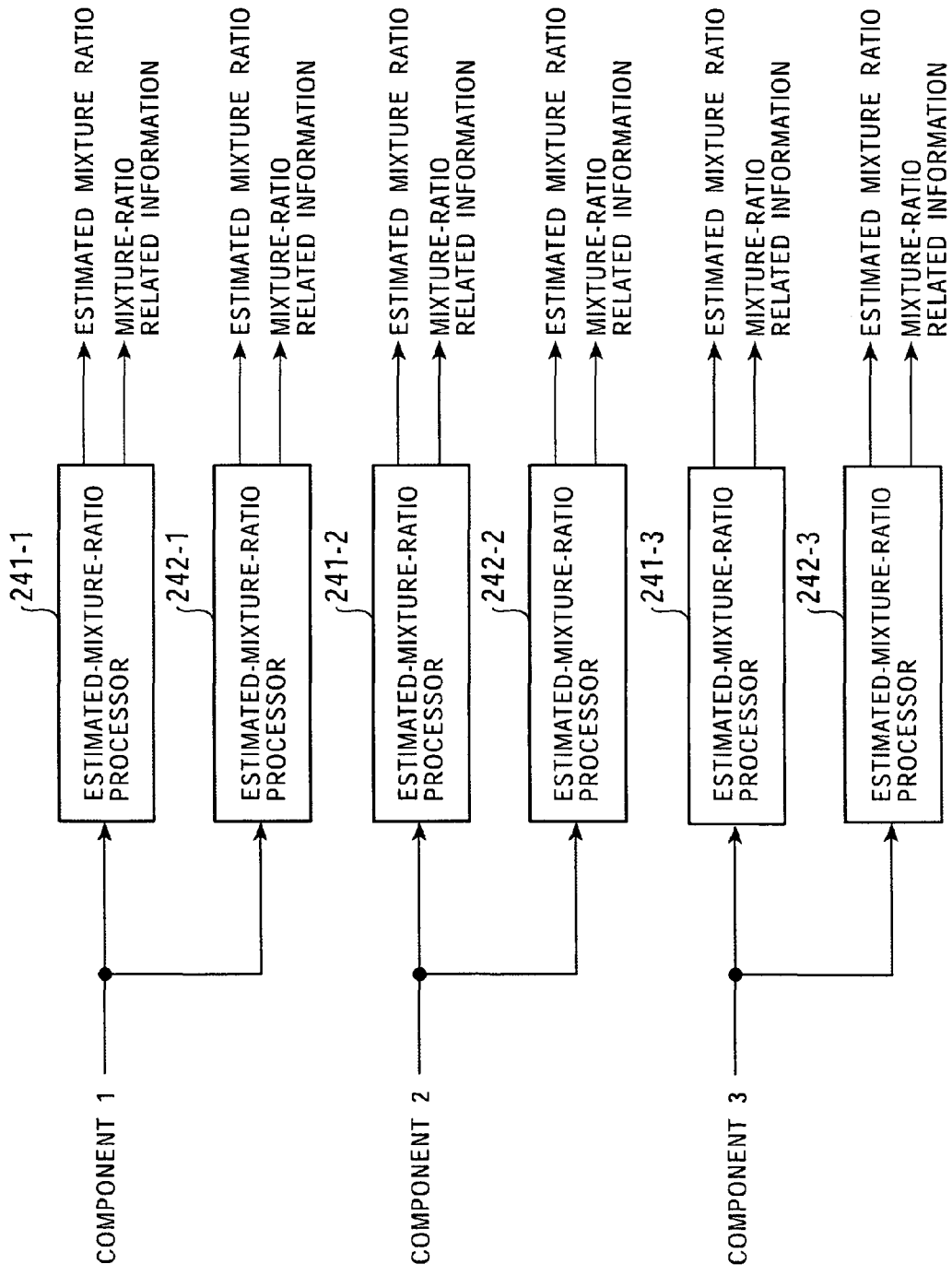
FIG. 34 is a block diagram illustrating still another configuration of the mixture-ratio calculator 103.

FIG. 34 is a block diagram illustrating still another configuration of the mixture-ratio calculator 103 for estimating the mixture ratio from an input image, which is input as a component signal.

In this specification, the component means individual signal components of a component signal, such as a luminance signal, a chrominance signal, and an RGB (Red-green-blue) signal.

The following description is given based on an example in which component 1 is a luminance value Y, component 2 is a color difference U, and component 3 is a color difference V.

An estimated-mixture-ratio processor 241-1 calculates the estimated mixture ratio for each pixel based on component 1 of the input image according to the calculation corresponding to a model of a covered background area, and outputs the estimated mixture ratio together with the mixture-ratio related information, which is determined with the calculation of the estimated mixture ratio. The mixture-ratio related information output from the estimated-mixture-ratio processor 241-1 is, for example, the sum of the foreground components and the gradient of the mixture ratio.

An estimated-mixture-ratio processor 242-1 calculates the estimated mixture ratio for each pixel based on component 1 of the input image according to the calculation corresponding to a model of an uncovered background area, and outputs the estimated mixture ratio together with the mixture-ratio related information, which is determined with the calculation of the estimated mixture ratio. The mixture-ratio related information output from the estimated-mixture-ratio processor 242-1 is, for example, the sum of the foreground components and the gradient of the mixture ratio.

An estimated-mixture-ratio processor 241-2 calculates the estimated mixture ratio for each pixel based on component 2 of the input image according to the calculation corresponding to a model of the covered background area, and outputs the estimated mixture ratio together with the mixture-ratio related information, which is determined with the calculation of the estimated mixture ratio.

An estimated-mixture-ratio processor 242-2 calculates the estimated mixture ratio for each pixel based on component 2 of the input image according to the calculation corresponding to a model of the uncovered background area, and outputs the estimated mixture ratio together with the mixture-ratio related information, which is determined with the calculation of the estimated mixture ratio.

An estimated-mixture-ratio processor 241-3 calculates the estimated mixture ratio for each pixel based on component 3 of the input image according to the calculation corresponding to a model of the covered background area, and outputs the estimated mixture ratio together with the mixture-ratio related information, which is determined with the calculation of the estimated mixture ratio.

An estimated-mixture-ratio processor 242-3 calculates the estimated mixture ratio for each pixel based on component 3 of the input image according to the calculation corresponding to a model of the uncovered background area, and outputs the estimated mixture ratio together with the mixture-ratio related information, which is determined with the calculation of the estimated mixture ratio.

As discussed above, the mixture-ratio calculator 103 configured as shown in FIG. 34 is able to calculate for each component, based on the input image, which is input as the component signal, the estimated mixture ratio by using a model of the covered background area and the estimated mixture ratio by using a model of the uncovered background area. The mixture-ratio calculator 103 outputs the mixture-ratio related information, such as the sum of the foreground components and the gradient of the estimated mixture ratio, for each component corresponding to the estimated mixture ratio calculated by the model corresponding to the covered background area and the estimated mixture ratio calculated by using the model corresponding to the uncovered background area.

When estimating the mixture ratios from the input image, which is input as the component signal, the mixture-ratio calculator 103 may calculate the estimated mixture ratio by using a model corresponding to the covered background area and the estimated mixture ratio by using a model corresponding to the uncovered background area for each component according to the processing by the estimated-mixture-ratio processor 201 or 202, and outputs the corresponding mixture-ratio related information together with the estimated mixture ratios.

The embodiment has been described, assuming that the object corresponding to the background is stationary. However, the above-described mixture-ratio calculation processing can be applied even if the image corresponding to the background area contains motion. For example, if the image corresponding to the background area is uniformly moving, the mixture-ratio calculator 103 shifts the overall image in accordance with this motion, and performs processing in a manner similar to the case in which the object corresponding to the background is stationary. If the image corresponding to the background area contains locally different motions, the mixture-ratio calculator 103 selects the pixels corresponding to the motions as the pixels belonging to the mixed area, and executes the above-described processing.

The area specifying unit 104 is described below.

Figure 35:
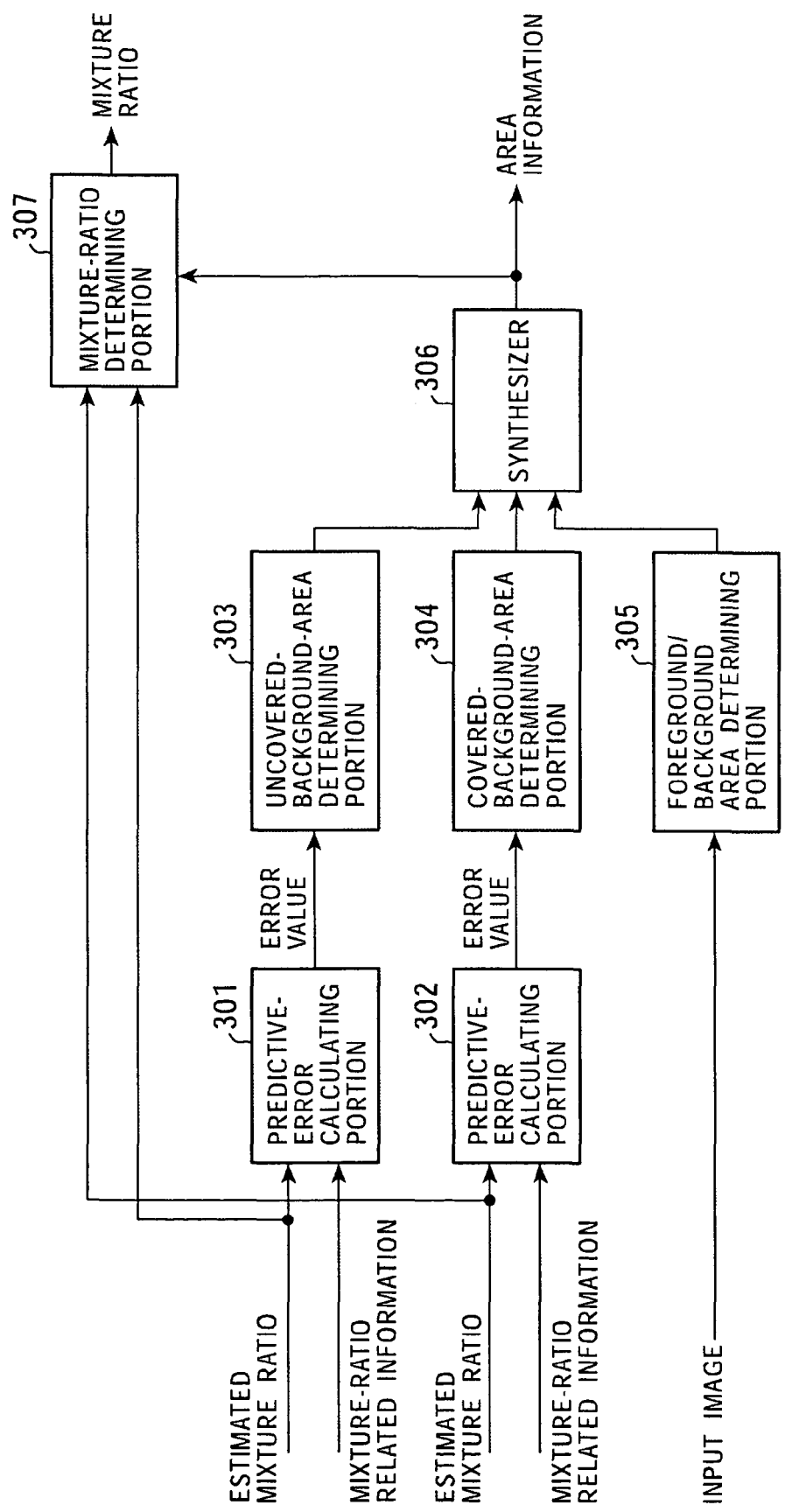
FIG. 35 is a block diagram illustrating the configuration of an area specifying unit 104.

FIG. 35 is a block diagram illustrating the configuration of the area specifying unit 104. A predictive-error calculating portion 301 calculates the error value (predictive error value corresponding to the estimated mixture ratio) for each pixel based on the mixture-ratio related information corresponding to the estimated mixture ratio calculated by using the model of the covered background area and the estimated mixture ratio calculated by using the model of the covered background area, and supplies the calculated error value to an uncovered-background-area determining portion 303.

For example, when the mixture-ratio calculator 103 estimates the mixture ratio by applying the method of least squares to equations (11) through (15), the predictive-error calculating portion 301 calculates the least square sum of the errors, which indicates the error value S, by the calculation corresponding to equation (61), based on the mixture-ratio related information, which is the sum of the foreground components, corresponding to the estimated mixture ratio calculated by the model of the covered background area and the estimated mixture ratio calculated by the model of the covered background area.

$$S = \sum_t \left\{ M - \left( \alpha \cdot B + \sum_i Fi/v \right) \right\}^2 \quad (61)$$

In equation (61), $\alpha$ indicates the estimated mixture ratio, and t indicates the number of frames used for calculating the mixture ratio.

$$\sum_i Fi/v$$

designates the sum of the foreground components, which is the mixture-ratio related information.

A predictive-error calculating portion 302 calculates the error value for each pixel based on the mixture-ratio related information corresponding to the estimated mixture ratio calculated by using a model of the uncovered background area and the estimated mixture ratio calculated by using a model of the uncovered background area, and supplies the calculated error value to a covered-background-area determining portion 304.

The predictive-error calculating portions 301 and 302 may calculate the error value for each pixel by using blocks, each consisting of a plurality of pixels, such as 5×5-pixel blocks.

The predictive-error calculating portions 301 and 302 may preset t, or may obtain t from the mixture-ratio calculator 103 as the mixture-ratio related information.

The uncovered-background-area determining portion 303 determines for each pixel whether the error value supplied from the predictive-error calculating portion 301 is greater than or equal to a prestored threshold Th. If it is determined that the error value is greater than or equal to the threshold Th, the uncovered-background-area determining portion 303 determines that the designated pixel belongs to the uncovered background area, and sets a flag indicating the uncovered background area in correspondence with the designated pixel. The uncovered-background-area determining portion 303 supplies the flag indicating the uncovered background area, which is set for each pixel, to a synthesizer 306.

The covered-background-area determining portion 304 determines for each pixel whether the error value supplied from the predictive-error calculating portion 302 is greater than or equal to the prestored threshold Th. If it is determined that the error value is greater than or equal to the threshold Th, the covered-background-area determining portion 304 determines that the designated pixel belongs to the covered background area, and sets a flag indicating the covered background area in the designated pixel. The covered-background-area determining portion 304 supplies the flag indicating the covered background area, which is set for each pixel, to the synthesizer 306.

A foreground/background area determining portion 305 determines whether the pixel belongs to the foreground area or the background area.

For example, the foreground/background area determining portion 305 determines whether the designated pixel is moving based on the difference between the pixel value of the designated pixel of the designated frame #n and the pixel value of the pixel corresponding to the designated pixel of frame #n−1. The foreground/background area determining portion 305 determines whether the designated pixel is moving based on the difference between the pixel value of the designated pixel of the designated frame #n and the pixel value of the pixel corresponding to the designated pixel of frame #n+1.

If it is determined that the designated pixel from frame #n−1 to frame #n is moving, and that the designated pixel from frame #n to frame #n+1 is moving, the foreground/background area determining portion 305 determines that the designated pixel belongs to the foreground area.

For example, if it is determined that the designated pixel from frame #n−1 to #n is stationary, and that the designated pixel from frame #n to frame #n+1 is stationary, the foreground/background area determining portion 305 determines that the designated pixel belongs to the background area.

The foreground/background area determining portion 305 supplies a flag indicating the foreground area and a flag indicating the background area, which are set for each pixel, to the synthesizer 306.

The synthesizer 306 synthesizes area information for each pixel indicating one of the uncovered background area, the covered background area, the foreground area, and the background area based on the flag indicating the uncovered background area supplied from the uncovered-background-area determining portion 303, the flag indicating the covered background area supplied from the covered-background-area determining portion 304, and the flag indicating the foreground area and the flag indicating the background area supplied from the foreground/background area determining portion 305. The synthesizer 306 supplies the synthesized area information to a mixture-ratio determining portion 307, and also outputs the area information.

A mixture-ratio determining portion 307 determines the mixture ratio α based on the area information supplied from the synthesizer 306. More specifically, the mixture-ratio determining portion 307 sets 0 in the mixture ratio α when the designated pixel belongs to the foreground area. The mixture-ratio determining portion 307 sets 1 in the mixture ratio α when the designated pixel belongs to the background area. When the designated pixel belongs to the covered background area, the mixture-ratio determining portion 307 sets the estimated mixture ratio calculated by the model of the covered background area in the mixture ratio α. When the designated pixel belongs to the uncovered background area, the mixture-ratio determining portion 307 sets the estimated mixture ratio calculated by the model of the uncovered background area in the mixture ratio α. The mixture-ratio determining portion 307 outputs the mixture ratio α determined based on the area information.

The determining processing performed by the uncovered-background-area determining portion 303 is described below with reference to FIGS. 36 and 37.

Figure 36:
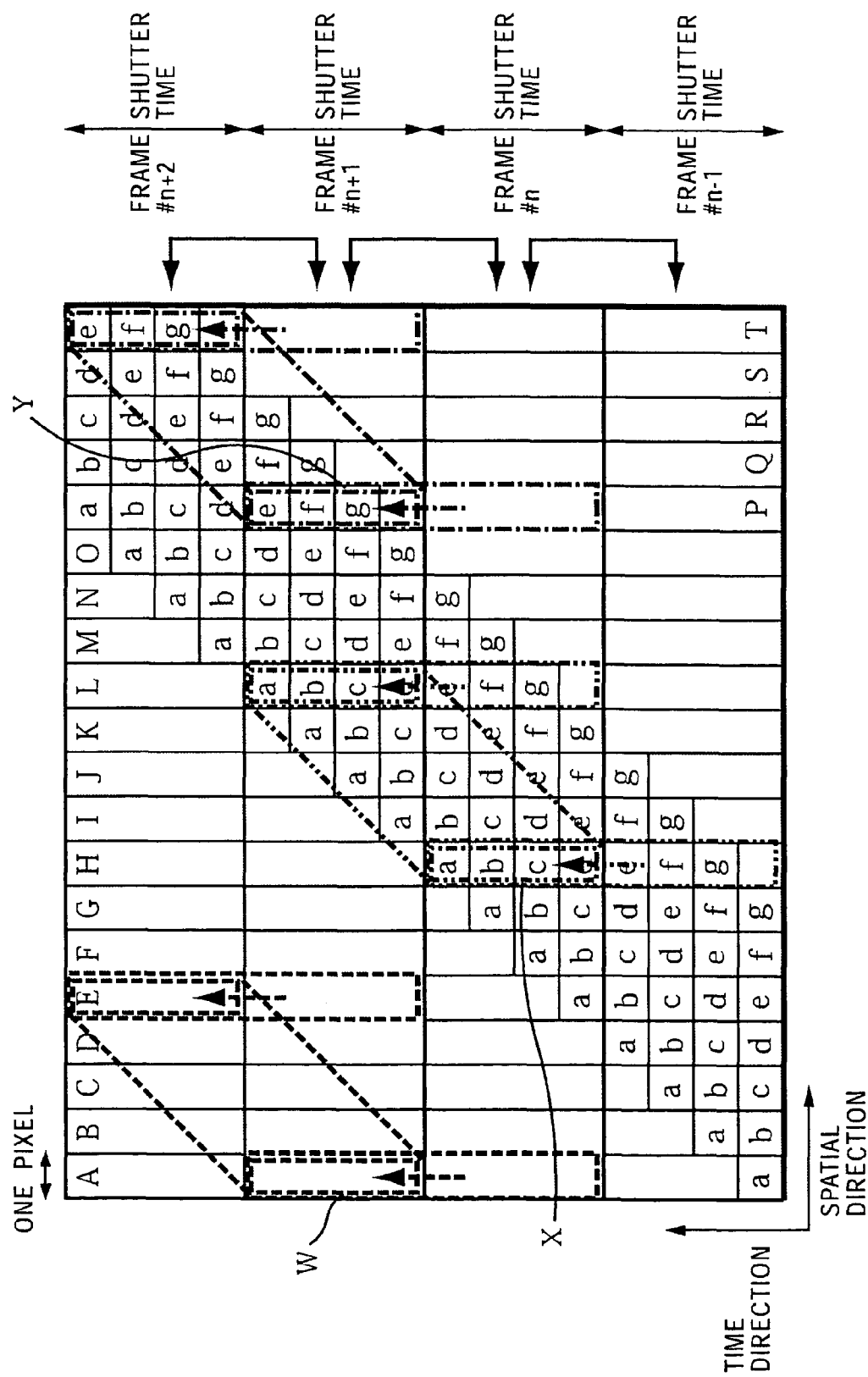
FIG. 36 illustrates the determining processing performed by an uncovered-background-area determining portion 303.

As shown in FIG. 36, since the object corresponding to the background is stationary, the pixel value of the designated pixel belonging to the background area of the designated frame #n is equal to the pixel value of the pixel corresponding to the designated pixel in frame #n+1, which is subsequent to frame #n. In FIG. 36, W indicates the background area. Similarly, since the object corresponding to the background is stationary, the pixel value of the pixel of frame #n+1 indicated by the motion vector based on the designated pixel is equal to the pixel value of the corresponding pixel of frame #n+2.

Accordingly, the estimated mixture ratio calculated by the model of the covered background area corresponding to the pixel belonging to the background area becomes almost 1, and the sum of the foreground components becomes almost 0.

Thus, the error value S calculated by equation (61) becomes almost 0.

In FIG. 36, since the designated pixel belonging to the foreground area indicated by X is motion-compensated, the pixel value of the designated pixel of the designated frame #n is equal to the pixel value of the pixel of frame #n+1 indicated by the motion vector based on the designated pixel. Since the foreground object has a strong correlation in the spatial direction, the values of the foreground components are almost the same.

Accordingly, the estimated mixture ratio and the least square sum of the errors of the sum of the foreground components calculated by the method of least squares become relatively small values, though, strictly speaking, this is not proved based on a physical model.

Naturally, in the covered background area indicated by Y in FIG. 36, the estimated mixture ratio calculated by the method of least squares and the least square sum of the errors of the sum of the foreground components become almost 0.

Figure 37:
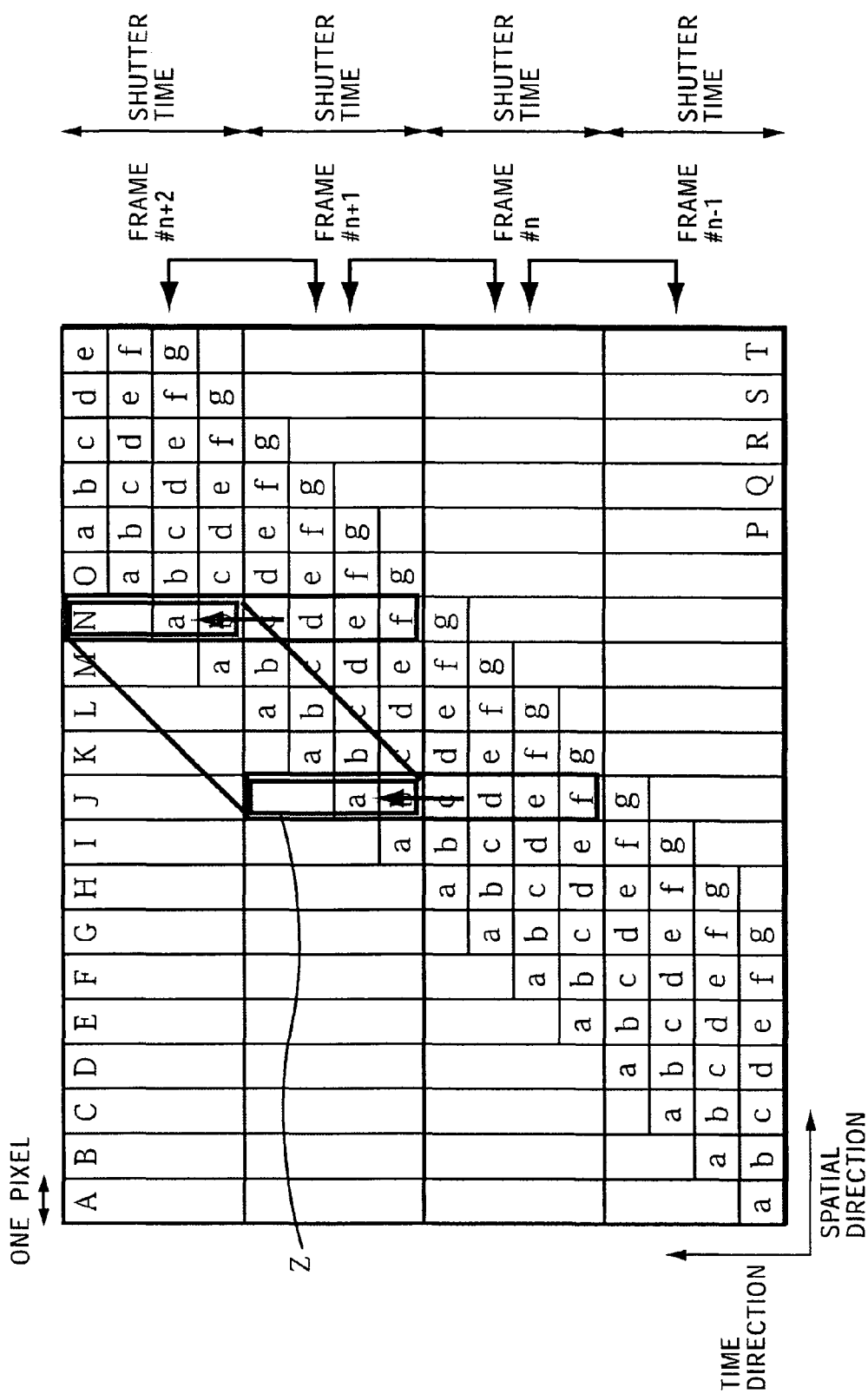
FIG. 37 illustrates the determining processing performed by the uncovered-background-area determining portion 303.

In contrast, as shown in FIG. 37, the foreground components contained in the pixel value of the designated pixel of the designated frame #n belonging to the uncovered background area indicated by Z in FIG. 37 are different from the foreground components contained in the pixel value of the corresponding pixel of frame #n+1, which is subsequent to frame #n. Similarly, the foreground components contained in the pixel value of the pixel of frame #n+1 indicated by the motion vector based on the designated pixel are different from the foreground components contained in the pixel value of the corresponding pixel of frame #n+2.

When determining the solution by setting the estimated mixture ratio and the sum of the foreground components to be unknown variables according to the method of least squares, the sum of the foreground components contained in the pixel value set in the equation cannot be calculated because it is changed.

Accordingly, the estimated mixture ratio and the least square sum of the errors of the sum of the foreground components, which are calculated based on the model of the covered background area according to the method of least squares, become greater values when the designated pixel belongs to the uncovered background area.

Accordingly, the uncovered-background-area determining portion 303 is able to determine whether the designated pixel belongs to the uncovered background area by making a determination as to whether the error value S of the estimated mixture ratio and the sum of the foreground components, which are calculated based on the model of the covered background area according to the method of least squares, is greater than or equal to the threshold Th.

Similarly, the covered-background-area determining portion 304 is able to determine whether the designated pixel belongs to the covered background area by making a determination as to whether the error value S of the estimated mixture ratio and the sum of the foreground components, which are calculated based on the model of the uncovered background area according to the method of least squares, is greater than or equal to the threshold Th.

FIGS. 38 through 43 illustrate input images and examples of the results of the area determinations performed by the area specifying unit 104.

Figure 38:
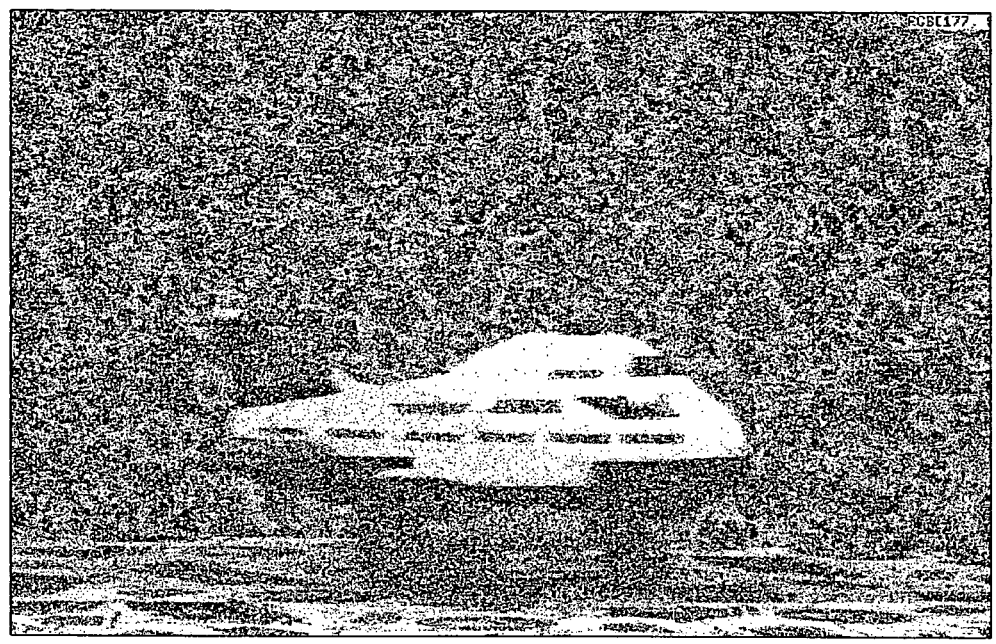
FIG. 38 illustrates an example of an input image.

FIG. 38 illustrates an input image. In the input image shown in FIG. 38, the foreground object is moving from the left to the right in the drawing.

Figure 39:
FIG. 39 illustrates an example of area determining results.

The image shown in FIG. 39 is the result obtained by making a determination for each pixel of the input image shown in FIG. 38 by the area specifying unit 104 by setting the threshold Th to be 70 based on the estimated mixture ratio and the sum of the foreground components, which are calculated by the mixture-ratio calculator 103 by using seven frames.

Figure 40:
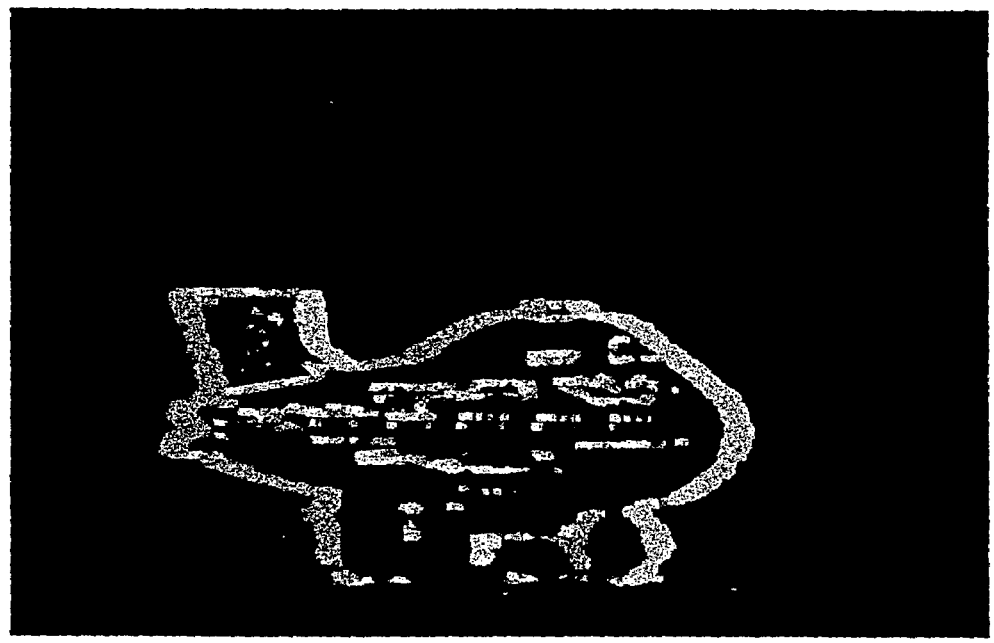
FIG. 40 illustrates an example of area determining results.

The image shown in FIG. 40 is the result obtained by making a determination for each 5×5-pixel block of the input image shown in FIG. 38 by the area specifying unit 104 by assuming that the mixture ratio in the same block is uniform and by setting the threshold Th of the sum of the error values S of each block to be 750 and by setting the threshold Th of the error value S of each pixel within the block to be 10 based on the estimated mixture ratio and the sum of the foreground components, which are calculated by the mixture-ratio calculator 103 by using three frames.

Figure 41:
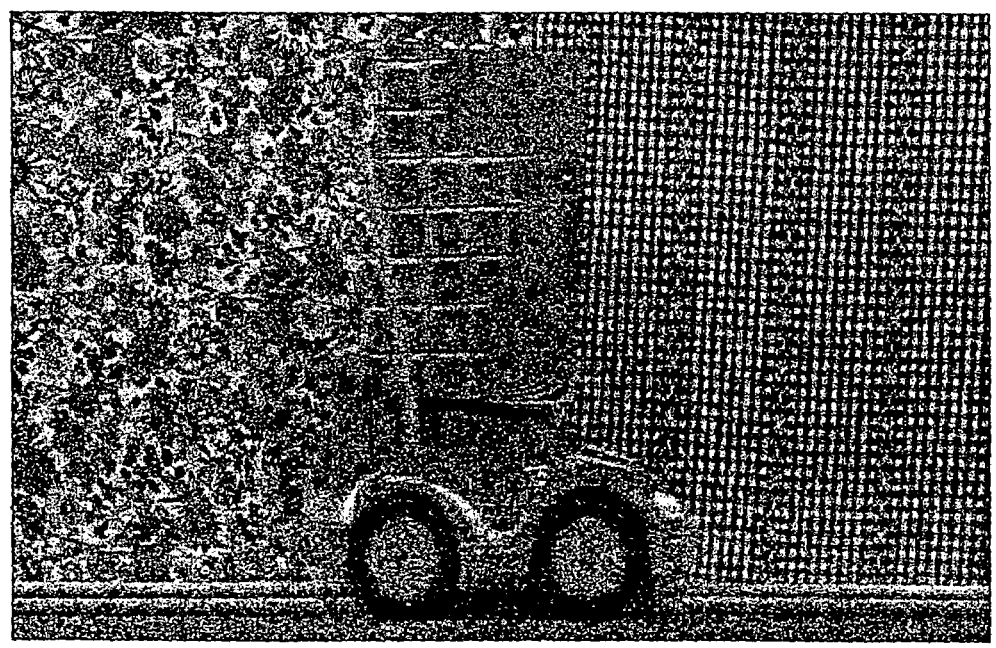
FIG. 41 illustrates an example of an input image.

FIG. 41 illustrates an input image. In the input image shown in FIG. 41, the foreground object is moving from the left to the right in the drawing.

Figure 42:
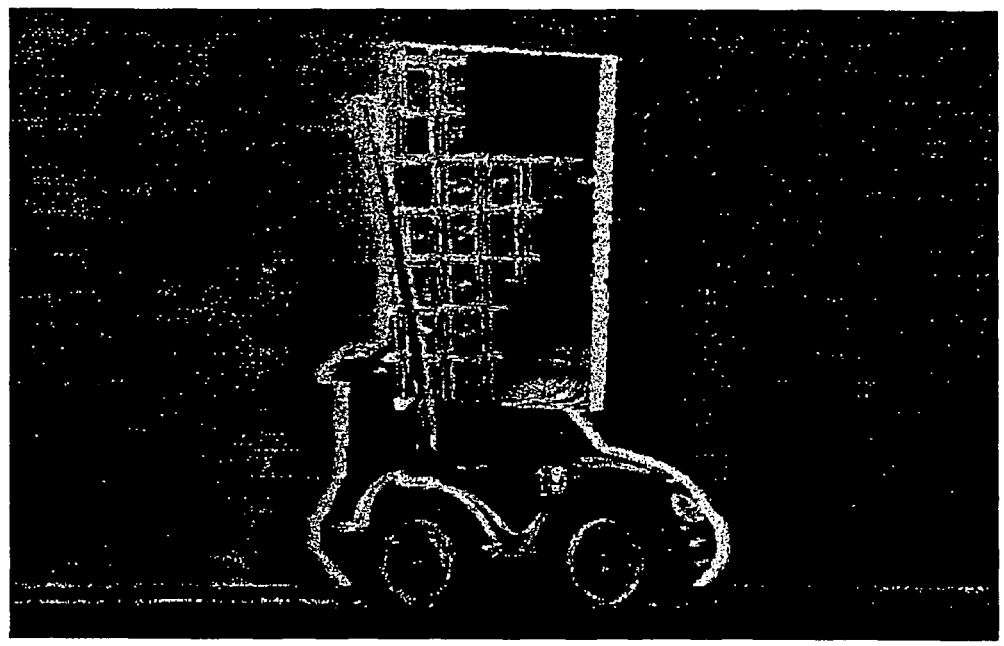
FIG. 42 illustrates an example of area determining results.

The image shown in FIG. 42 is the result obtained by making a determination for each pixel of the input image shown in FIG. 41 by the area specifying unit 104 by setting the threshold Th to be 70 based on the estimated mixture ratio and the sum of the foreground components, which are calculated by the mixture-ratio calculator 103 by using seven frames.

Figure 43:
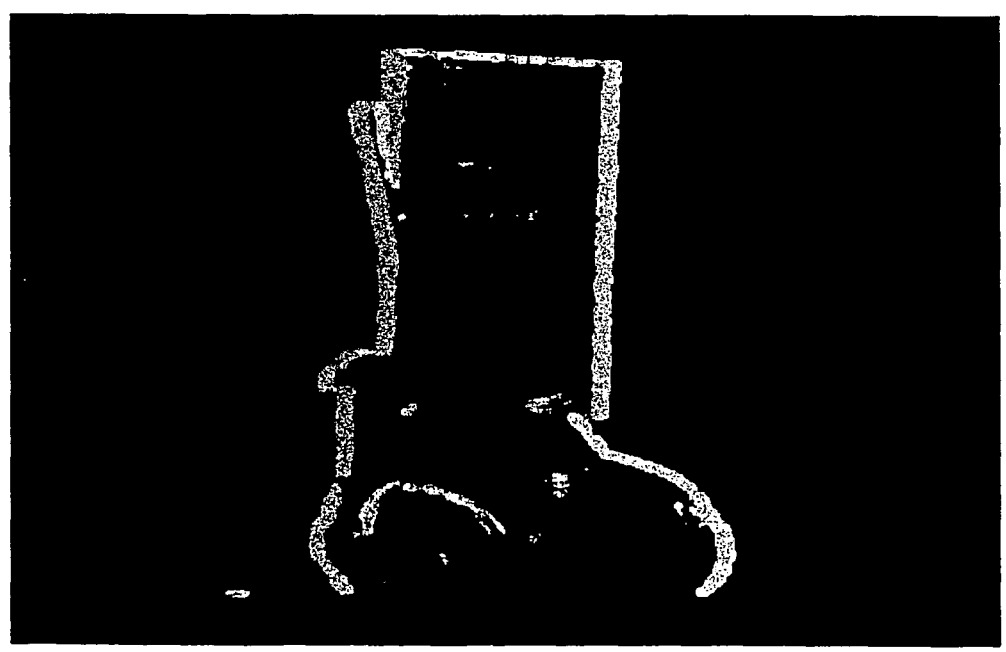
FIG. 43 illustrates an example of area determining results.

The image shown in FIG. 43 is the result obtained by making a determination for each 5×5-pixel block of the input image shown in FIG. 41 by the area specifying unit 104 by assuming that the mixture ratio in the same block is uniform and by setting the threshold Th of the sum of the error values S of each block to be 750 and by setting the threshold Th of the error value S of each pixel within the block to be 10 based on the estimated mixture ratio and the sum of the foreground components, which are calculated by the mixture-ratio calculator 103 by using three frames.

In FIGS. 39 through 43, the covered background area is positioned at the leading end in the direction in which the foreground object is moving with respect to the foreground area, and the uncovered background area is positioned at the trailing end in the direction in which the foreground object is moving with respect to the foreground area.

As shown in FIGS. 38 through 43, the area specifying unit 104 is able to determine the areas almost precisely.

A description is given below of the processing of the area specifying unit 104 when the mixture-ratio calculator 103 estimates the mixture ratio by applying the method of least squares to equations (28) through (36) and outputs the data indicating the gradient of the estimated mixture ratio as the mixture-ratio related information together with the estimated mixture ratio.

The pixel value M of the designated pixel is expressed by equation (62) according to equation (27).

$$M = (jm + kq + p) \cdot B + j \cdot s + k \cdot t + u \quad (62)$$

In equation (62), j indicates the index in the horizontal direction and k indicates the index in the vertical direction when the position of the designated pixel is set to 0. In equation (62), m designates the horizontal gradient in the plane of the mixture ratio α, q is the vertical gradient in the plane of the mixture ratio α, and p indicates the intercept of the plane of the mixture ratio α. In equation (62), s, t, and u are variables indicating the relationship between m, q, and p and the foreground components, as expressed by equations (23) through (25).

The predictive-error calculating portion 301 is able to calculate the least square sum of errors, which is the error value S, by the calculation corresponding to equation (63) based on the mixture-ratio related information containing j, k, m, q, p, s, t, and u corresponding to the estimated mixture ratio calculated by the model of the covered background area and the estimated mixture ratio calculated by the model of the covered background area.

$$S = \sum_{x,y} \{M - [(jm + kq + p) \cdot B + j \cdot s + k \cdot t + u]\}^2 \quad (63)$$

The predictive-error calculating portion 302 is able to calculate the error value for each pixel by the calculation corresponding to equation (63) based on the mixture-ratio related information corresponding to the estimated mixture ratio calculated by the model of the uncovered background area and the estimated mixture ratio calculated by the model of the uncovered background area, and supplies the calculated error value to the covered-background-area determining portion 304.

The uncovered-background-area determining portion 303 determines for each pixel whether the error value supplied from the predictive-error calculating portion 301 is greater than or equal to the prestored threshold Th. If it is determined that the error value is greater than or equal to the prestored threshold Th, the uncovered-background-area determining portion 303 determines that the designated pixel belongs to the uncovered background area, and sets a flag indicating the uncovered background area in correspondence with the designated pixel. The uncovered-background-area determining portion 303 supplies the flag indicating the uncovered background area, which is set for each pixel, to the synthesizer 306.

The covered-background-area determining portion 304 determines for each pixel whether the error value supplied from the predictive-error calculating portion 302 is greater than or equal to the prestored threshold Th. If it is determined that the error value is greater than or equal to the prestored threshold Th, the covered-background-area determining portion 304 determines that the designated pixel belongs to the covered background area, and sets a flag indicating the covered background area in correspondence with the designated pixel. The covered-background-area determining portion 304 supplies the flag indicating the covered background area, which is set for each pixel, to the synthesizer 306.

The foreground/background area determining portion 305 determines whether each pixel belongs to the foreground area or the background area, and supplies a flag indicating the foreground area and a flag indicating the background area, the flag being set for each pixel, to the synthesizer 306.

The synthesizer 306 synthesizes area information indicating one of the uncovered background area, the covered background area, the foreground area, and the background area for each pixel based on the flag indicating the uncovered background area supplied from the uncovered-background-area determining portion 303, the flag indicating the covered background area supplied from the covered-background-area determining portion 304, and the flag indicating the foreground area and the flag indicating the background area supplied from the foreground/background area determining portion 305. The synthesizer 306 supplies the synthesized area information to the mixture-ratio determining portion 307, and also outputs the area information.

The mixture-ratio determining portion 307 determines the mixture ratio α based on the area information supplied from the synthesizer 306.

As described above, the area specifying unit 104 is able to generate area information based on the estimated mixture ratio and the mixture-ratio related information in correspondence with the method for estimating the mixture ratio by the mixture-ratio calculator 103.

Figure 44:
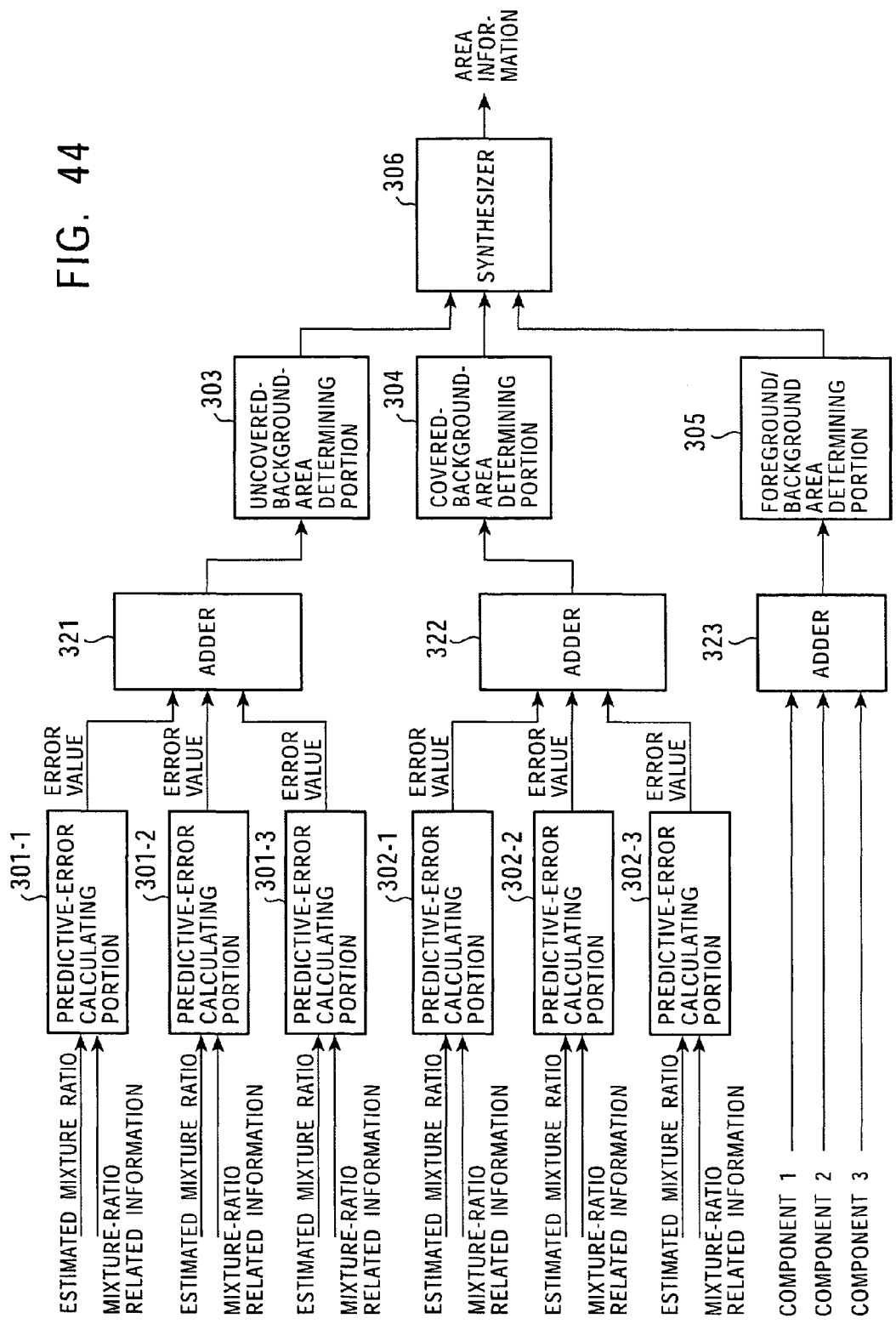
FIG. 44 is a block diagram illustrating another configuration of the area specifying unit 104.

FIG. 44 is a block diagram illustrating the configuration of the area specifying unit 104 for specifying the area based on the mixture ratios estimated for each component signal, the corresponding mixture-ratio related information, and the input image, which is input as the component signal. The elements similar to those shown in FIG. 35 are indicated by like reference numerals, and an explanation thereof is thus omitted.

A predictive-error calculating portion 301-1 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 1 of the input image, and supplies the calculated error value to an adder 321.

A predictive-error calculating portion 301-2 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 2 of the input image, and supplies the calculated error value to the adder 321.

A predictive-error calculating portion 301-3 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 3 of the input image, and supplies the calculated error value to the adder 321.

A predictive-error calculating portion 302-1 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 1 of the input image, and supplies the calculated error value to an adder 322.

A predictive-error calculating portion 302-2 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 2 of the input image, and supplies the calculated error value to the adder 322.

A predictive-error calculating portion 302-3 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 3 of the input image, and supplies the calculated error value to the adder 322.

The adder 321 adds the error value supplied from the predictive-error calculating portion 301-1, the error value supplied from the predictive-error calculating portion 301-2, and the error value supplied from the predictive-error calculating portion 301-3, and supplies the added error value to the uncovered-background-area determining portion 303.

The adder 322 adds the error value supplied from the predictive-error calculating portion 302-1, the error value supplied from the predictive-error calculating portion 302-2, and the error value supplied from the predictive-error calculating portion 302-3, and supplies the added error value to the covered-background-area determining portion 304.

An adder 323 adds component 1 of the input image, component 2 of the input image, and component 3 of the input image, and supplies added component 1, component 2, and component 3 to the foreground/background area determining portion 305.

The uncovered-background-area determining portion 303 determines for each pixel whether the error value supplied from the adder 321 is greater than or equal to the prestored threshold Th. If it is determined that the error value is greater than or equal to the threshold Th, the uncovered-background-area determining portion 303 determines that the designated pixel belongs to the uncovered background area, and sets a flag indicating the uncovered background area in correspondence with the designated pixel. The uncovered-background-area determining portion 303 supplies the flag indicating the uncovered background area, which is set for each pixel, to the synthesizer 306.

The covered-background-area determining portion 304 determines for each pixel whether the error value supplied from the adder 322 is greater than or equal to the prestored threshold Th. If it is determined that the error value is greater than or equal to the threshold Th, the covered-background-area determining portion 304 determines that the designated pixel belongs to the covered background area, and sets a flag indicating the covered background area in correspondence with the designated pixel. The covered-background-area determining portion 304 supplies the flag indicating the covered background area, which is set for each pixel, to the synthesizer 306.

The foreground/background area determining portion 305 determines based on the added component 1, component 2, and component 3 whether each pixel belongs to the foreground area or the background area, and supplies a flag indicating the foreground area and a flag indicating the background area, which are set for each pixel, to the synthesizer 306.

The synthesizer 306 synthesizes area information indicating one of the uncovered background area, the covered background area, the foreground area, and the background area based on the flag indicating the uncovered background area supplied from the uncovered-background-area determining portion 303, the flag indicating the covered background area supplied from the covered-background-area determining portion 304, and the flag indicating the foreground area and the flag indicating the background area supplied from the foreground/background area determining portion 305. The synthesizer 306 supplies the synthesized area information to the mixture-ratio determining portion 307, and also outputs the area information.

As described above, the area specifying unit 104 shown in FIG. 44 is able to specify the area based on the mixture ratio estimated for each component signal and the corresponding mixture-ratio related information, and the input image, which is input as the component signal. The area specifying unit 104 configured as shown in FIG. 44 is able to specify the area more precisely compared to the area specifying unit 104 configured as shown in FIG. 35.

Figure 45:
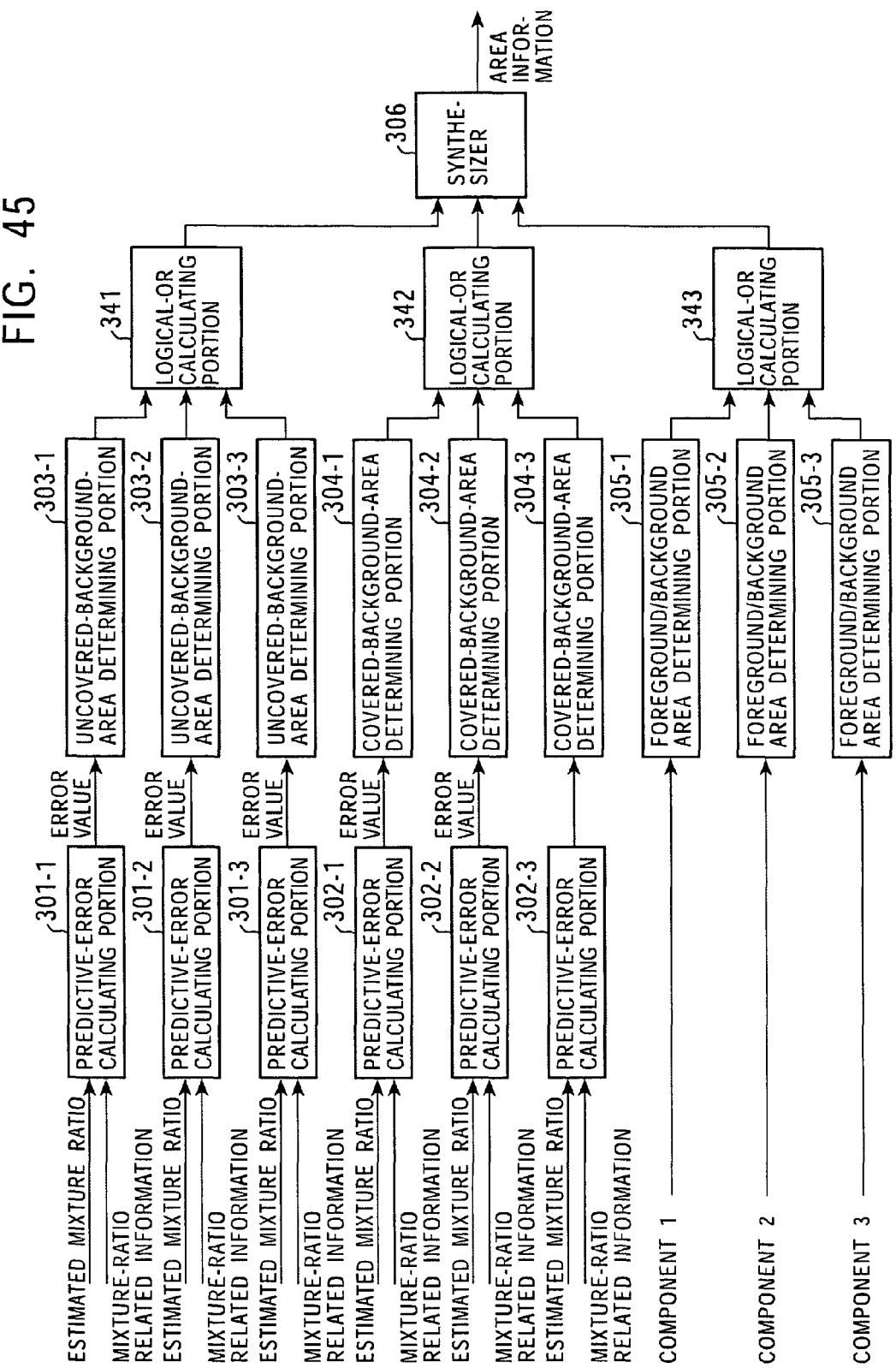
FIG. 45 is a block diagram illustrating still another configuration of the area specifying unit 104.

FIG. 45 is a block diagram illustrating another configuration of the area specifying unit 104 for specifying the area based on the mixture ratio estimated for each component signal and the corresponding mixture-ratio related information, and the input signal, which is input as the component signal.

The elements similar to those shown in FIG. 44 are designated with like reference numerals, and an explanation thereof is thus omitted.

The predictive-error calculating portion 301-1 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 1 of the input image, and supplies the calculated error value to an uncovered-background-area determining portion 303-1.

The predictive-error calculating portion 301-2 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 2 of the input image, and supplies the calculated error value to an uncovered-background-area determining portion 303-2.

The predictive-error calculating portion 301-3 calculates the error value for each pixel based on the mixture-ratio related information corresponding to the estimated mixture ratio calculated by a model of the covered background area and the estimated mixture ratio calculated by a model of the covered background area, the estimated mixture ratios being calculated from component 3 of the input image, and supplies the calculated error value to an uncovered-background-area determining portion 303-3.

The predictive-error calculating portion 302-1 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 1 of the input image, and supplies the calculated error value to a covered-background-area determining portion 304-1.

The predictive-error calculating portion 302-2 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 2 of the input image, and supplies the calculated error value to a covered-background-area determining portion 304-2.

The predictive-error calculating portion 302-3 calculates the error value for each pixel based on the mixture-ratio related information corresponding to the estimated mixture ratio calculated by a model of the uncovered background area and the estimated mixture ratio calculated by a model of the uncovered background area, the estimated mixture ratios being calculated from component 3 of the input image, and supplies the calculated error value to a covered-background-area determining portion 304-3.

The uncovered-background-area determining portion 303-1 determines for each pixel whether the error value supplied from the predictive-error calculating portion 301-1 is greater than or equal to the prestored threshold Th. If it is determined that the error value is greater than or equal to the threshold Th, the uncovered-background-area determining portion 303-1 determines that the designated pixel belongs to the uncovered background area, and sets a flag indicating the uncovered background area in correspondence with the designated pixel. The uncovered-background-area determining portion 303-1 supplies the flag indicating the uncovered background area, which is set for each pixel, to a logical-OR calculating portion 341.

The uncovered-background-area determining portion 303-2 determines for each pixel whether the error value supplied from the predictive-error calculating portion 301-2 is greater than or equal to the prestored threshold Th. If it is determined that the error value is greater than or equal to the threshold Th, the uncovered-background-area determining portion 303-2 determines that the designated pixel belongs to the uncovered background area, and sets a flag indicating the uncovered background area in correspondence with the designated pixel. The uncovered-background-area determining portion 303-2 supplies the flag indicating the uncovered background area, which is set for each pixel, to the logical-OR calculating portion 341.

The uncovered-background-area determining portion 303-3 determines for each pixel whether the error value supplied from the predictive-error calculating portion 301-3 is greater than or equal to the prestored threshold Th. If it is determined that the error value is greater than or equal to the threshold Th, the uncovered-background-area determining portion 303-3 determines that the designated pixel belongs to the uncovered background area, and sets a flag indicating the uncovered background area in correspondence with the designated pixel. The uncovered-background-area determining portion 303-3 supplies the flag indicating the uncovered background area, which is set for each pixel, to the logical-OR calculating portion 341.

The covered-background-area determining portion 304-1 determines for each pixel whether the error value supplied from the predictive-error calculating portion 302-1 is greater than or equal to the prestored threshold Th. If it is determined that the error value is greater than or equal to the threshold Th, the covered-background-area determining portion 304-1 determines that the designated pixel belongs to the covered background area, and sets a flag indicating the covered background area in correspondence with the designated pixel. The covered-background-area determining portion 304-1 supplies the flag indicating the covered background area, which is set for each pixel, to a logical-OR calculating portion 342.

The covered-background-area determining portion 304-2 determines for each pixel whether the error value supplied from the predictive-error calculating portion 302-2 is greater than or equal to the prestored threshold Th. If it is determined that the error value is greater than or equal to the threshold Th, the covered-background-area determining portion 304-2 determines that the designated pixel belongs to the covered background area, and sets a flag indicating the covered background area in correspondence with the designated pixel. The covered-background-area determining portion 304-2 supplies the flag indicating the covered background area, which is set for each pixel, to the logical-OR calculating portion 342.

The covered-background-area determining portion 304-3 determines for each pixel whether the error value supplied from the predictive-error calculating portion 302-3 is greater than or equal to the prestored threshold Th. If it is determined that the error value is greater than or equal to the threshold Th, the covered-background-area determining portion 304-3 determines that the designated pixel belongs to the covered background area, and sets a flag indicating the covered background area in correspondence with the designated pixel. The covered-background-area determining portion 304-3 supplies the flag indicating the covered background area, which is set for each pixel, to the logical-OR calculating portion 342.

A foreground/background area determining portion 305-1 determines based on component 1 whether each pixel belongs to the foreground area or the background area, and supplies a flag indicating the foreground area or a flag indicating the background area, which is set for each pixel, to a logical-OR calculating portion 343.

A foreground/background area determining portion 305-2 determines based on component 2 whether each pixel belongs to the foreground area or the background area, and supplies a flag indicating the foreground area or a flag indicating the background area, which is set for each pixel, to the logical-OR calculating portion 343.

A foreground/background area determining portion 305-3 determines based on component 3 whether each pixel belongs to the foreground area or the background area, and supplies a flag indicating the foreground area or a flag indicating the background area, which is set for each pixel, to the logical-OR calculating portion 343.

The logical-OR calculating portion 341 calculates the logical OR of the uncovered background area indicated by the flag supplied from the uncovered-background-area determining portion 303-1, the uncovered background area indicated by the flag supplied from the uncovered-background-area determining portion 303-2, and the uncovered background area indicated by the flag supplied from the uncovered-background-area determining portion 303-3 based on the flag indicating the uncovered background area supplied from the uncovered-background-area determining portion 303-1, the flag indicating the uncovered background area supplied from the uncovered-background-area determining portion 303-2, and the flag indicating the uncovered background area supplied from the uncovered-background-area determining portion 303-3 so as to generate a flag indicating the uncovered background area calculated by the logical OR. The logical-OR calculating portion 341 supplies the generated flag indicating the uncovered background area to the synthesizer 306.

The logical-OR calculating portion 342 calculates the logical OR of the covered background area indicated by the flag supplied from the covered-background-area determining portion 304-1, the covered background area indicated by the flag supplied from the covered-background-area determining portion 304-2, and the covered background area indicated by the flag supplied from the covered-background-area determining portion 304-3 based on the flag indicating the covered background area supplied from the covered-background-area determining portion 304-1, the flag indicating the covered background area supplied from the covered-background-area determining portion 304-2, and the flag indicating the covered background area supplied from the covered-background-area determining portion 304-3 so as to generate a flag indicating the covered background area calculated by the logical OR. The logical-OR calculating portion 342 supplies the generated flag indicating the covered background area to the synthesizer 306.

The logical-OR calculating portion 343 calculates the logical OR of the foreground area indicated by the flag supplied from the foreground/background area determining portion 305-1, the foreground area indicated by the flag supplied from the foreground/background area determining portion 305-2, and the foreground area indicated by the flag supplied from the foreground/background area determining portion 305-3 based on the flag indicating the foreground area supplied from the foreground/background area determining portion 305-1, the flag indicating the foreground area supplied from the foreground/background area determining portion 305-2, and the flag indicating the foreground area supplied from the foreground/background area determining portion 305-3 so as to generate a flag indicating the foreground area calculated by the logical OR. The logical-OR calculating portion 343 supplies the generated flag indicating the foreground area to the synthesizer 306.

The logical-OR calculating portion 343 calculates the logical OR of the background area indicated by the flag supplied from the foreground/background area determining portion 305-1, the background area indicated by the flag supplied from the foreground/background area determining portion 305-2, and the background area indicated by the flag supplied from the foreground/background area determining portion 305-3 based on the flag indicating the background area supplied from the foreground/background area determining portion 305-1, the flag indicating the background area supplied from the foreground/background area determining portion 305-2, and the flag indicating the background area supplied from the foreground/background area determining portion 305-3 so as to generate a flag indicating the background area calculated by the logical OR. The logical-OR calculating portion 343 supplies the generated flag indicating the background area to the synthesizer 306.

The synthesizer 306 synthesizes area information indicating one of the uncovered background area, the covered background area, the foreground area, and the background area for each pixel based on the flag indicating the uncovered background area supplied from the logical-OR calculating portion 341, the flag indicating the covered background area supplied from the logical-OR calculating portion 342, and the flag indicating the foreground area and the flag indicating the background area supplied from the logical-OR calculating portion 343. The synthesizer 306 outputs the synthesized area information.

The area specifying unit 104 configured as shown in FIG. 45 is able to output the area information that specifies the entirety of each of the foreground area, the background area, the covered background area, and the uncovered background area.

Figure 46:
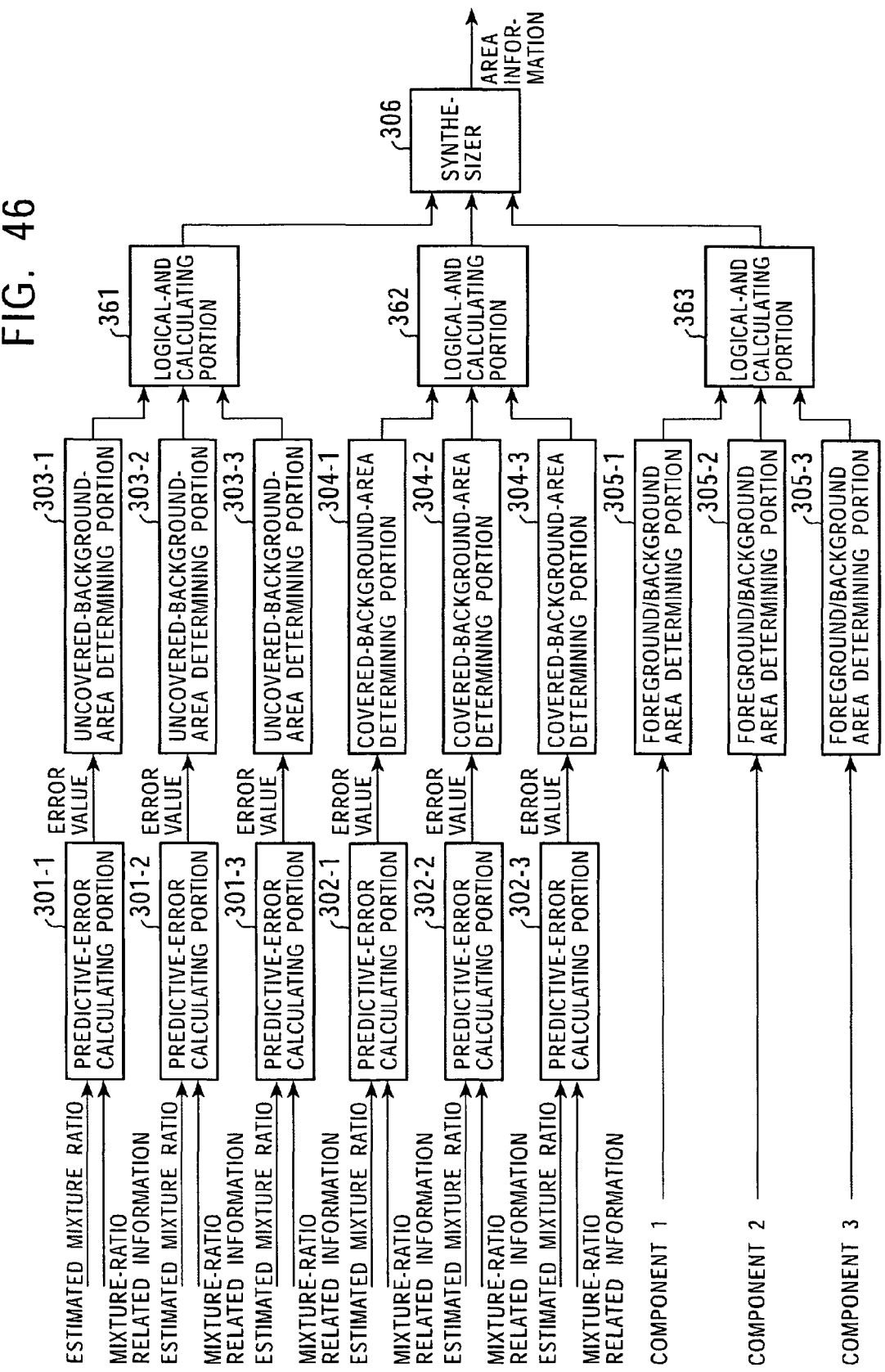
FIG. 46 is a block diagram illustrating a further configuration of the area specifying unit 104.

FIG. 46 is a block diagram illustrating still another configuration of the area specifying unit 104 for specifying the area based on the mixture ratio estimated for each component signal and the corresponding mixture-ratio related information, and the input image, which is input as the component signal.

The elements similar to those shown in FIG. 45 are indicated by like reference numerals, and an explanation thereof is thus omitted.

A logical-AND calculating portion 361 calculates the logical AND of the uncovered background area indicated by the flag supplied from the uncovered-background-area determining portion 303-1, the uncovered background area indicated by the flag supplied from the uncovered-background-area determining portion 303-2, and the uncovered background area indicated by the flag supplied from the uncovered-background-area determining portion 303-3 based on the flag indicating the uncovered background area supplied from the uncovered-background-area determining portion 303-1, the flag indicating the uncovered background area supplied from the uncovered-background-area determining portion 303-2, and the flag indicating the uncovered background area supplied from the uncovered-background-area determining portion 303-3, and generates a flag indicating the uncovered background area calculated by the logical AND. The logical-AND calculating portion 361 supplies the generated flag indicating the uncovered background area to the synthesizer 306.

A logical-AND calculating portion 362 calculates the logical AND of the covered background area indicated by the flag supplied from the covered-background-area determining portion 304-1, the covered background area indicated by the flag supplied from the covered-background-area determining portion 304-2, and the covered background area indicated by the flag supplied from the covered-background-area determining portion 304-3 based on the flag indicating the covered background area supplied from the covered-background-area determining portion 304-1, the flag indi- cating the covered background area supplied from the covered-background-area determining portion 304-2, and the flag indicating the covered background area supplied from the covered-background-area determining portion 304-3, and generates a flag indicating the covered background area calculated by the logical AND. The logical-AND calculating portion 362 supplies the generated flag indicating the covered background area to the synthesizer 306.

A logical-AND calculating portion 363 calculates the logical AND of the foreground area indicated by the flag supplied from the foreground/background area determining portion 305-1, the foreground area indicated by the flag supplied from the foreground/background area determining portion 305-2, and the foreground area indicated by the flag supplied from the foreground/background area determining portion 305-3 based on the flag indicating the foreground area supplied from the foreground/background area determining portion 305-1, the flag indicating the foreground area supplied from the foreground/background area determining portion 305-2, and the flag indicating the foreground area supplied from the foreground/background area determining portion 305-3, and generates a flag indicating the foreground area calculated by the logical AND. The logical-AND calculating portion 363 supplies the generated flag indicating the foreground area to the synthesizer 306.

The logical-AND calculating portion 363 calculates the logical AND of the background area indicated by the flag supplied from the foreground/background area determining portion 305-1, the background area indicated by the flag supplied from the foreground/background area determining portion 305-2, and the background area indicated by the flag supplied from the foreground/background area determining portion 305-3 based on the flag indicating the background area supplied from the foreground/background area determining portion 305-1, the flag indicating the background area supplied from the foreground/background area determining portion 305-2, and the flag indicating the background area supplied from the foreground/background area determining portion 305-3, and generates a flag indicating the background area calculated by the logical AND. The logical-AND calculating portion 363 supplies the generated flag indicating the background area to the synthesizer 306.

The synthesizer 306 synthesizes area information indicating one of the uncovered background area, the covered background area, the foreground area, and the background area for each pixel based on the flag indicating the uncovered background area supplied from the logical AND calculating portion 361, the flag indicating the covered background area supplied from the logical AND calculating portion 362, and the flag indicating the foreground area and the flag indicating the background area supplied from the logical AND calculating portion 363. The synthesizer 306 outputs the synthesized area information.

The area specifying unit 104 configured as shown in FIG. 46 is able to output area information having small errors.

Figure 47:
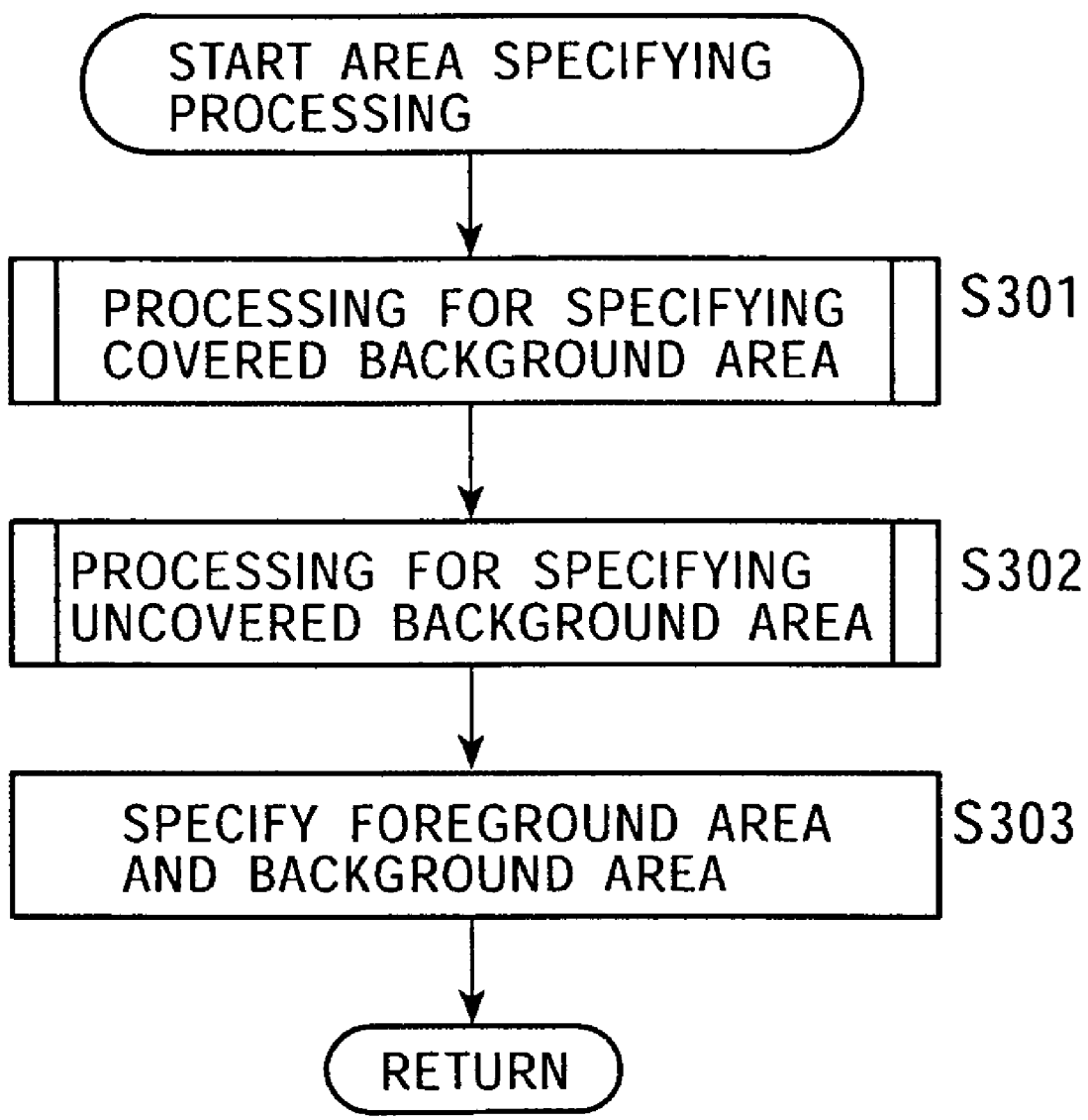
FIG. 47 is a flowchart illustrating the area specifying processing.

The area specifying processing performed by the area specifying unit 104 is described below with reference to the flowchart of FIG. 47. In step S301, the area specifying unit 104 performs processing for specifying the covered background area for each pixel based on the error value. Details of the covered-background-area specifying processing are given below.

In step S302, the area specifying unit 104 performs processing for specifying the uncovered background area for each pixel based on the error value. Details of the uncovered-background-area specifying processing are given below.

In step S303, the foreground/background area determining portion 305 specifies the foreground or the background for each pixel, and the processing is completed.

Figure 48:
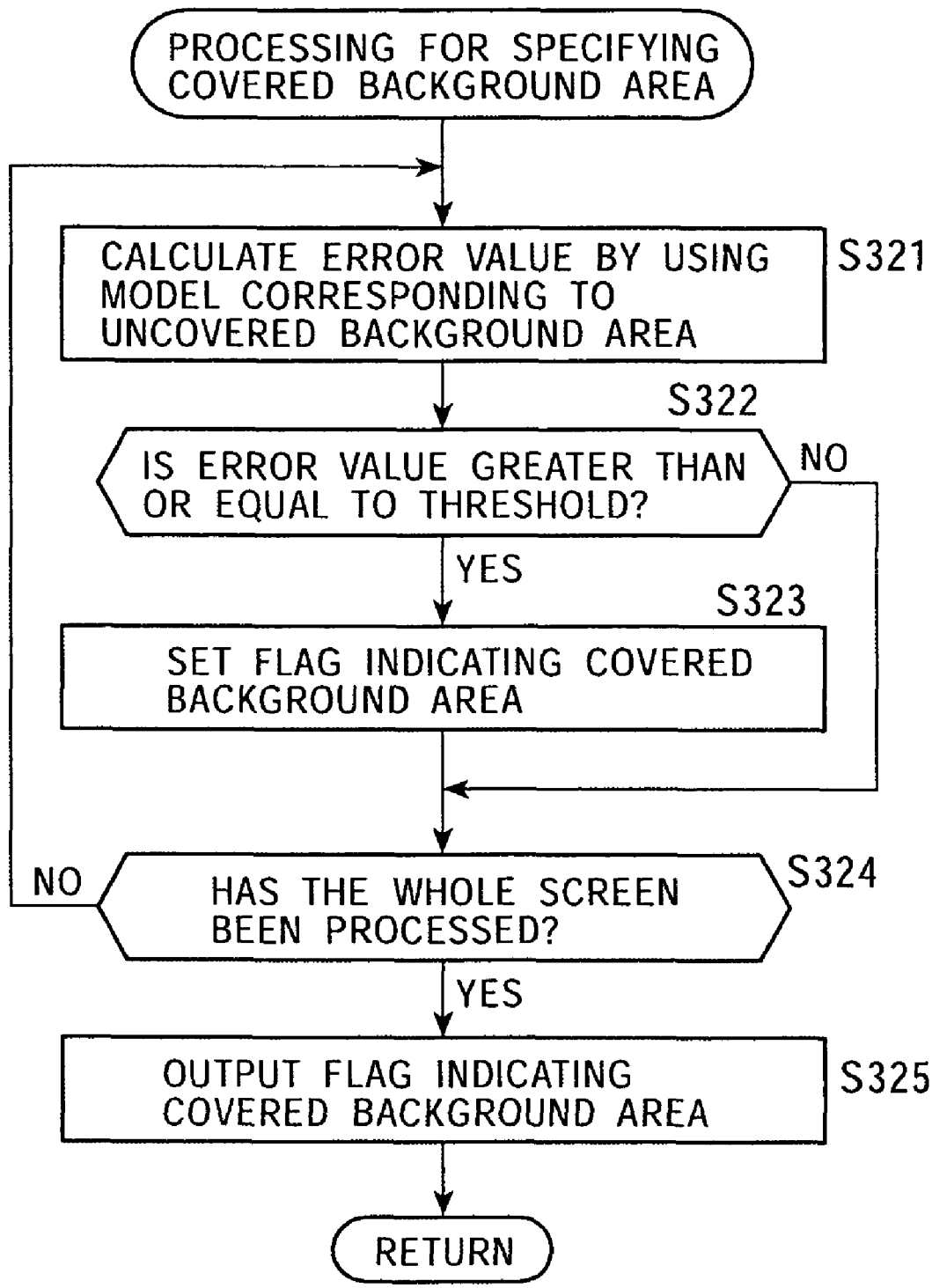
FIG. 48 is a flowchart illustrating the processing for specifying a covered background area.

The covered-background-area specifying processing corresponding to step S301 is discussed below with reference to the flowchart of FIG. 48.

In step S321, the predictive-error calculating portion 302 calculates the error value by using a model corresponding to the uncovered background area. The predictive-error calculating portion 302 supplies the calculated error value to the covered-background-area determining portion 304.

In step S322, the covered-background-area determining portion 304 determines whether the error value supplied from the predictive-error calculating portion 302 is greater than or equal to the threshold Th. If it is determined that the error value is greater than or equal to the threshold Th, the process proceeds to step S323. In step S323, the predictive-error calculating portion 302 sets the flag indicating the covered background area in the pixel having the error value. The process then proceeds to step S324.

If it is determined in step S322 that the error value is not greater than or equal to the threshold Th, it can be proved that the pixel does not belong to the covered background area. Accordingly, the processing of step S323 is skipped, and the process proceeds to step S324.

In step S324, the area specifying unit 104 determines whether the processing has been performed for the whole screen. If it is determined that the processing has not been performed for the whole screen, the process returns to step S321, and the covered-background-area determining processing is repeated.

If it is determined in step S324 that the processing has been performed for the whole screen, the process proceeds to step S325 in which the covered-background-area determining portion 304 outputs a flag indicating the covered background area. The processing is then completed.

Figure 49:
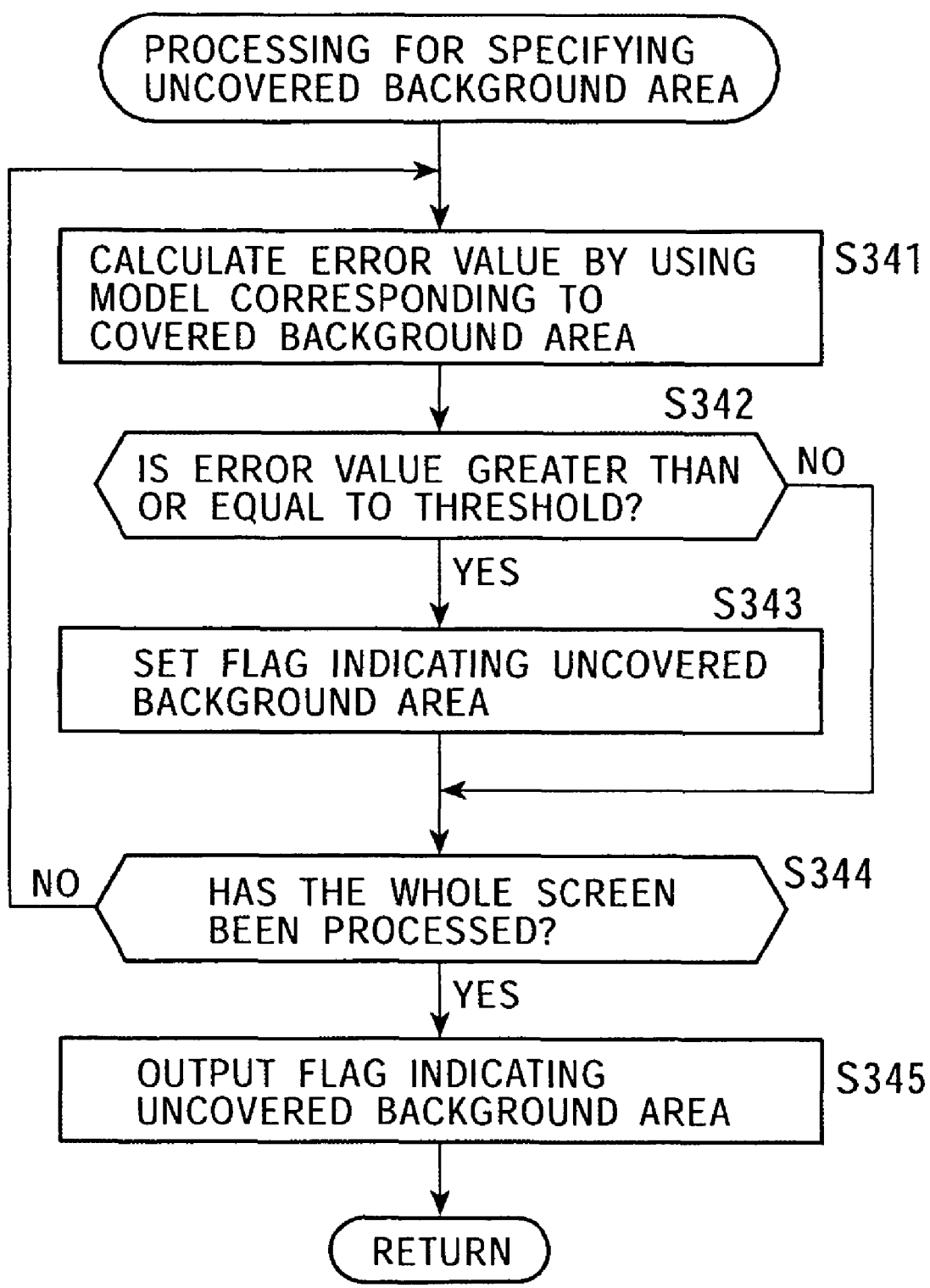
FIG. 49 is a flowchart illustrating the processing for specifying an uncovered background area.

The uncovered-background-area specifying processing corresponding to step S302 is discussed below with reference to the flowchart of FIG. 49.

In step S341, the predictive-error calculating portion 301 calculates the error value by using a model corresponding to the covered background area. The predictive-error calculating portion 301 supplies the calculated error value to the uncovered-background-area determining portion 303.

In step S342, the uncovered-background-area determining portion 303 determines whether the error value supplied from the predictive-error calculating portion 301 is greater than or equal to the threshold Th. If it is determined that the error value is greater than or equal to the threshold Th, the process proceeds to step S343. In step S343, the flag indicating the uncovered background area is set in the pixel having the error value. The process then proceeds to step S344.

If it is determined in step S342 that the error value is not greater than or equal to the threshold Th, it can be proved that the pixel does not belong to the uncovered background area. Accordingly, the processing of step S343 is skipped, and the process proceeds to step S344.

In step S344, the area specifying unit 104 determines whether the processing has been performed for the whole screen. If it is determined that the processing has not been performed for the whole screen, the process returns to step S341, and the uncovered-background-area determining processing is repeated.

If it is determined in step S344 that the processing has been performed for the whole screen, the process proceeds to step S345 in which the uncovered-background-area determining portion 303 outputs a flag indicating the uncovered background area. The processing is then completed.

As discussed above, the area specifying unit 104 is able to calculate the error value based on the estimated mixture ratio and the mixture-ratio related information corresponding to the estimated mixture ratio so as to specify the covered background area and the uncovered background area based on the calculated error value.

The area specifying unit 104 is able to determine the mixture ratio α based on the generated area information, and outputs the determined mixture ratio α.

By utilizing the mixture ratio α, it is possible to separate the foreground components and the background components contained in a pixel value while maintaining the information of motion blur contained in the image corresponding to the moving object.

The area specifying unit 104 configured as shown in FIG. 44 specifies the area according to processing similar to that described with reference to the flowcharts of FIGS. 47 through 49, except that the covered background area or the uncovered background area is specified based on the added error values. A detailed explanation of the processing is thus omitted.

The area specifying unit 104 configured as shown in FIG. 45 specifies the area according to processing similar to that described with reference to the flowcharts of FIGS. 47 through 49, except that the area is specified for each component, and the final area is determined by the logical OR of the specified areas. A detailed explanation of the processing is thus omitted.

The area specifying unit 104 configured as shown in FIG. 46 specifies the area according to processing similar to that described with reference to the flowcharts of FIGS. 47 through 49, except that the area is specified for each component, and the final area is determined by the logical AND of the specified areas. A detailed explanation of the processing is thus omitted.

Figure 50:
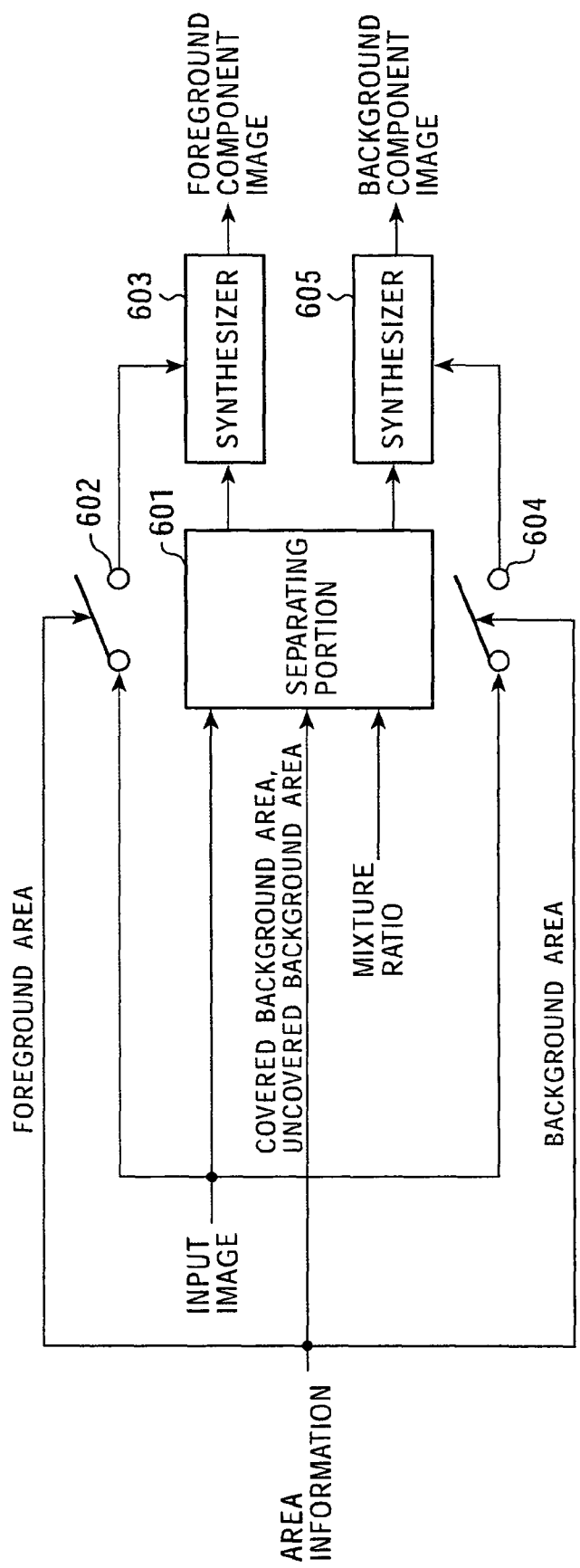
FIG. 50 is a block diagram illustrating an example of the configuration of a foreground/background separator 105.

The foreground/background separator 105 is discussed below. FIG. 50 is a block diagram illustrating an example of the configuration of the foreground/background separator 105. The input image supplied to the foreground/background separator 105 is supplied to a separating portion 601, a switch 602, and a switch 604. The area information supplied from the area specifying unit 104 and indicating the information of the covered background area and the uncovered background area is supplied to the separating portion 601. The area information indicating the foreground area is supplied to the switch 602. The area information indicating the background area supplied to the switch 604.

The mixture ratio α supplied from the mixture-ratio calculator 103 is supplied to the separating portion 601.

The separating portion 601 separates the foreground components from the input image based on the area information indicating the covered background area, the area information indicating the uncovered background area, and the mixture ratio α, and supplies the separated foreground components to a synthesizer 603. The separating portion 601 also separates the background components from the input image, and supplies the separated background components to a synthesizer 605.

The switch 602 is closed when a pixel corresponding to the foreground is input based on the area information indicating the foreground area, and supplies only the pixels corresponding to the foreground contained in the input image to the synthesizer 603.

The switch 604 is closed when a pixel corresponding to the background is input based on the area information indicating the background area, and supplies only the pixels corresponding to the background contained in the input image to the synthesizer 605.

The synthesizer 603 synthesizes a foreground component image based on the foreground components supplied from the separating portion 601 and the pixels corresponding to the foreground supplied from the switch 602, and outputs the synthesized foreground component image. Since the foreground area and the mixed area do not overlap, the synthesizer 603 applies, for example, logical OR to the foreground components and the foreground pixels, thereby synthesizing the foreground component image.

In the initializing processing executed at the start of the synthesizing processing for the foreground component image, the synthesizer 603 stores an image whose pixel values are all 0 in a built-in frame memory. Then, in the synthesizing processing for the foreground component image, the synthesizer 603 stores the foreground component image (overwrites the previous image by the foreground component image). Accordingly, 0 is stored in the pixels corresponding to the background area in the foreground component image output from the synthesizer 603.

The synthesizer 605 synthesizes a background component image based on the background components supplied from the separating portion 601 and the pixels corresponding to the background supplied from the switch 604, and outputs the synthesized background component image. Since the background area and the mixed area do not overlap, the synthesizer 605 applies, for example, logical OR to the background components and the background pixels, thereby synthesizing the background component image.

In the initializing processing executed at the start of the synthesizing processing for the background component image, the synthesizer 605 stores an image whose pixel values are all 0 in a built-in frame memory. Then, in the synthesizing processing for the background component image, the synthesizer 605 stores the background component image (overwrites the previous image by the background component image). Accordingly, 0 is stored in the pixels corresponding to the foreground area in the background component image output from the synthesizer 605.

Figure 51B:
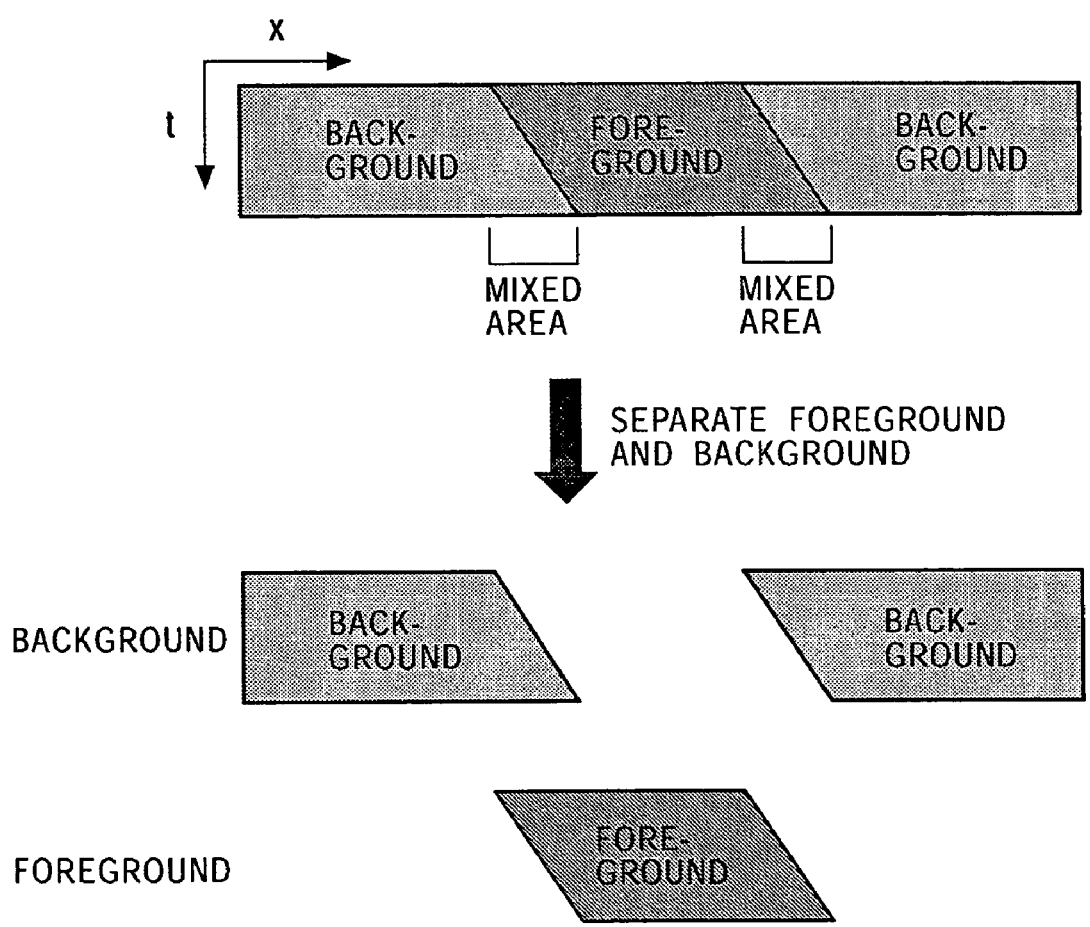
FIG. 51B illustrates an input image, a foreground component image, and a background component image.

FIG. 51A illustrates the input image input into the foreground/background separator 105 and the foreground component image and the background component image output from the foreground/background separator 105. FIG. 51B illustrates a model corresponding to the input image input into the foreground/background separator 105 and the foreground component image and the background component image output from the foreground/background separator 105.

FIG. 51A is a schematic diagram illustrating the image to be displayed, and FIG. 51B is a model obtained by expanding in the time direction the pixels disposed in one line including the pixels belonging to the foreground area, the pixels belonging to the background area, and the pixels belonging to the mixed area corresponding to FIG. 51A.

As shown in FIGS. 51A and 51B, the background component image output from the foreground/background separator 105 consists of the pixels belonging to the background area and the background components contained in the pixels of the mixed area.

As shown in FIGS. 51A and 51B, the foreground component image output from the foreground/background separator 105 consists of the pixel belonging to the foreground area and the foreground components contained in the pixels of the mixed area.

The pixel values of the pixels in the mixed area are separated into the background components and the foreground components by the foreground/background separator 105. The separated background components form the background component image together with the pixels belonging to the background area. The separated foreground components form the foreground component image together with the pixels belonging to the foreground area.

As discussed above, in the foreground component image, the pixel values of the pixels corresponding to the background area are set to 0, and significant pixel values are set in the pixels corresponding to the foreground area and the pixels corresponding to the mixed area. Similarly, in the background component image, the pixel values of the pixels corresponding to the foreground area are set to 0, and significant pixel values are set in the pixels corresponding to the background area and the pixels corresponding to the mixed area.

A description is given below of the processing executed by the separating portion 601 for separating the foreground components and the background components from the pixels belonging to the mixed area.

Figure 52:
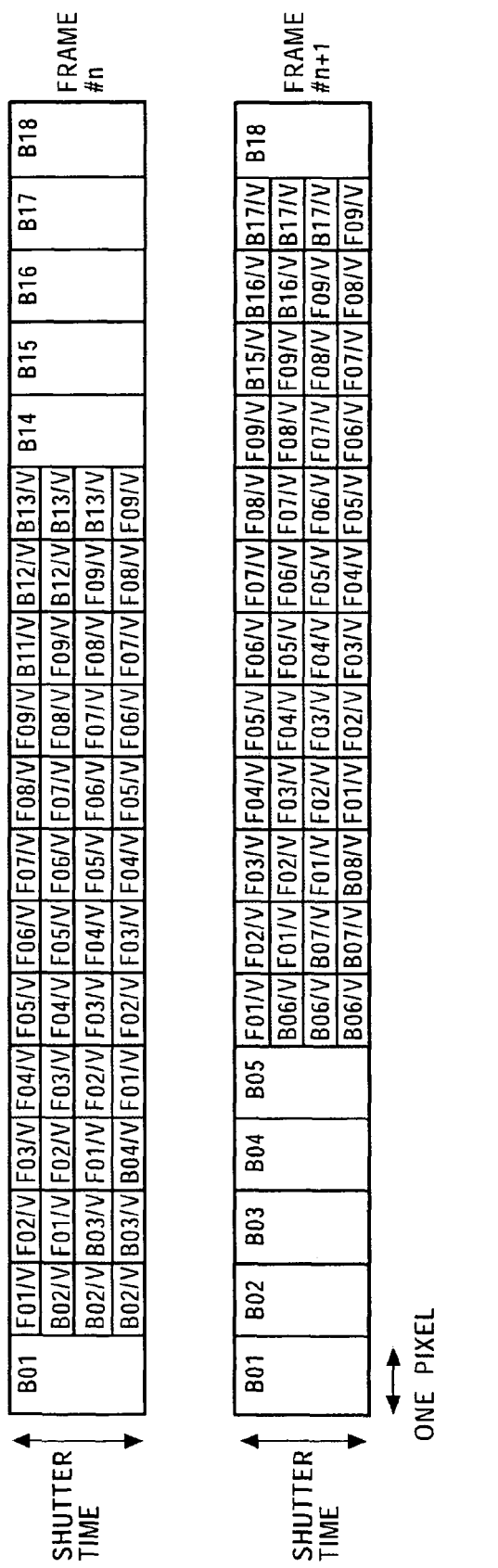
FIG. 52 illustrates a model in which pixel values are expanded in the time direction and the period corresponding to the shutter time is divided.

FIG. 52 illustrates a model of an image indicating foreground components and background components in two frames including a foreground object moving from the left to the right in FIG. 52. In the model of the image shown in FIG. 52, the amount of movement v is 4, and the number of virtual divided portions is 4.

In frame #n, the leftmost pixel and the fourteenth through eighteenth pixels from the left consist of only the background components and belong to the background area. In frame #n, the second through fourth pixels from the left contain the background components and the foreground components, and belong to the uncovered background area. In frame #n, the eleventh through thirteenth pixels from the left contain background components and foreground components, and belong to the covered background area. In frame #n, the fifth through tenth pixels from the left consist of only the foreground components, and belong to the foreground area.

In frame #n+1, the first through fifth pixels from the left and the eighteenth pixel from the left consist of only the background components, and belong to the background area. In frame #n+1, the sixth through eighth pixels from the left contain background components and foreground components, and belong to the uncovered background area. In frame #n+1, the fifteenth through seventeenth pixels from the left contain background components and foreground components, and belong to the covered background area. In frame #n+1, the ninth through fourteenth pixels from the left consist of only the foreground components, and belong to the foreground area.

Figure 53:
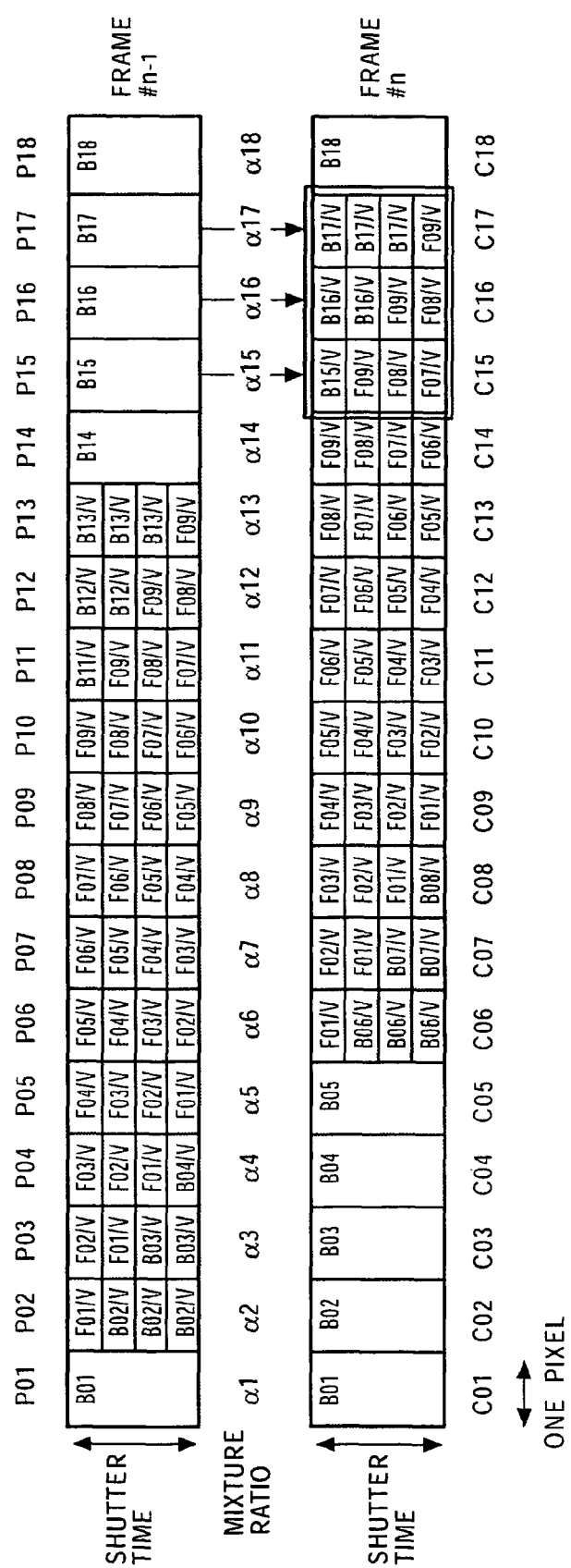
FIG. 53 illustrates a model in which pixel values are expanded in the time direction and the period corresponding to the shutter time is divided.

FIG. 53 illustrates the processing for separating the foreground components from the pixels belonging to the covered background area. In FIG. 53, $\alpha1$ through $\alpha18$ indicate mixture ratios of the individual pixels of frame #n. In FIG. 53, the fifteenth through seventeenth pixels from the left belong to the covered background area.

The pixel value C15 of the fifteenth pixel from the left in frame #n can be expressed by equation (64):

$$C15 = B15/v + F09/v + F08/v + F07/v \qquad (64)$$
$$= \alpha15 \cdot B15 + F09/v + F08/v + F07/v$$
$$= \alpha15 \cdot P15 + F09/v + F08/v + F07/v$$

where $\alpha15$ indicates the mixture ratio of the fifteenth pixel from the left in frame #n, and P15 designates the pixel value of the fifteenth pixel from the left in frame #n−1.

The sum f15 of the foreground components of the fifteenth pixel from the left in frame #n can be expressed by equation (65) based on equation (64).

$$f15 = F09/v + F08/v + F07/v \qquad (65)$$
$$= C15 - \alpha15 \cdot P15$$

Similarly, the sum f16 of the foreground components of the sixteenth pixel from the left in frame #n can be expressed by equation (66), and the sum f17 of the foreground components of the seventeenth pixel from the left in frame #n can be expressed by equation (67).

$$f16 = C16 - \alpha16 \cdot P16 \qquad (66)$$

$$f17 = C17 - \alpha17 \cdot P17 \qquad (67)$$

In this manner, the foreground components fc contained in the pixel value C of the pixel belonging to the covered background area can be expressed by equation (68):

$$fc = C - \alpha \cdot P \qquad (68)$$

where P designates the pixel value of the corresponding pixel in the previous frame.

Figure 54:
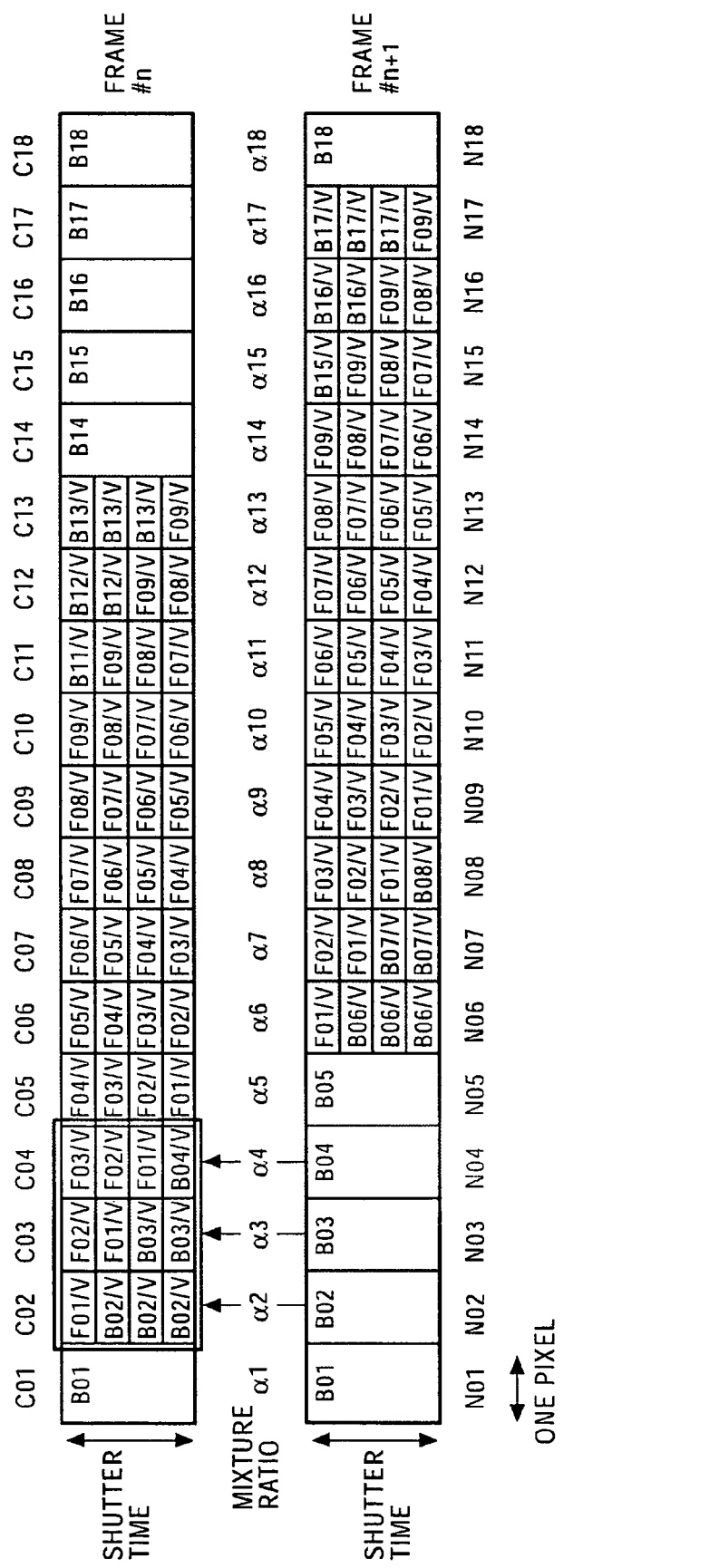
FIG. 54 illustrates a model in which pixel values are expanded in the time direction and the period corresponding to the shutter time is divided.

FIG. 54 illustrates the processing for separating the foreground components from the pixels belonging to the uncovered background area. In FIG. 54, $\alpha1$ through $\alpha18$ indicate mixture ratios of the individual pixels of frame #n. In FIG. 54, the second through fourth pixels from the left belong to the uncovered background area.

The pixel value C02 of the second pixel from the left in frame #n can be expressed by equation (69):

$$C02 = B02/v + B02/v + B02/v + F01/v \qquad (69)$$
$$= \alpha2 \cdot B02 + F01/v$$
$$= \alpha2 \cdot N02 + F01/v$$

where $\alpha2$ indicates the mixture ratio of the second pixel from the left in frame #n, and N02 designates the pixel value of the second pixel from the left in frame #n+1.

The sum f02 of the foreground components of the second pixel from the left in frame #n can be expressed by equation (70) based on equation (69).

$$f02 = F01/v \qquad (70)$$
$$= C02 - \alpha2 \cdot N02$$

Similarly, the sum f03 of the foreground components of the third pixel from the left in frame #n can be expressed by equation (71), and the sum f04 of the foreground components of the fourth pixel from the left in frame #n can be expressed by equation (72).

$$f03 = C03 - \alpha3 \cdot N03 \qquad (71)$$

$$f04 = C04 - \alpha4 \cdot N04 \qquad (72)$$

In this manner, the foreground components fu contained in the pixel value C of the pixel belonging to the uncovered background area can be expressed by equation (73):

$$fu = C - \alpha \cdot N \qquad (73)$$

where N designates the pixel value of the corresponding pixel in the subsequent frame.

As discussed above, the separating portion 601 is able to separate the foreground components from the pixels belonging to the mixed area and the background components from the pixels belonging to the mixed area based on the information indicating the covered background area and the information indicating the uncovered background area contained in the area information, and the mixture ratio α for each pixel.

Figure 55:
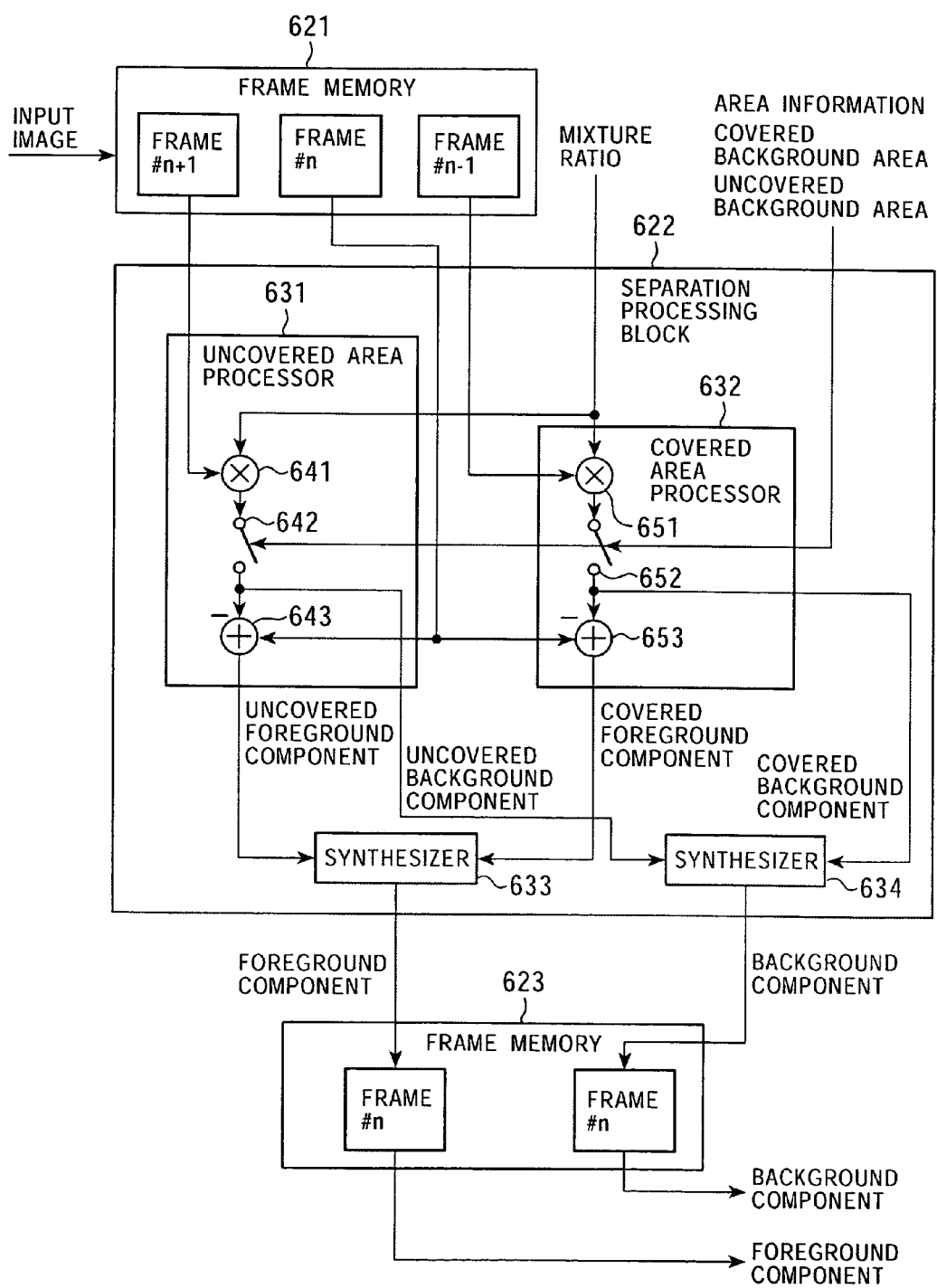
FIG. 55 is a block diagram illustrating an example of the configuration of a separating portion 601.

FIG. 55 is a block diagram illustrating an example of the configuration of the separating portion 601 for executing the above-described processing. An image input into the separating portion 601.is supplied to a frame memory 621, and the area information indicating the covered background area and the uncovered background area supplied from the mixture-ratio calculator 103 and the mixture ratio α are supplied to a separation processing block 622.

The frame memory 621 stores the input images in units of frames. When a frame to be processed is frame #n, the frame memory 621 stores frame #n−1, which is the frame one frame before frame #n, frame #n, and frame #n+1, which is the frame one frame after frame #n.

The frame memory 621 supplies the corresponding pixels in frame #n−1, frame #n, and frame #n+1 to the separation processing block 622.

The separation processing block 622 applies the calculations discussed with reference to FIGS. 53 and 54 to the pixel values of the corresponding pixels in frame #n−1, frame #n, and frame #n+1 supplied from the frame memory 621 based on the area information indicating the covered background area and the uncovered background area and the mixture ratio α so as to separate the foreground components and the background components from the pixels belonging to the mixed area in frame #n, and supplies them to a frame memory 623.

The separation processing block 622 is formed of an uncovered area processor 631, a covered area processor 632, a synthesizer 633, and a synthesizer 634.

A multiplier 641 of the uncovered area processor 631 multiplies the pixel value of the pixel in frame #n+1 supplied from the frame memory 621 by the mixture ratio α, and outputs the resulting pixel value to a switch 642. The switch 642 is closed when the pixel of frame #n (corresponding to the pixel in frame #n+1) supplied from the frame memory 621 belongs to the uncovered background area, and supplies the pixel value multiplied by the mixture ratio α supplied from the multiplier 641 to a calculator 643 and the synthesizer 634. The value obtained by multiplying the pixel value of the pixel in frame #n+1 by the mixture ratio α output from the switch 642 is equivalent to the background components of the pixel value of the corresponding pixel in frame #n.

The calculator 643 subtracts the background components supplied from the switch 642 from the pixel value of the pixel in frame #n supplied from the frame memory 621 so as to obtain the foreground components. The calculator 643 supplies the foreground components of the pixel in frame #n belonging to the uncovered background area to the synthesizer 633.

A multiplier 651 of the covered area processor 632 multiplies the pixel value of the pixel in frame #n−1 supplied from the frame memory 621 by the mixture ratio α, and outputs the resulting pixel value to a switch 652. The switch 652 is closed when the pixel of frame #n (corresponding to the pixel in frame #n−1) supplied from the frame memory 621 belongs to the covered background area, and supplies the pixel value multiplied by the mixture ratio α supplied from the multiplier 651 to a calculator 653 and the synthesizer 634. The value obtained by multiplying the pixel value of the pixel in frame #n−1 by the mixture ratio α output from the switch 652 is equivalent to the background components of the pixel value of the corresponding pixel in frame #n.

The calculator 653 subtracts the background components supplied from the switch 652 from the pixel value of the pixel in frame #n supplied from the frame memory 621 so as to obtain the foreground components. The calculator 653 supplies the foreground components of the pixel in frame #n belonging to the covered background area to the synthesizer 633.

The synthesizer 633 combines the foreground components of the pixels of frame #n belonging to the uncovered background area and supplied from the calculator 643 with the foreground components of the pixels of frame #n belonging to the covered background area and supplied from the calculator 653, and supplies the synthesized foreground components to the frame memory 623.

The synthesizer 634 combines the background components of the pixels of frame #n belonging to the uncovered background area and supplied from the switch 642 with the background components of the pixels of frame #n belonging to the covered background area and supplied from the switch 652, and supplies the synthesized background components to the frame memory 623.

The frame memory 623 stores the foreground components and the background components of the pixels in the mixed area of frame #n supplied from the separation processing block 622.

The frame memory 623 outputs the stored foreground components of the pixels in the mixed area in frame #n and the stored background components of the pixels in the mixed area in frame #n.

By utilizing the mixture ratio α, which indicates the feature quantity, the foreground components and the background components contained in the pixel values can be completely separated.

The synthesizer 603 combines the foreground components of the pixels in the mixed area in frame #n output from the separating portion 601 with the pixels belonging to the foreground area so as to generate a foreground component image. The synthesizer 605 combines the background components of the pixels in the mixed area in frame #n output from the separating portion 601 with the pixels belonging to the background area so as to generate a background component image.

Figure 56A:
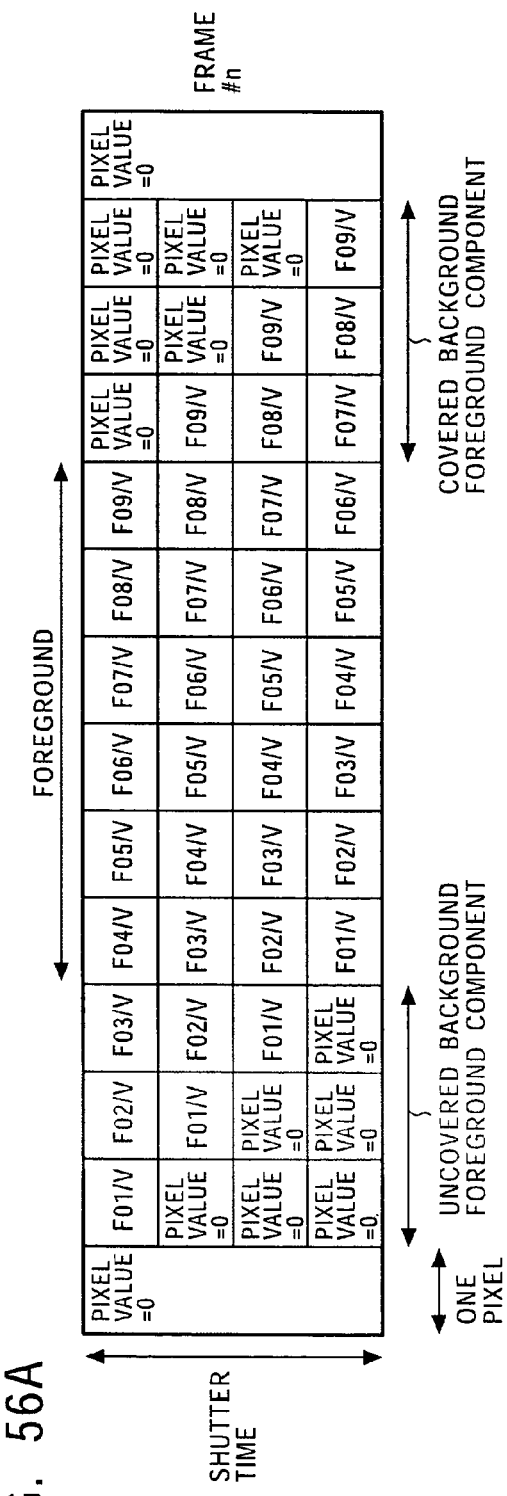
FIG. 56A illustrates an example of a separated foreground component image.

FIG. 56A illustrates an example of the foreground component image corresponding to frame #n in FIG. 52. The leftmost pixel and the fourteenth pixel from the left consist of only the background components before the foreground and the background are separated, and thus, the pixel values are set to 0.

The second and fourth pixels from the left belong to the uncovered background area before the foreground and the background are separated. Accordingly, the background components are set to 0, and the foreground components are maintained. The eleventh through thirteenth pixels from the left belong to the covered background area before the foreground and the background are separated. Accordingly, the background components are set to 0, and the foreground components are maintained. The fifth through tenth pixels from the left consist of only the foreground components, which are thus maintained.

Figure 56B:
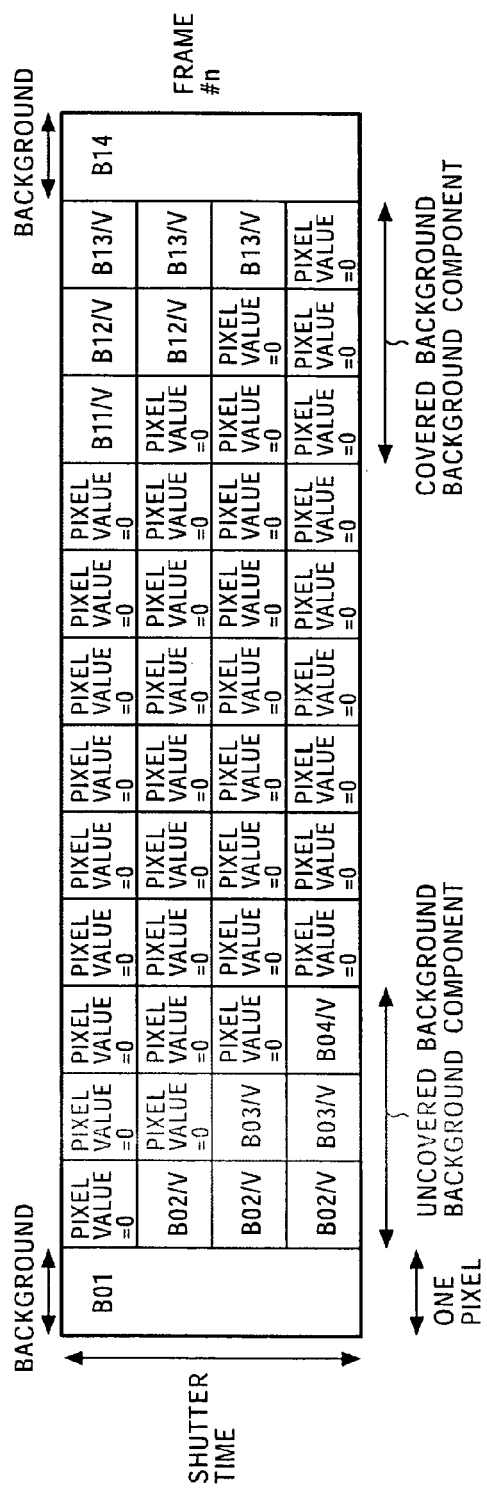
FIG. 56B illustrates an example of a separated background component image.

FIG. 56B illustrates an example of the background component image corresponding to frame #n in FIG. 52. The leftmost pixel and the fourteenth pixel from the left consist of only the background components before the foreground and the background are separated, and thus, the background components are maintained.

The second through fourth pixels from the left belong to the uncovered background area before the foreground and the background are separated. Accordingly, the foreground components are set to 0, and the background components are maintained. The eleventh through thirteenth pixels from the left belong to the covered background area before the foreground and the background are separated. Accordingly, the foreground components are set to 0, and the background components are maintained. The fifth through tenth pixels from the left consist of only the foreground components, and thus, the pixel values are set to 0.

Figure 57:
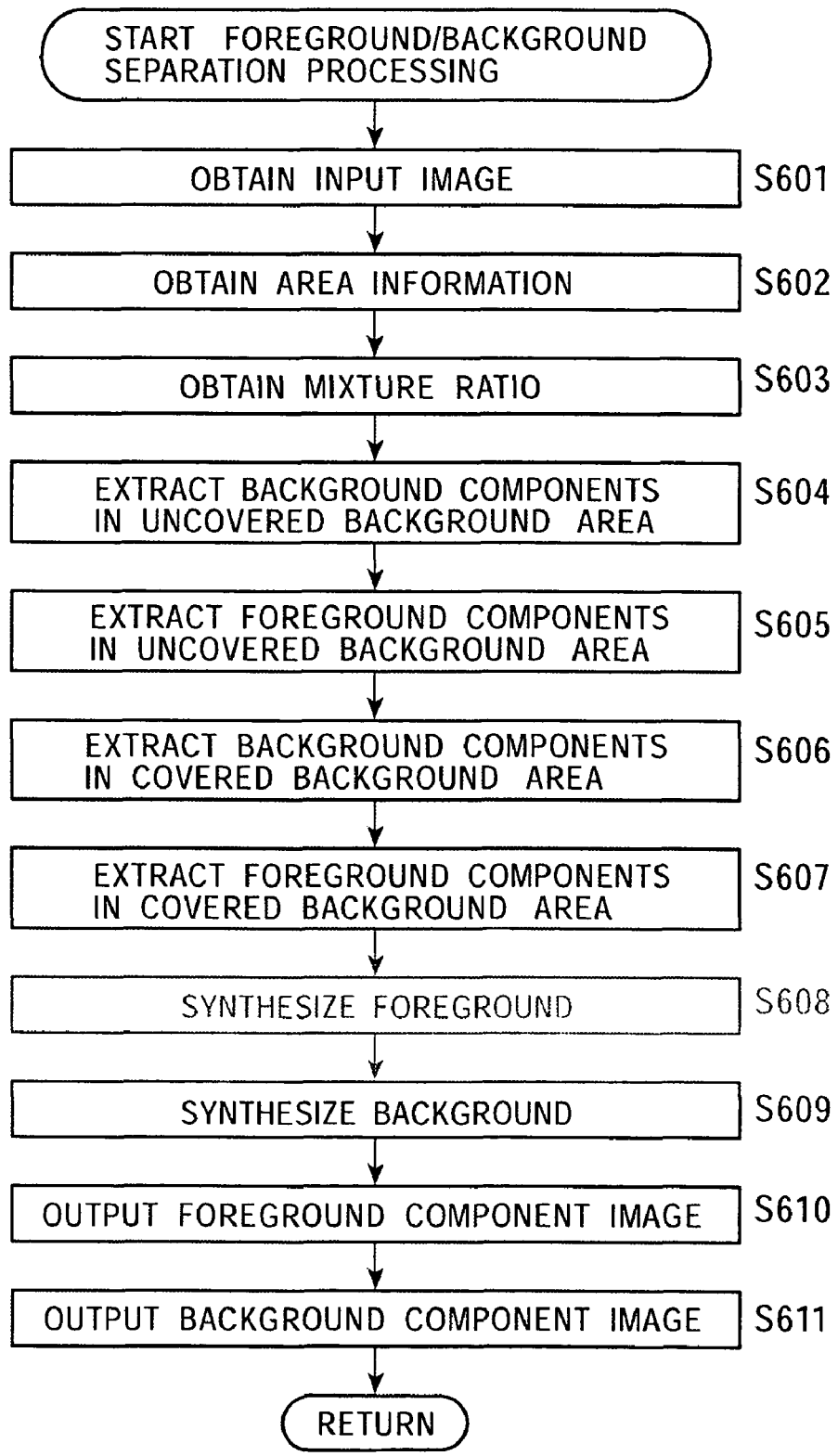
FIG. 57 is a flowchart illustrating the processing for separating a foreground and a background.

The processing for separating the foreground and the background executed by the foreground/background separator 105 is described below with reference to the flowchart of FIG. 57. In step S601, the frame memory 621 of the separating portion 601 obtains an input image, and stores frame #n for which the foreground and the background are separated together with the previous frame #n−1 and the subsequent frame #n+1.

In step S602, the separation processing block 622 of the separating portion 601 obtains area information supplied from the mixture-ratio calculator 103. In step S603, the separation processing block 622 of the separating portion 601 obtains the mixture ratio α supplied from the mixture-ratio calculator 103.

In step S604, the uncovered area processor 631 extracts the background components from the pixel values of the pixels belonging to the uncovered background area supplied from the frame memory 621 based on the area information and the mixture ratio α.

In step S605, the uncovered area processor 631 extracts the foreground components from the pixel values of the pixels belonging to the uncovered background area supplied from the frame memory 621 based on the area information and the mixture ratio α.

In step S606, the covered area processor 632 extracts the background components from the pixel values of the pixels belonging to the covered background area supplied from the frame memory 621 based on the area information and the mixture ratio α.

In step S607, the covered area processor 632 extracts the foreground components from the pixel values of the pixels belonging to the covered background area supplied from the frame memory 621 based on the area information and the mixture ratio α.

In step S608, the synthesizer 633 combines the foreground components of the pixels belonging to the uncovered background area extracted in the processing of step S605 with the foreground components of the pixels belonging to the covered background area extracted in the processing of step S607. The synthesized foreground components are supplied to the synthesizer 603. The synthesizer 603 further combines the pixels belonging to the foreground area supplied via the switch 602 with the foreground components supplied from the separating portion 601 so as to generate a foreground component image.

In step S609, the synthesizer 634 combines the background components of the pixels belonging to the uncovered background area extracted in the processing of step S604 with the background components of the pixels belonging to the covered background area extracted in the processing of step S606. The synthesized background components are supplied to the synthesizer 605. The synthesizer 605 further combines the pixels belonging to the background area supplied via the switch 604 with the background components supplied from the separating portion 601 so as to generate a background component image.

In step S610, the synthesizer 603 outputs the foreground component image. In step S611, the synthesizer 605 outputs the background component image. The processing is then completed.

As discussed above, the foreground/background separator 105 is able to separate the foreground components and the background components from the input image based on the area information and the mixture ratio α, and outputs the foreground component image consisting of only the foreground components and the background component image consisting of only the background components.

Adjustments of the amount of motion blur from a foreground component image are described below.

Figure 58:
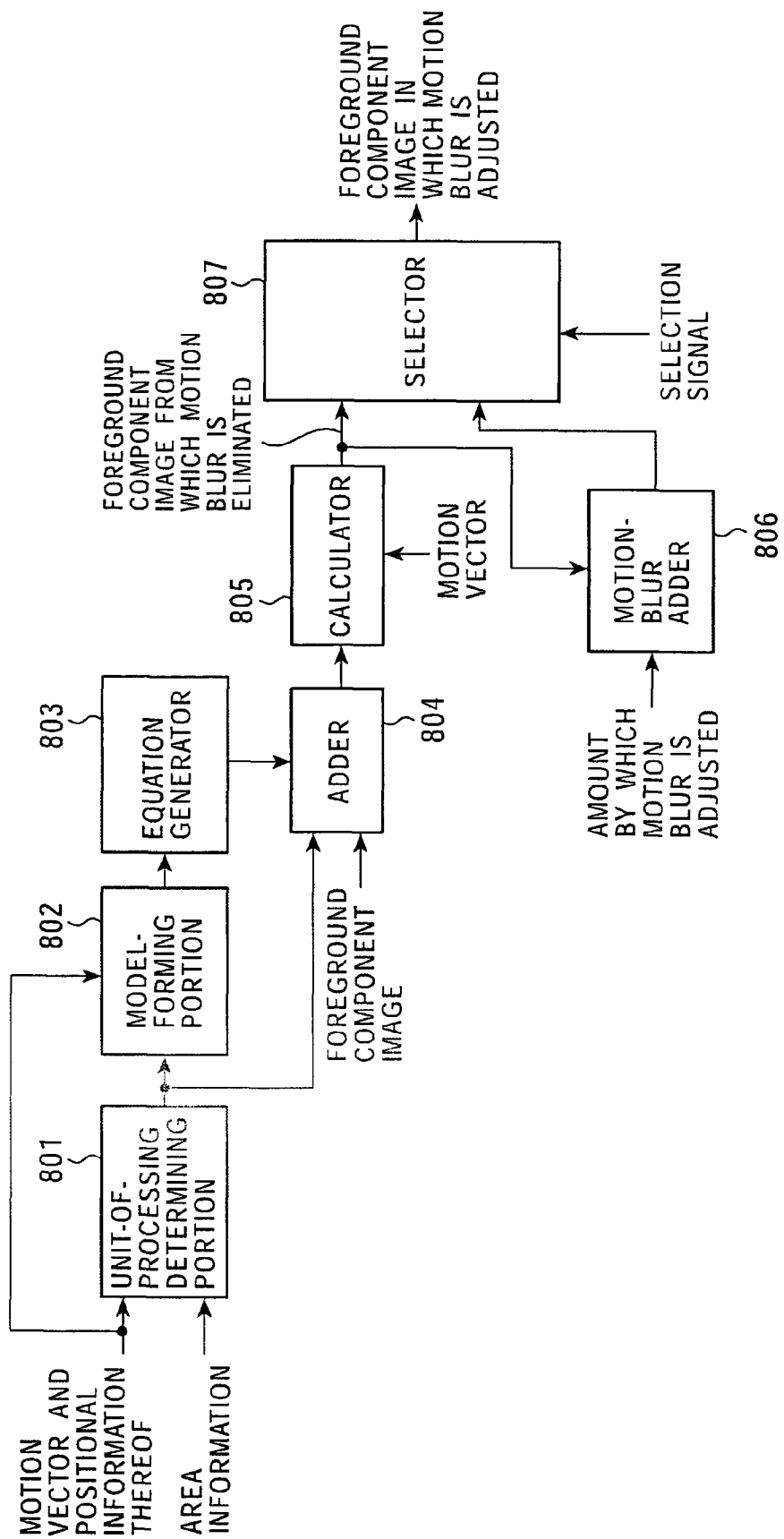
FIG. 58 is a block diagram illustrating an example of the configuration of a motion-blur adjusting unit 106.

FIG. 58 is a block diagram illustrating an example of the configuration of the motion-blur adjusting unit 106. The motion vector and the positional information thereof supplied from the motion detector 102 are supplied to a unit-of-processing determining portion 801, a model-forming portion 802, and a calculator 805. The area information supplied from the area specifying unit 104 is supplied to the unit-of-processing determining portion 801. The foreground component image supplied from the foreground/background separator 105 is supplied to the adder 804.

The unit-of-processing determining portion 801 generates the unit of processing based on the motion vector and the positional information thereof, and the area information, and supplies the generated unit of processing to the model-forming portion 802 and the adder 804.

Figure 59:
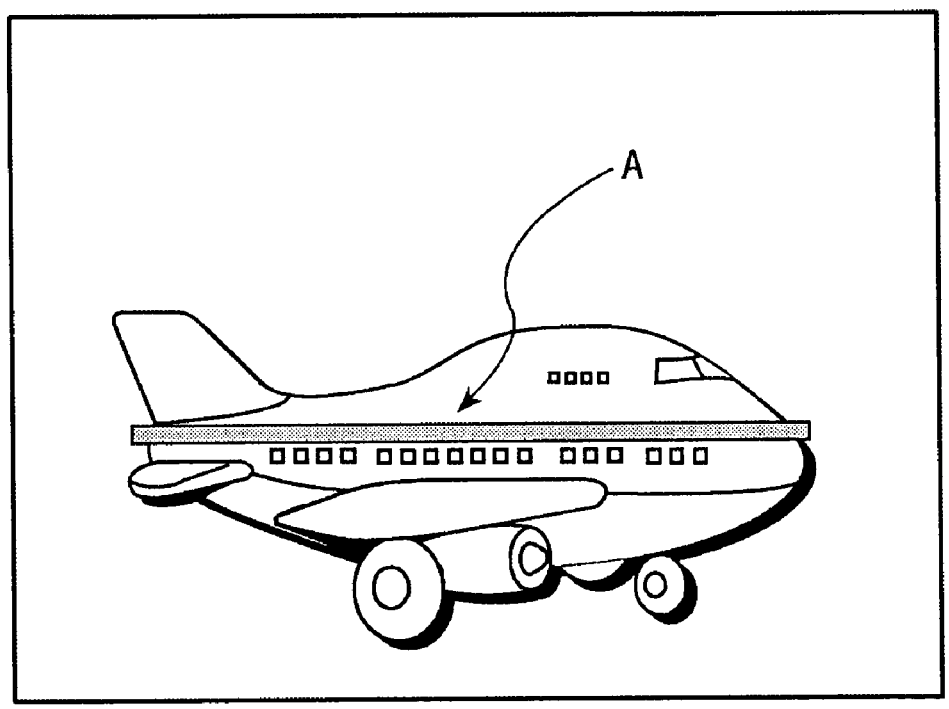
FIG. 59 illustrates the unit of processing.

As indicated by A in FIG. 59, for example, the unit of processing generated by the unit-of-processing determining portion 801 indicates consecutive pixels disposed in the moving direction starting from the pixel corresponding to the covered background area of the foreground component image until the pixel corresponding to the uncovered background area, or indicates consecutive pixels disposed in the moving direction starting from the pixel corresponding to the uncovered background area until the pixel corresponding to the covered background area. The unit of processing is formed of two pieces of data which indicate, for example, the upper left point (which is the position of the leftmost or the topmost pixel in the image designated by the unit of processing) and the lower right point.

Figure 60:
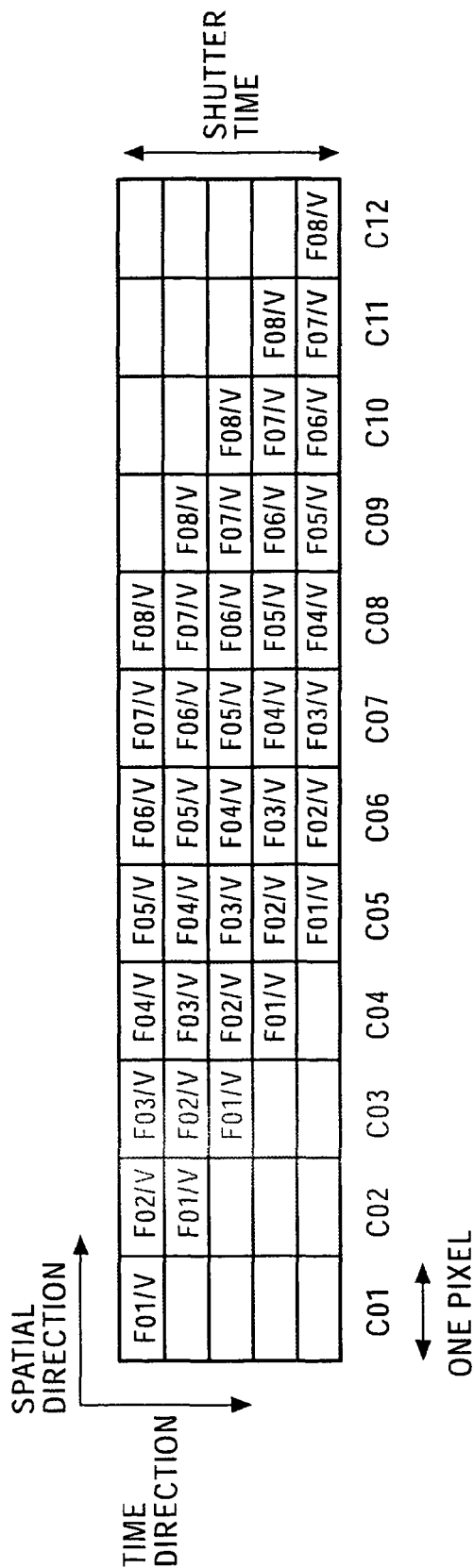
FIG. 60 illustrates a model in which the pixel values of a foreground component image are expanded in the time direction and the period corresponding to the shutter time is divided.

The model-forming portion 802 forms a model based on the motion vector and the input unit of processing. More specifically, for example, the model-forming portion 802 may store in advance a plurality of models in accordance with the number of pixels contained in the unit of processing, the number of virtual divided portions of the pixel value in the time direction, and the number of foreground components for each pixel. The model-forming portion 802 may then select the model in which the correlation between the pixel values and the foreground components is designated, such as that in FIG. 60, based on the unit of processing and the number of virtual divided portions of the pixel value in the time direction.

It is now assumed, for example, that the number of pixels corresponding to the unit of processing is 12, and that the amount of movement v within the shutter time is 5. Then, the model-forming portion 802 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 802 may generate a model based on the motion vector and the unit of processing when the motion vector and the unit of processing are supplied.

The model-forming portion 802 supplies the selected model to an equation generator 803.

The equation generator 803 generates an equation based on the model supplied from the model-forming portion 802. A description is given below, with reference to the model of the foreground component image shown in FIG. 60, of equations generated by the equation generator 803 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and the pixel values C01 through C12 can be expressed by equations (74) through (85).

$$C01 = F01/v \tag{74}$$

$$C02 = F02/v + F01/v \tag{75}$$

$$C03 = F03/v + F02/v + F01v \tag{76}$$

$$C04 = F04/v + F03/v + F02/v + F01v \tag{77}$$

$$C05 = F05/v + F04/v + F03/v + F02/v + F01v \tag{78}$$

$$C06 = F06/v + F05/v + F04/v + F03/v + F02/v \tag{79}$$

$$C07 = F07/v + F06/v + F05/v + F04/v + F03/v \tag{80}$$

$$C08 = F08/v + F07/v + F06/v + F05/v + F04/v \tag{81}$$

$$C09 = F08/v + F07/v + F06/v + F05/v \tag{82}$$

$$C10 = F08/v + F07/v + F06/v \tag{83}$$

$$C11 = F08/v + F07/v \tag{84}$$

$$C12 = F08/v \tag{85}$$

The equation generator 803 generates an equation by modifying the generated equations. The equations generated by the equation generator 803 are indicated by equations (86) though (97).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \tag{86}$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \tag{87}$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \tag{88}$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \tag{89}$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \tag{90}$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \tag{91}$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \tag{92}$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \tag{93}$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \tag{94}$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \tag{95}$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \tag{96}$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \tag{97}$$

Equations (86) through (97) can be expressed by equation (98).

$$Cj = \sum_{i=01}^{08} aij \cdot Fi/v \tag{98}$$

In equation (98), j designates the position of the pixel. In this example, j has one of the values from 1 to 12. In equation (98), i designates the position of the foreground value. In this example, i has one of the values from 1 to 8. In equation (98), aij has the value 0 or 1 according to the values of i and j.

Equation (98) can be expressed by equation (99) in consideration of the error.

$$Cj = \sum_{i=01}^{08} aij \cdot Fi/v + ej \tag{99}$$

In equation (99), ej designates the error contained in the designated pixel Cj.

Equation (99) can be modified into equation (100).

$$ej = Cj - \sum_{i=01}^{08} aij \cdot Fi/v \tag{100}$$

In order to apply the method of least squares, the square sum E of the error is defined as equation (101).

$$E = \sum_{j=01}^{12} ej^2 \tag{101}$$

In order to minimize the error, the partial differential value using the variable Fk with respect to the square sum E of the error should be 0. Fk is determined so that equation (102) is satisfied.

$$\frac{\partial E}{\partial Fk} = 2 \cdot \sum_{j=01}^{12} ej \cdot \frac{\partial ej}{\partial Fk} \qquad (102)$$

$$= 2 \cdot \sum_{j=01}^{12} \left\{ \left( Cj - \sum_{i=01}^{08} aij \cdot Fi/v \right) \cdot (-akj/v) \right\} = 0$$

In equation (102), since the amount of movement v is a fixed value, equation (103) can be deduced.

$$\sum_{j=01}^{12} akj \cdot \left( Cj - \sum_{i=01}^{08} aij \cdot Fi/v \right) = 0 \qquad (103)$$

To expand equation (103) and transpose the terms, equation (104) can be obtained.

$$\sum_{j=01}^{12} \left( akj \cdot \sum_{i=01}^{08} aij \cdot Fi \right) = v \sum_{j=01}^{12} akj \cdot Cj \qquad (104)$$

Equation (104) is expanded into eight equations by substituting the individual integers from 1 to 8 into k in equation (104). The obtained eight equations can be expressed by one matrix equation. This equation is referred to as a "normal equation".

An example of the normal equation generated by the equation generator 803 based on the method of least squares is indicated by equation (105).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \qquad (105)$$

When equation (105) is expressed by $A \cdot F = v \cdot C$, C, A, and v known, and F is unknown. A and v are known when the model is formed, while C becomes known when the pixel value is input in the addition processing.

By calculating the foreground components according to the normal equation based on the method of least squares, the error contained in the pixel C can be distributed.

The equation generator 803 supplies the normal equation generated as discussed above to the adder 804.

The adder 804 sets, based on the unit of processing supplied from the unit-of-processing determining portion 801, the pixel value C contained in the foreground component image in the matrix equation supplied from the equation generator 803. The adder 804 supplies the matrix in which the pixel value C is set to a calculator 805.

The calculator 805 calculates the foreground component Fi/v from which motion blur is eliminated by the processing based on a solution, such as a sweep-out method (Gauss-Jordan elimination), so as to obtain Fi corresponding to i indicating one of the integers from 0 to 8, which is the pixel value from which motion blur is eliminated. The calculator 805 then outputs the foreground component image consisting of the pixel values Fi without motion blur, such as that in FIG. 61, to a motion-blur adder 806 and a selector 807.

Figure 61:
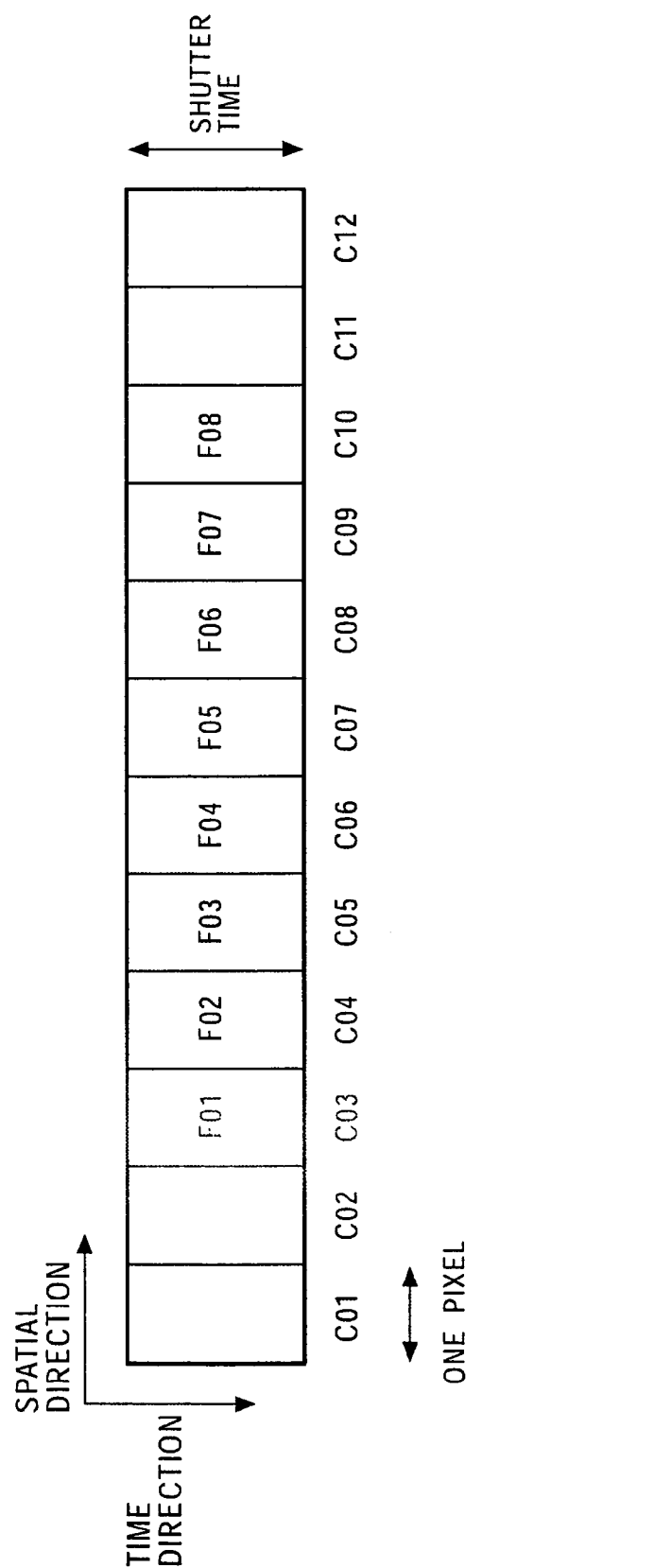
FIG. 61 illustrates a model in which the pixel values of a foreground component image are expanded in the time direction and the period corresponding to the shutter time is divided.

In the foreground component image without motion blur shown in FIG. 61, the reason for setting F01 through F08 in C03 through C10, respectively, is not to change the position of the foreground component image with respect to the screen. However, F01 through F08 may be set in any desired positions.

Figure 62:
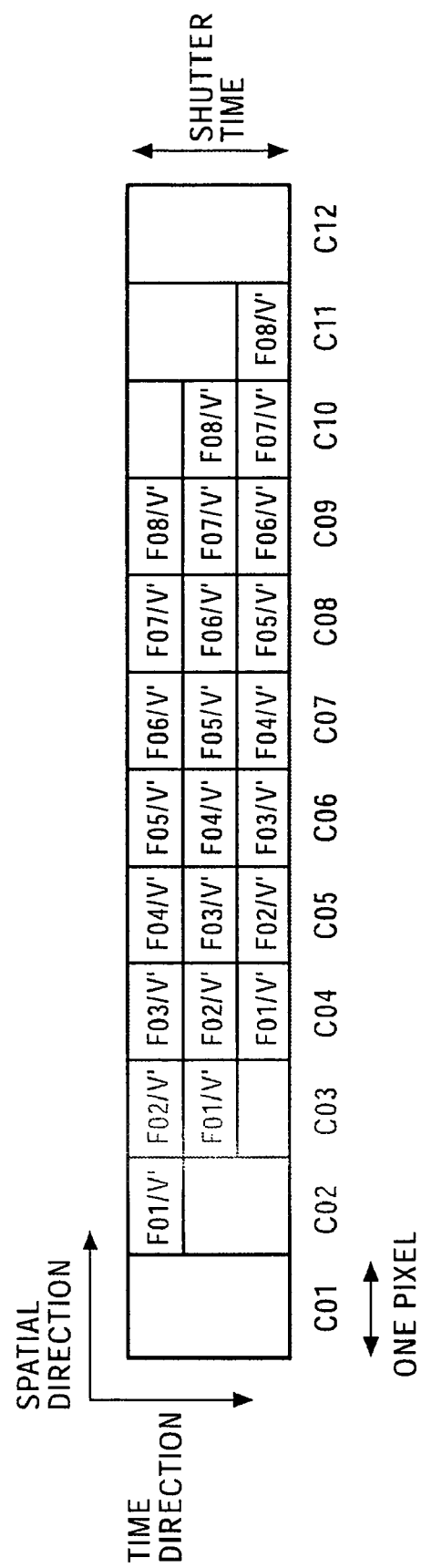
FIG. 62 illustrates a model in which the pixel values of a foreground component image are expanded in the time direction and the period corresponding to the shutter time is divided.

The motion-blur adder 806 is able to adjust the amount of motion blur by adding the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 62, the motion-blur adder 806 divides the foreground pixel value Fi without motion blur by the amount v' by which motion blur is adjusted so as to obtain the foreground component Fi/v'. The motion-blur adder 806 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 806 supplies the foreground component image in which the amount of motion blur is adjusted to a selector 807.

The selector 807 selects one of the foreground component image without motion blur supplied from the calculator 805 and the foreground component image in which the amount of motion blur is adjusted supplied from the motion-blur adder 806 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 63:
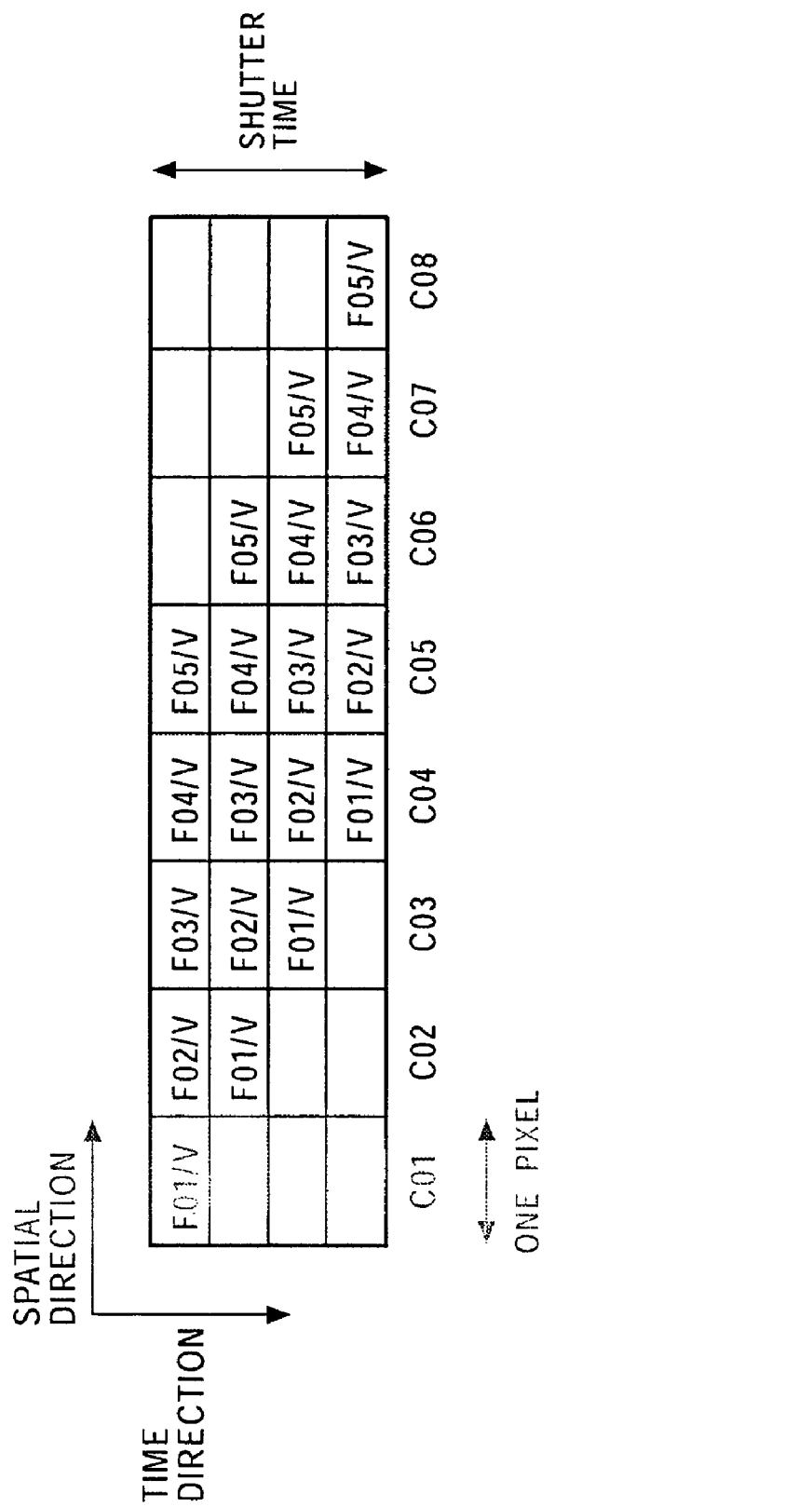
FIG. 63 illustrates a model in which the pixel values of a foreground component image are expanded in the time direction and the period corresponding to the shutter time is divided.

Also, for example, when the number of pixels corresponding to the unit of processing is 8, and the amount of movement v is 4, as shown in FIG. 63, the motion-blur adjusting unit 106 generates a matrix equation expressed by equation (106).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix} \quad (106)$$

In this manner, the motion-blur adjusting unit 106 calculates Fi, which is the pixel value in which the amount of motion blur is adjusted, by setting up the equation in accordance with the length of the unit of processing. Similarly, for example, when the number of pixels contained in the unit of processing is 100, the equation corresponding to 100 pixels is generated so as to calculate Fi.

Figure 64:
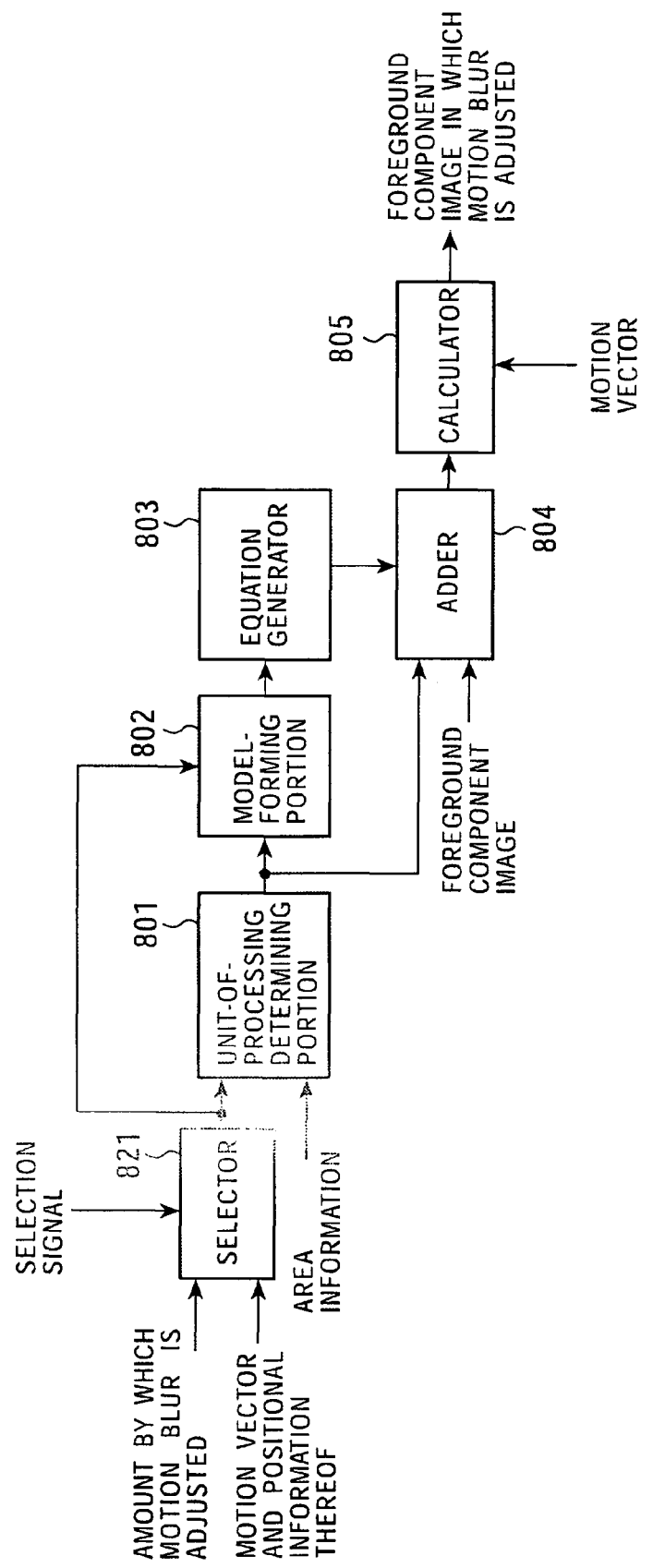
FIG. 64 illustrates an example of another configuration of the motion-blur adjusting unit 106.

FIG. 64 illustrates an example of another configuration of the motion-blur adjusting unit 106. The same elements as those shown in FIG. 58 are designated with like reference numerals, and an explanation thereof is thus omitted.

Based on a selection signal, a selector 821 directly supplies an input motion vector and a positional signal thereof to the unit-of-processing determining portion 801 and the model-forming portion 802. Alternatively, the selector 821 may substitute the magnitude of the motion vector by the amount v' by which motion blur is adjusted, and then supplies the motion vector and the positional signal thereof to the unit-of-processing determining portion 801 and the model-forming unit 802.

With this arrangement, the unit-of-processing determining portion 801 through the calculator 805 of the motion-blur adjusting unit 106 shown in FIG. 64 are able to adjust the amount of motion blur in accordance with the amount of movement v and the amount v' by which motion blur is adjusted. For example, when the amount of movement v is 5, and the amount v' by which motion blur is adjusted is 3, the unit-of-processing determining portion 801 through the calculator 805 of the motion-blur adjusting unit 106 shown in FIG. 64 execute computation on the foreground component image in which the amount of movement v is 5 shown in FIG. 60 according to the model shown in FIG. 62 in which the amount v' by which motion blur is adjusted is 3. As a result, the image containing motion blur having the amount of movement v of (amount of movement v)/(amount v' by which motion blur is adjusted)=5/3, i.e., about 1.7 is obtained. In this case, the calculated image does not contain motion blur corresponding to the amount of movement v of 3. Accordingly, it should be noted that the relationship between the amount of movement v and the amount v' by which motion blur is adjusted is different from the result of the motion-blur adder 806.

As discussed above, the motion-blur adjusting unit 106 generates the equation in accordance with the amount of movement v and the unit of processing, and sets the pixel values of the foreground component image in the generated equation, thereby calculating the foreground component image in which the amount of motion blur is adjusted.

Figure 65:
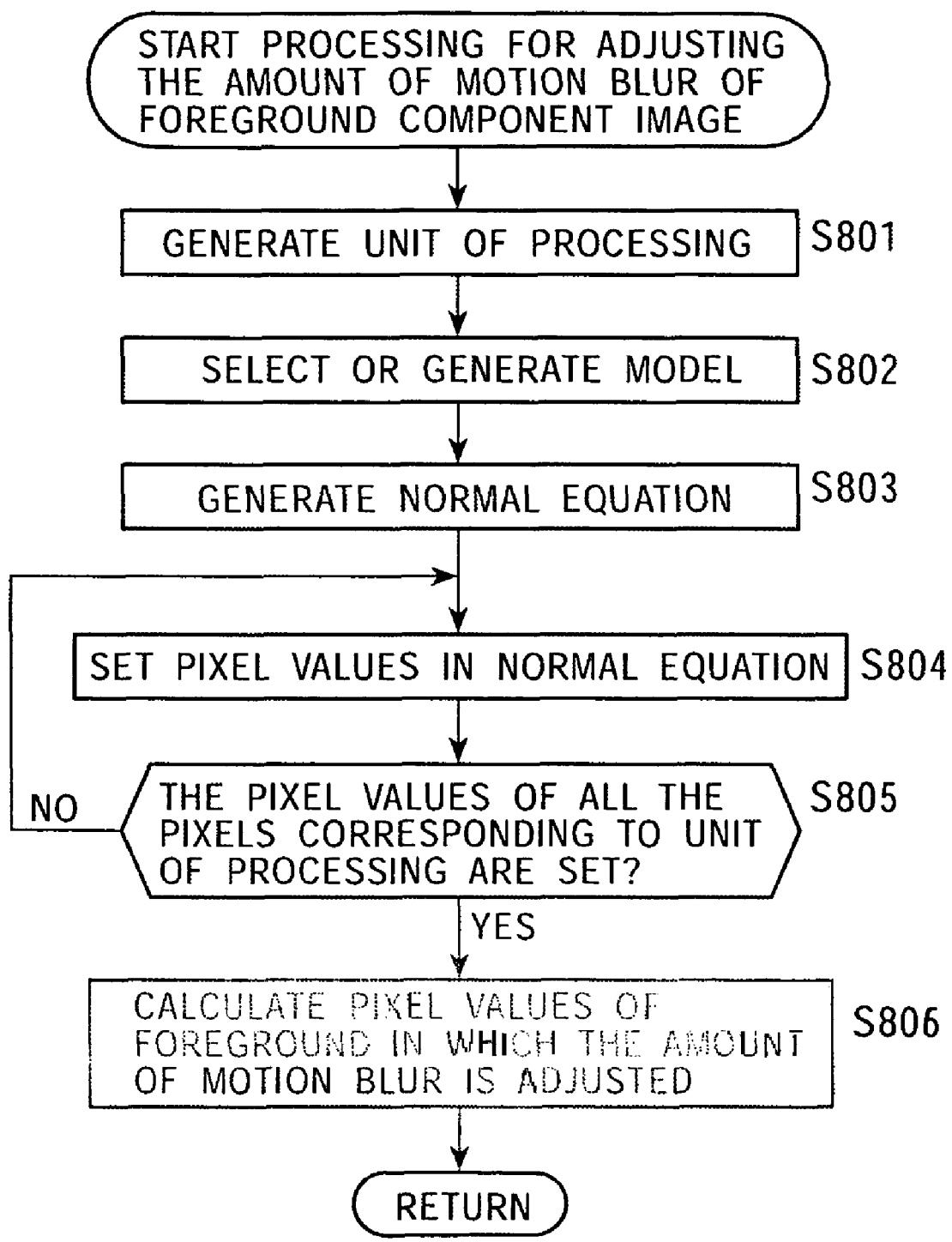
FIG. 65 is a flowchart illustrating the processing for adjusting the amount of motion blur contained in a foreground component image performed by the motion-blur adjusting unit 106.

The processing for adjusting the amount of motion blur contained in the foreground component image executed by the motion-blur adjusting unit 106 is described below with reference to the flowchart of FIG. 65.

In step S801, the unit-of-processing determining portion 801 of the motion-blur adjusting unit 106 generates the unit of processing based on the motion vector and the area information, and supplies the generated unit of processing to the model-forming portion 802.

In step S802, the model-forming portion 802 of the motion-blur adjusting unit 106 selects or generates the model in accordance with the amount of movement v and the unit of processing. In step S803, the equation generator 803 generates the normal equation based on the selected model.

In step S804, the adder 804 sets the pixel values of the foreground component image in the generated normal equation. In step S805, the adder 804 determines whether the pixel values of all the pixels corresponding to the unit of processing are set. If it is determined that the pixel values of all the pixels corresponding to the unit of processing are not yet set, the process returns to step S804, and the processing for setting the pixel values in the normal equation is repeated.

If it is determined in step S805 that the pixel values of all the pixels corresponding to the unit of processing are set, the process proceeds to step S806. In step S806, the calculator 805 calculates the pixel values of the foreground in which the amount of motion blur is adjusted based on the normal equation in which the pixel values are set supplied from the adder 804. The processing is then completed.

As discussed above, the motion-blur adjusting unit 106 is able to adjust the amount of motion blur of the foreground image containing motion blur based on the motion vector and the area information.

That is, it is possible to adjust the amount of motion blur contained in the pixel values, that is, contained in sampled data.

Figure 66:
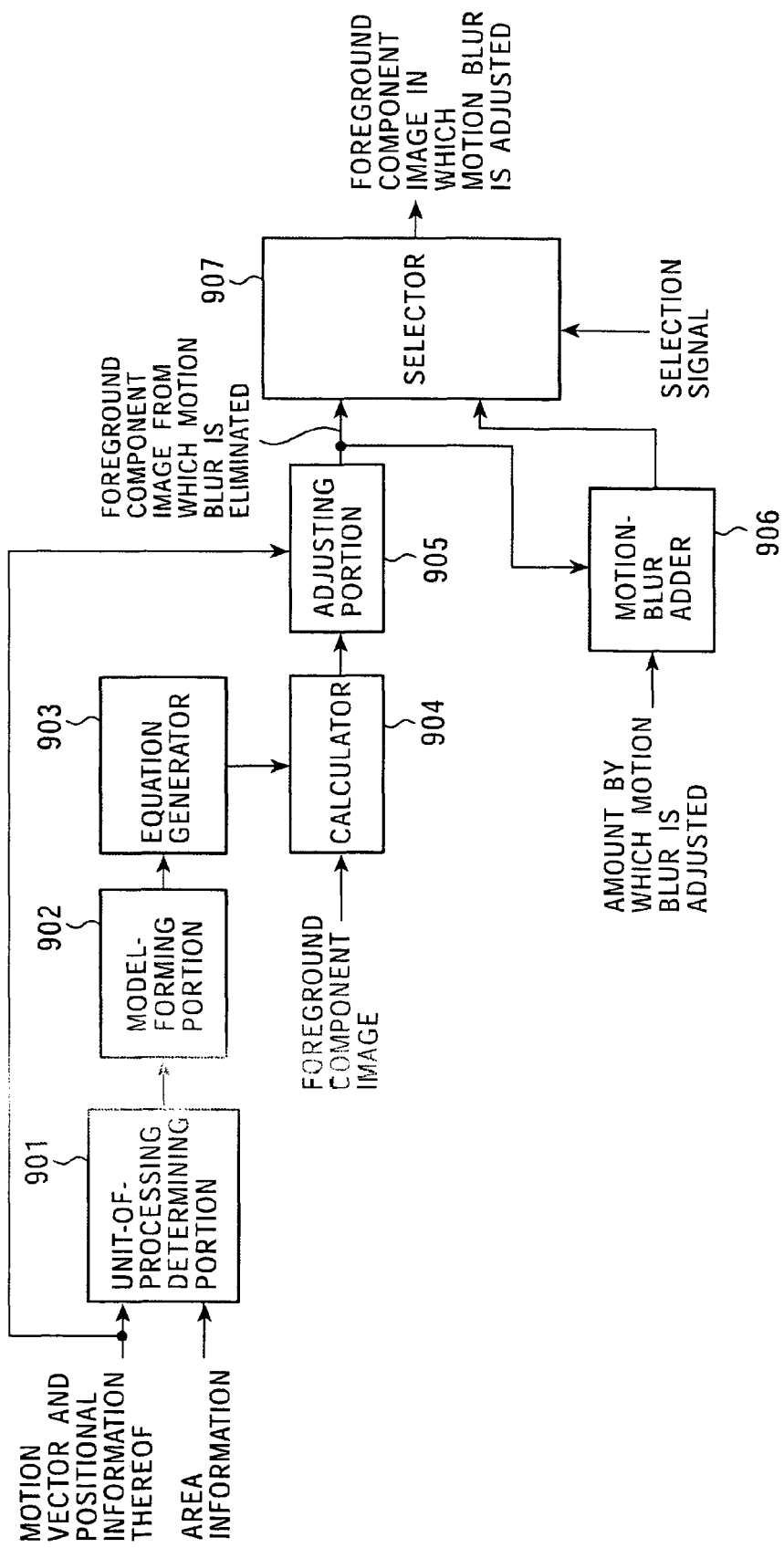
FIG. 66 is a block diagram illustrating an example of another configuration of the motion-blur adjusting unit 106.

FIG. 66 is a block diagram illustrating another example of the configuration of the motion-blur adjusting unit 106. The motion vector and the positional information thereof supplied from the motion detector 102 are supplied to a unit-of-processing determining portion 901 and an adjusting portion 905. The area information supplied from the area specifying unit 104 is supplied to the unit-of-processing determining portion 901. The foreground component image supplied from the foreground/background separator 105 is supplied to a calculator 904.

The unit-of-processing determining portion 901 generates the unit of processing based on the motion vector and the positional information thereof, and the area information, and supplies the generated unit of processing to a model-forming portion 902 together with the motion vector.

The model-forming portion 902 forms a model based on the motion vector and the input unit of processing. More specifically, for example, the model-forming portion 902 may store in advance a plurality of models in accordance with the number of pixels contained in the unit of processing, the number of virtual divided portions of the pixel value in the time direction, and the number of foreground components for each pixel. The model-forming portion 902 may then select the model in which the correlation between the pixel values and the foreground components is designated, such as that in FIG. 67, based on the unit of processing and the number of virtual divided portions of the pixel value in the time direction.

It is now assumed, for example, that the number of pixels corresponding to the unit of processing is 12, and that the amount of movement v within the shutter time is 5. Then, the model-forming portion 902 sets the number of virtual divided portions to 5, and selects a model formed of eight types of foreground components so that the leftmost pixel contains one foreground component, the second pixel from the left contains two foreground components, the third pixel from the left contains three foreground components, the fourth pixel from the left contains four pixel components, the fifth pixel from the left contains five foreground components, the sixth pixel from the left contains five foreground components, the seventh pixel from the left contains five foreground components, the eighth pixel from the left contains five foreground components, the ninth pixel from the left contains four foreground components, the tenth pixel from the left contains three foreground components, the eleventh pixel from the left contains two foreground components, and the twelfth pixel from the left contains one foreground component.

Instead of selecting a model from the prestored models, the model-forming portion 902 may generate a model based on the motion vector and the unit of processing when the motion vector and the unit of processing are supplied.

An equation generator 903 generates an equation based on the model supplied from the model-forming portion 902.

A description is now given, with reference to the models of foreground component images shown in FIGS. 67 through 69, of an example of the equation generated by the equation generator 903 when the number of foreground components is 8, the number of pixels corresponding to the unit of processing is 12, and the amount of movement v is 5.

When the foreground components contained in the foreground component image corresponding to the shutter time/v are F01/v through F08/v, the relationships between F01/v through F08/v and pixel values C01 through C12 can be expressed by equations (74) through (85), as stated above.

By considering the pixel values C12 and C11, the pixel value C12 contains only the foreground component F08/v, as expressed by equation (107), and the pixel value C11 consists of the product sum of the foreground component F08/v and the foreground component F07/v. Accordingly, the foreground component F07/v can be found by equation (108).

$$F08/v = C12 \tag{107}$$

$$F07/v = C11 - C12 \tag{108}$$

Similarly, by considering the foreground components contained in the pixel values C10 through C01, the foreground components F06/v through F01/v can be found by equations (109) through (114), respectively.

$$F06/v = C10 - C11 \tag{109}$$

$$F05/v = C09 - C10 \tag{110}$$

$$F04/v = C08 - C09 \tag{111}$$

$$F03/v = C07 - C08 + C12 \tag{112}$$

$$F02/v = C06 - C07 + C11 - C12 \tag{113}$$

$$F01/v = C05 - C06 + C10 - C11 \tag{114}$$

The equation generator 903 generates the equations for calculating the foreground components by the difference between the pixel values, as indicated by the examples of equations (107) through (114). The equation generator 903 supplies the generated equations to the calculator 904.

The calculator 904 sets the pixel values of the foreground component image in the equations supplied from the equation generator 903 so as to obtain the foreground components based on the equations in which the pixel values are set. For example, when equations (107) through (114) are supplied from the equation generator 903, the calculator 904 sets the pixel values C05 through C12 in equations (107) through (114).

The calculator 904 calculates the foreground components based on the equations in which the pixel values are set. For example, the calculator 904 calculates the foreground components F01/v through F08/v, as shown in FIG. 68, based on the calculations of equations (107) through (114) in which the pixel values C05 through C12 are set. The calculator 904 supplies the foreground components F01/v through F08/v to the adjusting portion 905.

The adjusting portion 905 multiplies the foreground components supplied from the calculator 904 by the amount of movement v contained in the motion vector supplied from the unit-of-processing determining portion 901 so as to obtain the foreground pixel values from which motion blur is eliminated. For example, when the foreground components F01/v through F08/v are supplied from the calculator 904, the adjusting portion 905 multiples each of the foreground components F01/v through F08/v by the amount of movement v, i.e., 5, so as to obtain the foreground pixel values F01 through F08 from which motion blur is eliminated, as shown in FIG. 69.

The adjusting portion 905 supplies the foreground component image consisting of the foreground pixel values without motion blur calculated as described above to a motion-blur adder 906 and a selector 907.

The motion-blur adder 906 is able to adjust the amount of motion blur by using the amount v' by which motion blur is adjusted, which is different from the amount of movement v, for example, the amount v' by which motion blur is adjusted, which is one half the value of the amount of movement v, or the amount v' by which motion blur is adjusted, which is irrelevant to the amount of movement v. For example, as shown in FIG. 62, the motion-blur adder 906 divides the foreground pixel value Fi without motion blur by the amount v' by which motion blur is adjusted so as to obtain the foreground component Fi/v'. The motion-blur adder 906 then calculates the sum of the foreground components Fi/v', thereby generating the pixel value in which the amount of motion blur is adjusted. For example, when the amount v' by which motion blur is adjusted is 3, the pixel value C02 is set to (F01)/v', the pixel value C3 is set to (F01+F02)/v', the pixel value C04 is set to (F01+F02+F03)/v', and the pixel value C05 is set to (F02+F03+F04)/v'.

The motion-blur adder 906 supplies the foreground component image in which the amount of motion blur is adjusted to the selector 907.

The selector 907 selects either the foreground component image without motion blur supplied from the adjusting portion 905 or the foreground component image in which the amount of motion blur is adjusted supplied from the motion-blur adder 906 based on a selection signal reflecting a user's selection, and outputs the selected foreground component image.

As discussed above, the motion-blur adjusting unit 106 is able to adjust the amount of motion blur based on the selection signal and the amount v' by which motion blur is adjusted.

Figure 70:
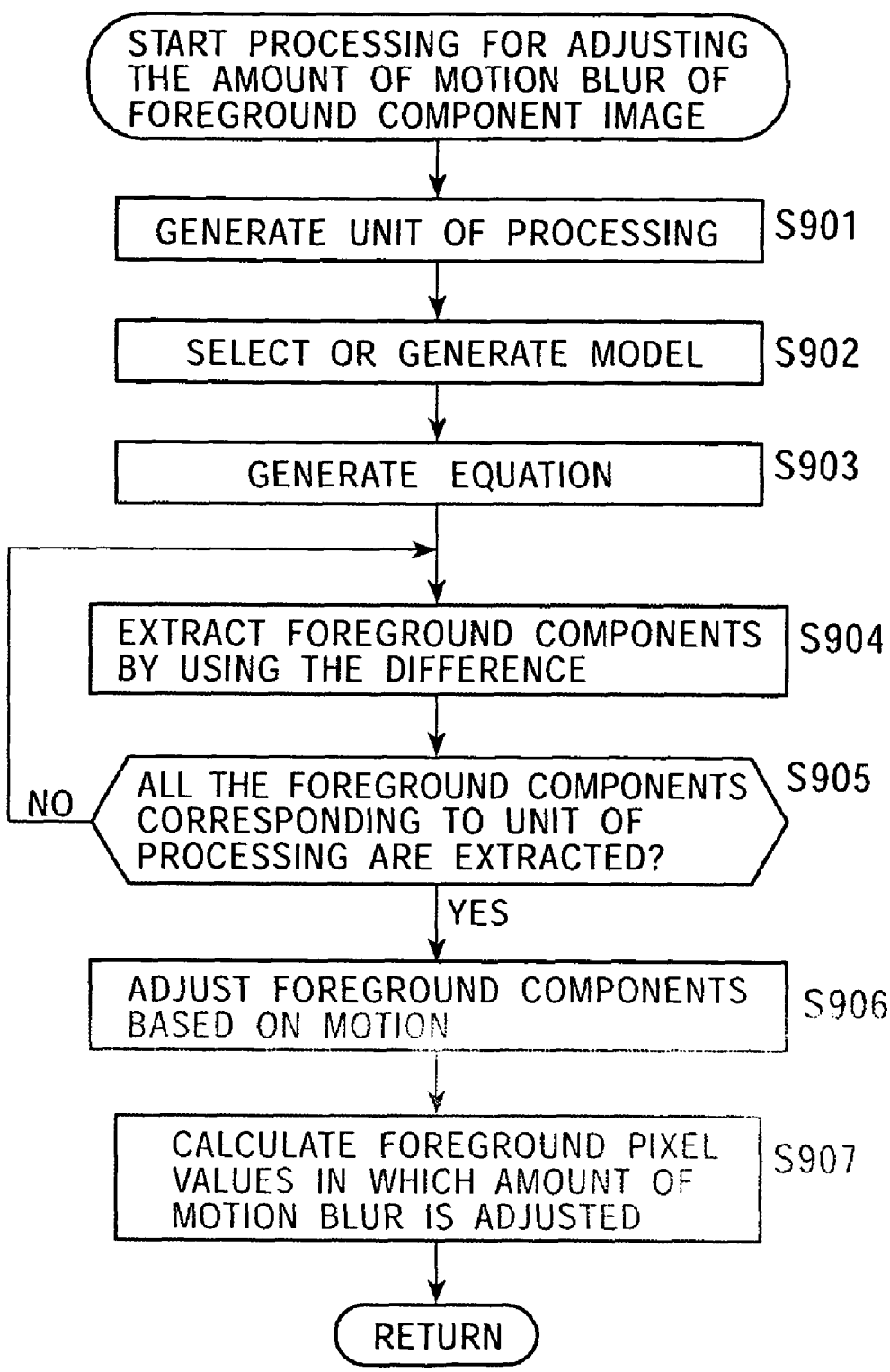
FIG. 70 is a flowchart illustrating the processing for eliminating motion blur contained in a foreground.

The processing for adjusting the amount of motion blur of the foreground executed by the motion-blur adjusting unit 106 configured as shown in FIG. 66 is described below with reference to the flowchart of FIG. 70.

In step S901, the unit-of-processing determining portion 901 of the motion-blur adjusting unit 106 generates the unit of processing based on the motion vector and the area information, and supplies the generated unit of processing to the model-forming portion 902 and the adjusting portion 905.

In step S902, the model-forming portion 902 of the motion-blur adjusting unit 106 selects or generates the model according to the amount of movement v and the unit of processing. In step S903, the equation generator 903 generates, based on the selected or generated model, the equations for calculating the foreground components by the difference between the pixel values of the foreground component image.

In step S904, the calculator 904 sets the pixel values of the foreground component image in the generated equations, and extracts the foreground components by using the difference between the pixel values based on the equations in which the pixel values are set. In step S905, the calculator 904 determines whether all the foreground components corresponding to the unit of processing have been extracted. If it is determined that all the foreground components corresponding to the unit of processing have not been extracted, the process returns to step S904, and the processing for extracting the foreground components is repeated.

If it is determined in step S905 that all the foreground components corresponding to the unit of processing have been extracted, the process proceeds to step S906. In step S906, the adjusting portion 905 adjusts each of the foreground components F01/v through F08/v supplied from the calculator 904 based on the amount of movement v so as to obtain the foreground pixel values F01/v through F08/v from which motion blur is eliminated.

In step S907, the motion-blur adder 906 calculates the foreground pixel values in which the amount of motion blur is adjusted, and the selector 907 selects the image without motion blur or the image in which the amount of motion blur is adjusted, and outputs the selected image. The processing is then completed.

As described above, the motion-blur adjusting unit 106 configured as shown in FIG. 66 is able to more speedily adjust motion blur of the foreground image containing motion blur according to simpler computations.

A known technique for partially eliminating motion blur, such as a Wiener filter, is effective when being used in the ideal state, but is not sufficient for an actual image quantized and containing noise. In contrast, it is proved that the motion-blur adjusting unit 106 configured as shown in FIG. 66 is sufficiently effective for an actual image quantized and containing noise. It is thus possible to eliminate motion blur with high precision.

As described above, the image processing apparatus configured as shown in FIG. 2 is able to adjust the amount of motion blur contained in an input image.

The embodiment has been discussed above by setting the mixture ratio α to the ratio of the background components contained in the pixel values. However, the mixture ratio α may be set to the ratio of the foreground components contained in the pixel values.

The embodiment has been discussed above by setting the moving direction of the foreground object to the direction from the left to the right. However, the moving direction is not restricted to the above-described direction.

In the above description, a real-space image having a three-dimensional space and time axis information is projected onto a time space having a two-dimensional space and time axis information by using a video camera. However, the present invention is not restricted to this example, and can be applied to the following case. When a greater amount of first information in one-dimensional space is projected onto a smaller amount of second information in a two-dimensional space, distortion generated by the projection can be corrected, significant information can be extracted, or a more natural image can be synthesized.

The sensor is not restricted to a CCD, and may be another type of sensor, such as a solid-state image-capturing device, for example, a BBD (Bucket Brigade Device), a CID (Charge Injection Device), or a CPD (Charge Priming Device), or a CMOS (Complementary Metal Oxide Semiconductor). Also, the sensor does not have to be a sensor in which detection devices are arranged in a matrix, and may be a sensor in which detection devices are arranged in one line.

A recording medium in which a program for performing the signal processing of the present invention is recorded may be formed of a package medium in which the program is recorded, which is distributed for providing the program to a user separately from the computer, as shown in FIG. 1, such as the magnetic disk 51 (including a floppy (registered trade name) disk), the optical disc 52 (including a CD-ROM (Compact Disc-Read Only Memory) and a DVD (Digital Versatile Disc)), the magneto-optical disk 53 (including MD (Mini-Disk) (registered trade name)), or the semiconductor memory 54. The recording medium may also be formed of the ROM 22 or a hard disk contained in the storage unit 28 in which the program is recorded, such a recording medium being provided to the user while being prestored in the computer.

The steps forming the program recorded in a recording medium may be executed chronologically according to the orders described in the specification. However, they do not have to be executed in a time-series manner, and they may be executed concurrently or individually.

INDUSTRIAL APPLICABILITY

According to the present invention, it is possible to specify a background image area, a moving object image area, and an image area in which the mixture of the background image area and the moving object image area occurs.

The invention claimed is:

1. An image processing apparatus for processing image data which is formed of a predetermined number of pixel data obtained by an image-capturing device including a predetermined number of pixels, the pixels having a time integrating function, said image processing apparatus comprising:

relational-expression generating means for extracting, in correspondence with a designated pixel of a designated frame of the image data, the pixel data of a peripheral frame around the designated frame as background pixel data corresponding to a background object which forms a background among a plurality of objects of the image data, and also for extracting designated pixel data of the designated pixel contained in the designated frame so as to generate a plurality of relational expressions concerning the designated pixel indicating a relationship between the designated pixel data and the background pixel data;

mixture-ratio detection means for detecting a mixture ratio indicating a mixture state of the plurality of objects in the real world concerning the designated pixel based on the relational expressions;

predictive-error calculation means for calculating a predictive error by substituting the mixture ratio detected by said mixture-ratio detection means into the relational expressions;

covered background area/uncovered background area specifying means for specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and foreground area/background area specifying means for specifying whether the area to which the designated pixel belongs is a foreground area consisting of only foreground object components which form the foreground object or a background area consisting of only background object components which form the background object.

2. An image processing apparatus according to claim 1, wherein:

said mixture-ratio detection means detects the foreground object components contained in the designated pixel in correspondence with the designated pixel based on the relational expressions, and also detects the mixture ratio; and said predictive-error calculation means calculates the predictive error by substituting the mixture ratio and the foreground object components contained in the designated pixel detected by said mixture-ratio detection means into the relational expressions.

3. An image processing apparatus according to claim 2, wherein said relational-expression generating means extracts the pixel data of the peripheral frame corresponding to the designated pixel as the background pixel data corresponding to the background object, and also extracts the designated pixel data of the designated pixel and vicinity pixel data of a vicinity pixel positioned in the vicinity of the designated pixel in the designated frame, and generates the plurality of relational expressions concerning the designated pixel indicating a relationship among the designated pixel data, the vicinity pixel data, and the background pixel data corresponding to the designated pixel data or the vicinity pixel data.

4. An image processing apparatus according to claim 3, wherein said relational-expression generating means generates the plurality of relational expressions based on a first approximation in which the foreground object components contained in the designated pixel data and the vicinity pixel data are equal, and a second approximation in which the mixture ratio in the mixed area linearly changes with respect to a position of a pixel of the mixed area.

5. An image processing apparatus according to claim 3, wherein said relational-expression generating means generates the plurality of relational expressions based on a first approximation in which the foreground object components contained in the designated pixel data and the vicinity pixel data are equal, and a second approximation in which the mixture ratio in the mixed area planarly changes with respect to a position of a pixel of the mixed area.

6. An image processing apparatus according to claim 3, wherein said mixture-ratio detection means detects the mixture ratio by solving the plurality of relational expressions according to a method of least squares.

7. An image processing apparatus according to claim 3, wherein said relational-expression generating means generates the plurality of relational expressions by extracting the pixel data of a frame prior to the designated frame as the background pixel data when the designated pixel belongs to the covered background area and by extracting the pixel data of a frame subsequent to the designated frame as the background pixel data when the designated pixel belongs to the uncovered background area.

8. An image processing apparatus according to claim 2, wherein said relational-expression generating means generates the plurality of relational expressions by extracting, in correspondence with the designated pixel, mixed pixel data indicating a mixture state in which the plurality of objects are mixed from the designated frame and the peripheral frame based on a motion of the foreground object and by also extracting, in correspondence with each item of the mixed pixel data, the background pixel data corresponding to the background object from a frame different from the frame from which the mixed pixel data is extracted based on a motion of the background object.

9. An image processing apparatus according to claim 8, wherein said relational-expression generating means generates the plurality of relational expressions based on a first approximation in which the foreground object components corresponding to the mixed pixel data are equal and a second approximation in which the mixed pixel data extracted from the designated frame and the peripheral frame are uniform.

10. An image processing apparatus according to claim 8, wherein:

said relational-expression generating means generates the plurality of relational expressions by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame prior to the frame from which the mixed pixel data is extracted based on the motion of the background object; and said covered background area/uncovered background area specifying means specifies an area in which the predictive error is greater than or equal to a predetermined threshold as the uncovered background area.

11. An image processing apparatus according to claim 8, wherein:

said relational-expression generating means generates the plurality of relational expressions by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from a frame subsequent to the frame from which the mixed pixel data is extracted based on the motion of the background object; and said covered background area/uncovered background area specifying means specifies an area in which the predictive error is greater than or equal to a predetermined threshold as the covered background area.

12. An image processing method for processing image data which is formed of a predetermined number of pixel data obtained by an image-capturing device including a predetermined number of pixels, the pixels having a time integrating function, said image processing method comprising:
- a relational-expression generating step of extracting, in correspondence with a designated pixel of a designated frame of the image data, the pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating a relationship between the designated pixel data and the background pixel data;
- a mixture-ratio detection step of detecting a mixture ratio indicating a mixture state of the plurality of objects in the real world concerning the designated pixel based on the relational expressions;
- a predictive-error calculation step of calculating a predictive error by substituting the mixture ratio detected by processing in said mixture-ratio detection step into the relational expressions;
- a covered background area/uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and
- a foreground area/background area specifying step of specifying whether the area to which the designated pixel belongs is a foreground area consisting of only foreground object components which form the foreground object or a background area consisting of only background object components which form the background object.

13. An image processing method according to claim 12, wherein:
- in said mixture-ratio detection step, the foreground object components contained in the designated pixel is detected in correspondence with the designated pixel based on the relational expressions, and the mixture ratio is also detected; and
- in said predictive-error calculation step, the predictive error is calculated by substituting the mixture ratio and the foreground object components contained in the designated pixel detected by processing in said mixture-ratio detection step into the relational expressions.

14. An image processing method according to claim 13, wherein, in said relational-expression generating step, the pixel data of the peripheral frame corresponding to the designated pixel is extracted as the background pixel data corresponding to the background object, and the designated pixel data of the designated pixel and vicinity pixel data of a vicinity pixel positioned in the vicinity of the designated pixel in the designated frame are also extracted, and the plurality of relational expressions concerning the designated pixel indicating a relationship among the designated pixel data, the vicinity pixel data, and the background pixel data corresponding to the designated pixel data or the vicinity pixel data.

15. An image processing method according to claim 14, wherein, in said relational-expression generating step, the plurality of relational expressions are generated based on a first approximation in which the foreground object components contained in the designated pixel data and the vicinity pixel data are equal, and a second approximation in which the mixture ratio in the mixed area linearly changes with respect to a position of a pixel of the mixed area.

16. An image processing method according to claim 14, wherein, in said relational-expression generating step, the plurality of relational expressions are generated based on a first approximation in which the foreground object components contained in the designated pixel data and the vicinity pixel data are equal, and a second approximation in which the mixture ratio in the mixed area planarly changes with respect to a position of a pixel of the mixed area.

17. An image processing method according to claim 14, wherein, in said mixture-ratio detection step, the mixture ratio is detected by solving the plurality of relational expressions according to a method of least squares.

18. An image processing method according to claim 14, wherein, in said relational-expression generating step, the plurality of relational expressions are generated by extracting the pixel data of a frame prior to the designated frame as the background pixel data when the designated pixel belongs to the covered background area and by extracting the pixel data of a frame subsequent to the designated frame as the background pixel data when the designated pixel belongs to the uncovered background area.

19. An image processing method according to claim 13, wherein, in said relational-expression generating step, the plurality of relational expressions are generated by extracting, in correspondence with the designated pixel, mixed pixel data indicating a mixture state in which the plurality of objects are mixed from the designated frame and the peripheral frame based on a motion of the foreground object and by also extracting, in correspondence with each item of the mixed pixel data, the background pixel data corresponding to the background object from a frame different from the frame from which the mixed pixel data is extracted based on a motion of the background object.

20. An image processing method according to claim 19, wherein, in said relational-expression generating step, the plurality of relational expressions are generated based on a first approximation in which the foreground object components corresponding to the mixed pixel data are equal and a second approximation in which the mixed pixel data extracted from the designated frame and the peripheral frame are uniform.

21. An image processing method according to claim 19, wherein:
- in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame prior to the frame from which the mixed pixel data is extracted based on the motion of the background object; and in said covered background area/uncovered background area specifying step, an area in which the predictive error is greater than or equal to a predetermined threshold is specified as the uncovered background area.

22. An image processing method according to claim 19, wherein:
in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from a frame subsequent to the frame from which the mixed pixel data is extracted based on the motion of the background object; and
in said covered background area/uncovered background area specifying step, an area in which the predictive error is greater than or equal to a predetermined threshold is specified as the covered background area.

23. A recording medium in which a computer-readable program is recorded, said computer-readable program being used for processing image data which is formed of a predetermined number of pixel data obtained by an image-capturing device including a predetermined number of pixels, the pixels having a time integrating function, said computer-readable program comprising:
a relational-expression generating step of extracting, in correspondence with a designated pixel of a designated frame of the image data, the pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating a relationship between the designated pixel data and the background pixel data;
a mixture-ratio detection step of detecting a mixture ratio indicating a mixture state of the plurality of objects in the real world concerning the designated pixel based on the relational expressions;
a predictive-error calculation step of calculating a predictive error by substituting the mixture ratio detected by processing in said mixture-ratio detection step into the relational expressions;
a covered background area/uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and
a foreground area/background area specifying step of specifying whether the area to which the designated pixel belongs is a foreground area consisting of only foreground object components which form the foreground object or a background area consisting of only background object components which form the background object.

24. A recording medium according to claim 23, wherein:
in said mixture-ratio detection step, the foreground object components contained in the designated pixel is detected in correspondence with the designated pixel based on the relational expressions, and the mixture ratio is also detected; and
in said predictive-error calculation step, the predictive error is calculated by substituting the mixture ratio and the foreground object components contained in the designated pixel detected by processing in said mixture-ratio detection step into the relational expressions.

25. A recording medium according to claim 24, wherein, in said relational-expression generating step, the pixel data of the peripheral frame corresponding to the designated pixel is extracted as the background pixel data corresponding to the background object, and the designated pixel data of the designated pixel and vicinity pixel data of a vicinity pixel positioned in the vicinity of the designated pixel in the designated frame are also extracted, and the plurality of relational expressions concerning the designated pixel indicating a relationship among the designated pixel data, the vicinity pixel data, and the background pixel data corresponding to the designated pixel data or the vicinity pixel data.

26. A recording medium according to claim 25, wherein, in said relational-expression generating step, the plurality of relational expressions are generated based on a first approximation in which the foreground object components contained in the designated pixel data and the vicinity pixel data are equal, and a second approximation in which the mixture ratio in the mixed area linearly changes with respect to a position of a pixel of the mixed area.

27. A recording medium according to claim 25, wherein, in said relational-expression generating step, the plurality of relational expressions are generated based on a first approximation in which the foreground object components contained in the designated pixel data and the vicinity pixel data are equal, and a second approximation in which the mixture ratio in the mixed area planarly changes with respect to a position of a pixel of the mixed area.

28. A recording medium according to claim 25, wherein, in said mixture-ratio detection step, the mixture ratio is detected by solving the plurality of relational expressions according to a method of least squares.

29. A recording medium according to claim 25, wherein, in said relational-expression generating step, the plurality of relational expressions are generated by extracting the pixel data of a frame prior to the designated frame as the background pixel data when the designated pixel belongs to the covered background area and by extracting the pixel data of a frame subsequent to the designated frame as the background pixel data when the designated pixel belongs to the uncovered background area.

30. A recording medium according to claim 24, wherein, in said relational-expression generating step, the plurality of relational expressions are generated by extracting, in correspondence with the designated pixel, mixed pixel data indicating a mixture state in which the plurality of objects are mixed from the designated frame and the peripheral frame based on a motion of the foreground object and by also extracting, in correspondence with each item of the mixed pixel data, the background pixel data corresponding to the background object from a frame different from the frame from which the mixed pixel data is extracted based on a motion of the background object.

31. A recording medium according to claim 30, wherein, in said relational-expression generating step, the plurality of relational expressions are generated based on a first approximation in which the foreground object components corresponding to the mixed pixel data are equal and a second approximation in which the mixed pixel data extracted from the designated frame and the peripheral frame are uniform.

32. A recording medium according to claim 30, wherein:
in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame prior to the frame from which the mixed pixel data is extracted based on the motion of the background object; and
in said covered background area/uncovered background area specifying step, an area in which the predictive error is greater than or equal to a predetermined threshold is specified as the uncovered background area.

33. A recording medium according to claim 30, wherein:
in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from a frame subsequent to the frame from which the mixed pixel data is extracted based on the motion of the background object; and
in said covered background area/uncovered background area specifying step, an area in which the predictive error is greater than or equal to a predetermined threshold is specified as the covered background area.

34. A program stored in a computer readable medium for allowing a computer for processing image data formed of a predetermined number of pixel data obtained by an image-capturing device including a predetermined number of pixels, the pixels having a time integrating function, to execute:
a relational-expression generating step of extracting, in correspondence with a designated pixel of a designated frame of the image data, the pixel data of a peripheral frame around the designated frame as background pixel data corresponding to a background object which forms a background among a plurality of objects of the image data, and also of extracting designated pixel data of the designated pixel contained in the designated frame so as to generate a plurality of relational expressions concerning the designated pixel indicating a relationship between the designated pixel data and the background pixel data;
a mixture-ratio detection step of detecting a mixture ratio indicating a mixture state of the plurality of objects in the real world concerning the designated pixel based on the relational expressions;
a predictive-error calculation step of calculating a predictive error by substituting the mixture ratio detected by processing in said mixture-ratio detection step into the relational expressions;
a covered background area/uncovered background area specifying step of specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and
a foreground area/background area specifying step of specifying whether the area to which the designated pixel belongs is a foreground area consisting of only foreground object components which form the foreground object or a background area consisting of only background object components which form the background object.

35. A program according to claim 34, wherein:
in said mixture-ratio detection step, the foreground object components contained in the designated pixel is detected in correspondence with the designated pixel based on the relational expressions, and the mixture ratio is also detected; and
in said predictive-error calculation step, the predictive error is calculated by substituting the mixture ratio and the foreground object components contained in the designated pixel detected by processing in said mixture-ratio detection step into the relational expressions.

36. A program according to claim 35, wherein, in said relational-expression generating step, the pixel data of the peripheral frame corresponding to the designated pixel is extracted as the background pixel data corresponding to the background object, and the designated pixel data of the designated pixel and vicinity pixel data of a vicinity pixel positioned in the vicinity of the designated pixel in the designated frame are also extracted, and the plurality of relational expressions concerning the designated pixel indicating a relationship among the designated pixel data, the vicinity pixel data, and the background pixel data corresponding to the designated pixel data or the vicinity pixel data.

37. A program according to claim 36, wherein, in said relational-expression generating step, the plurality of relational expressions are generated based on a first approximation in which the foreground object components contained in the designated pixel data and the vicinity pixel data are equal, and a second approximation in which the mixture ratio in the mixed area linearly changes with respect to a position of a pixel of the mixed area.

38. A program according to claim 36, wherein, in said relational-expression generating step, the plurality of relational expressions are generated based on a first approximation in which the foreground object components contained in the designated pixel data and the vicinity pixel data are equal, and a second approximation in which the mixture ratio in the mixed area planarly changes with respect to a position of a pixel of the mixed area.

39. A program according to claim 36, wherein, in said mixture-ratio detection step, the mixture ratio is detected by solving the plurality of relational expressions according to a method of least squares.

40. A program according to claim 36, wherein, in said relational-expression generating step, the plurality of relational expressions are generated by extracting the pixel data of a frame prior to the designated frame as the background pixel data when the designated pixel belongs to the covered background area and by extracting the pixel data of a frame subsequent to the designated frame as the background pixel data when the designated pixel belongs to the uncovered background area.

41. A program according to claim 35, wherein, in said relational-expression generating step, the plurality of relational expressions are generated by extracting, in correspondence with the designated pixel, mixed pixel data indicating a mixture state in which the plurality of objects are mixed from the designated frame and the peripheral frame based on a motion of the foreground object and by also extracting, in correspondence with each item of the mixed pixel data, the background pixel data corresponding to the background object from a frame different from the frame from which the mixed pixel data is extracted based on a motion of the background object.

42. A program according to claim 41, wherein, in said relational-expression generating step, the plurality of relational expressions are generated based on a first approximation in which the foreground object components corresponding to the mixed pixel data are equal and a second approximation in which the mixed pixel data extracted from the designated frame and the peripheral frame are uniform.

43. A program according to claim 41, wherein:
in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame prior to the frame from which the mixed pixel data is extracted based on the motion of the background object; and
in said covered background area/uncovered background area specifying step, an area in which the predictive error is greater than or equal to a predetermined threshold is specified as the uncovered background area.

44. A program according to claim 41, wherein:
in said relational-expression generating step, the plurality of relational expressions are generated by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from a frame subsequent to the frame from which the mixed pixel data is extracted based on the motion of the background object; and
in said covered background area/uncovered background area specifying step, an area in which the predictive error is greater than or equal to a predetermined threshold is specified as the covered background area.

45. An image-capturing apparatus comprising:
image-capturing means for outputting a subject image captured by an image-capturing device including a predetermined number of pixels, the pixels having a time integrating function, as image data formed of a predetermined number of pixel data;
relational-expression generating means for extracting, in correspondence with a designated pixel of a designated frame of the image data, the pixel data of a peripheral frame around the designated frame as background pixel data corresponding to a background object which forms a background among a plurality of objects of the image data, and also for extracting designated pixel data of the designated pixel contained in the designated frame so as to generate a plurality of relational expressions concerning the designated pixel indicating a relationship between the designated pixel data and the background pixel data;
mixture-ratio detection means for detecting a mixture ratio indicating a mixture state of the plurality of objects in the real world concerning the designated pixel based on the relational expressions;
predictive-error calculation means for calculating a predictive error by substituting the mixture ratio detected by said mixture-ratio detection means into the relational expressions;
covered background area/uncovered background area specifying means for specifying, based on the predictive error, whether an area to which the designated pixel belongs is a mixed area in which the plurality of objects are mixed and is also a covered background area formed at a leading end in a moving direction of a foreground object which forms a foreground among the plurality of objects, or is the mixed area and is also an uncovered background area formed at a trailing end in the moving direction of the foreground object; and
foreground area/background area specifying means for specifying whether the area to which the designated pixel belongs is a foreground area consisting of only foreground object components which form the foreground object or a background area consisting of only background object components which form the background object.

46. An image-capturing apparatus according to claim 45, wherein:
said mixture-ratio detection means detects the foreground object components contained in the designated pixel in correspondence with the designated pixel based on the relational expressions, and also detects the mixture ratio; and
said predictive-error calculation means calculates the predictive error by substituting the mixture ratio and the foreground object components contained in the designated pixel detected by said mixture-ratio detection means into the relational expressions.

47. An image-capturing apparatus according to claim 46, wherein said relational-expression generating means extracts the pixel data of the peripheral frame corresponding to the designated pixel as the background pixel data corresponding to the background object, and also extracts the designated pixel data of the designated pixel and vicinity pixel data of a vicinity pixel positioned in the vicinity of the designated pixel in the designated frame, and generates the plurality of relational expressions concerning the designated pixel indicating a relationship among the designated pixel data, the vicinity pixel data, and the background pixel data corresponding to the designated pixel data or the vicinity pixel data.

48. An image-capturing apparatus according to claim 47, wherein said relational-expression generating means generates the plurality of relational expressions based on a first approximation in which the foreground object components contained in the designated pixel data and the vicinity pixel data are equal, and a second approximation in which the mixture ratio in the mixed area linearly changes with respect to a position of a pixel of the mixed area.

49. An image-capturing apparatus according to claim 47, wherein said relational-expression generating means generates the plurality of relational expressions based on a first approximation in which the foreground object components contained in the designated pixel data and the vicinity pixel data are equal, and a second approximation in which the mixture ratio in the mixed area planarly changes with respect to a position of a pixel of the mixed area.

50. An image-capturing apparatus according to claim 47, wherein said mixture-ratio detection means detects the mixture ratio by solving the plurality of relational expressions according to a method of least squares.

51. An image-capturing apparatus according to claim 47, wherein said relational-expression generating means generates the plurality of relational expressions by extracting the pixel data of a frame prior to the designated frame as the background pixel data when the designated pixel belongs to the covered background area and by extracting the pixel data of a frame subsequent to the designated frame as the background pixel data when the designated pixel belongs to the uncovered background area.

52. An image-capturing apparatus according to claim 46, wherein said relational-expression generating means generates the plurality of relational expressions by extracting, in correspondence with the designated pixel, mixed pixel data indicating a mixture state in which the plurality of objects are mixed from the designated frame and the peripheral frame based on a motion of the foreground object and by also extracting, in correspondence with each item of the mixed pixel data, the background pixel data corresponding to the background object from a frame different from the frame from which the mixed pixel data is extracted based on a motion of the background object.

53. An image-capturing apparatus according to claim 52, wherein said relational-expression generating means generates the plurality of relational expressions based on a first approximation in which the foreground object components corresponding to the mixed pixel data are equal and a second approximation in which the mixed pixel data extracted from the designated frame and the peripheral frame are uniform.

54. An image-capturing apparatus according to claim 52, wherein:

said relational-expression generating means generates the plurality of relational expressions by extracting, in correspondence with the designated pixel, the mixed pixel data indicating the mixture state in which the plurality of objects are mixed from the designated frame and the peripheral frame based on the motion of the foreground object and by also extracting, in correspondence with each item of the mixed pixel data, the background pixel data corresponding to the background object from a frame prior to the frame from which the mixed pixel data is extracted based on the motion of the background object; and said covered background area/uncovered background area specifying means specifies an area in which the predictive error is greater than or equal to a predetermined threshold as the uncovered background area.

55. An image-capturing apparatus according to claim 52, wherein:

said relational-expression generating means generates the plurality of relational expressions by extracting, in correspondence with the designated pixel, the mixed pixel data indicating the mixture state in which the plurality of objects are mixed from the designated frame and the peripheral frame based on the motion of the foreground object and also by extracting, in correspondence with each item of the mixed pixel data, the background pixel data corresponding to the background object from a frame subsequent to the frame from which the mixed pixel data is extracted based on the motion of the background object; and said covered background area/uncovered background area specifying means specifies an area in which the predictive error is greater than or equal to a predetermined threshold as the covered background area.

* * * * *